United States Patent [19]
Sasanuma et al.

[11] Patent Number: 5,856,876
[45] Date of Patent: Jan. 5, 1999

[54] IMAGE PROCESSING APPARATUS AND METHOD WITH GRADATION CHARACTERISTIC ADJUSTMENT

[75] Inventors: Nobuatsu Sasanuma; Kazuhito Ohashi; Masahiro Inoue, all of Yokohama; Yuichi Ikeda, Tokyo, all of Japan

[73] Assignee: Canon Kabushiki Kaisha, Tokyo, Japan

[21] Appl. No.: 628,268

[22] Filed: Apr. 5, 1996

[30] Foreign Application Priority Data

| Apr. 6, 1995 | [JP] | Japan | 7-081529 |
| Apr. 10, 1995 | [JP] | Japan | 7-083670 |
| Apr. 10, 1995 | [JP] | Japan | 7-083671 |
| Jun. 22, 1995 | [JP] | Japan | 7-156537 |

[51] Int. Cl.$^6$ ........................................................ G03F 3/08
[52] U.S. Cl. ........................... 358/300; 358/519; 358/521
[58] Field of Search ................................... 358/300, 518, 358/519, 521

[56] References Cited

U.S. PATENT DOCUMENTS

| 4,113,371 | 9/1978 | Fraser et al. | 355/246 X |
| 4,504,137 | 3/1985 | Aoki et al. | 355/324 |
| 4,888,636 | 12/1989 | Abe | 358/80 |
| 4,894,685 | 1/1990 | Shoji | 355/326 X |
| 4,914,459 | 4/1990 | Mama et al. | 346/160 |
| 4,950,905 | 8/1990 | Butler et al. | 355/246 X |
| 4,963,898 | 10/1990 | Kadowaki et al. | 346/157 |
| 4,989,985 | 2/1991 | Hubble, III et al. | 356/445 |
| 5,057,913 | 10/1991 | Nagata et al. | 358/302 |
| 5,060,013 | 10/1991 | Spence | 355/208 |
| 5,061,949 | 10/1991 | Ogino et al. | 346/160 |
| 5,083,161 | 1/1992 | Borton et al. | 355/208 |
| 5,148,289 | 9/1992 | Nishiyama et al. | 355/246 X |
| 5,187,593 | 2/1993 | Kurita et al. | 358/434 |
| 5,189,441 | 2/1993 | Fukui et al. | 346/160 |
| 5,194,878 | 3/1993 | Murakami et al. | 346/108 |
| 5,204,538 | 4/1993 | Genovese | 356/448 X |
| 5,206,686 | 4/1993 | Fukui et al. | 355/208 |
| 5,241,347 | 8/1993 | Kodama | 355/246 |
| 5,258,783 | 11/1993 | Sasanuma et al. | 346/157 |
| 5,298,944 | 3/1994 | Sawayama et al. | 355/208 |
| 5,305,057 | 4/1994 | Hattori et al. | 355/208 X |
| 5,319,433 | 6/1994 | Fukushima et al. | 355/326 |
| 5,363,318 | 11/1994 | McCauley | 358/519 X |
| 5,406,390 | 4/1995 | Mizoguchi | 358/456 |
| 5,414,531 | 5/1995 | Amemiya et al. | 358/465 |
| 5,481,340 | 1/1996 | Nagao et al. | 355/246 |

FOREIGN PATENT DOCUMENTS

| 0266186 | 5/1988 | European Pat. Off. | H04N 1/46 |
| 477730 | 4/1992 | European Pat. Off. | H04N 1/40 |
| 0604941 | 7/1994 | European Pat. Off. | G03G 15/00 |

OTHER PUBLICATIONS

Patent Abstracts of Japan, abstract for Kokai 1–181284 (Jul. 1989).
Patent Abstracts of Japan, abstract for Kokai 60–165667 (Aug. 1985).

Primary Examiner—Fred L. Braun
Attorney, Agent, or Firm—Fitzpatrick, Cella, Harper & Scinto

[57] ABSTRACT

This invention has as its object to provide an image processing apparatus and method, which can obtain high image quality by adjusting an image forming parameter or parameters in consideration of a variation in image forming condition. In order to achieve the object, the gradation characteristics of an image to be recorded are adjusted on the basis of information obtained by forming a gradation characteristic adjustment test pattern on a recording medium, and reading the formed test pattern. Subsequently, the color reproduction characteristics of an image to be recorded are adjusted on the basis of information obtained by forming a color reproduction characteristic adjustment test pattern on a recording medium, and reading the formed test pattern.

23 Claims, 53 Drawing Sheets

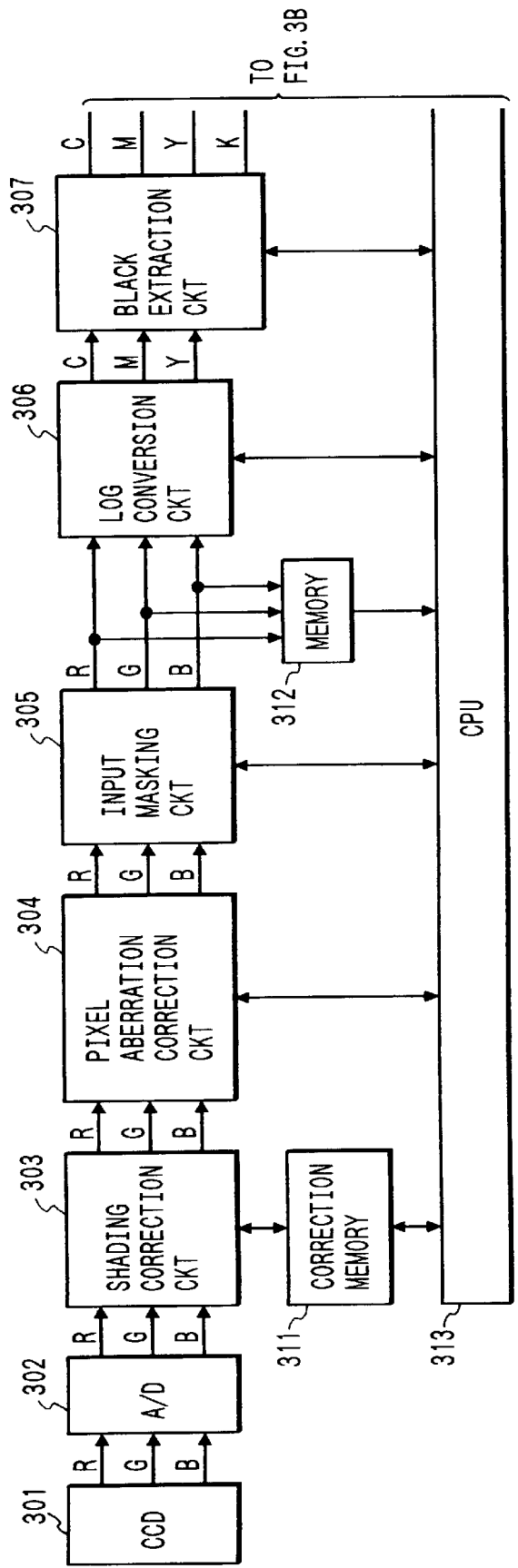

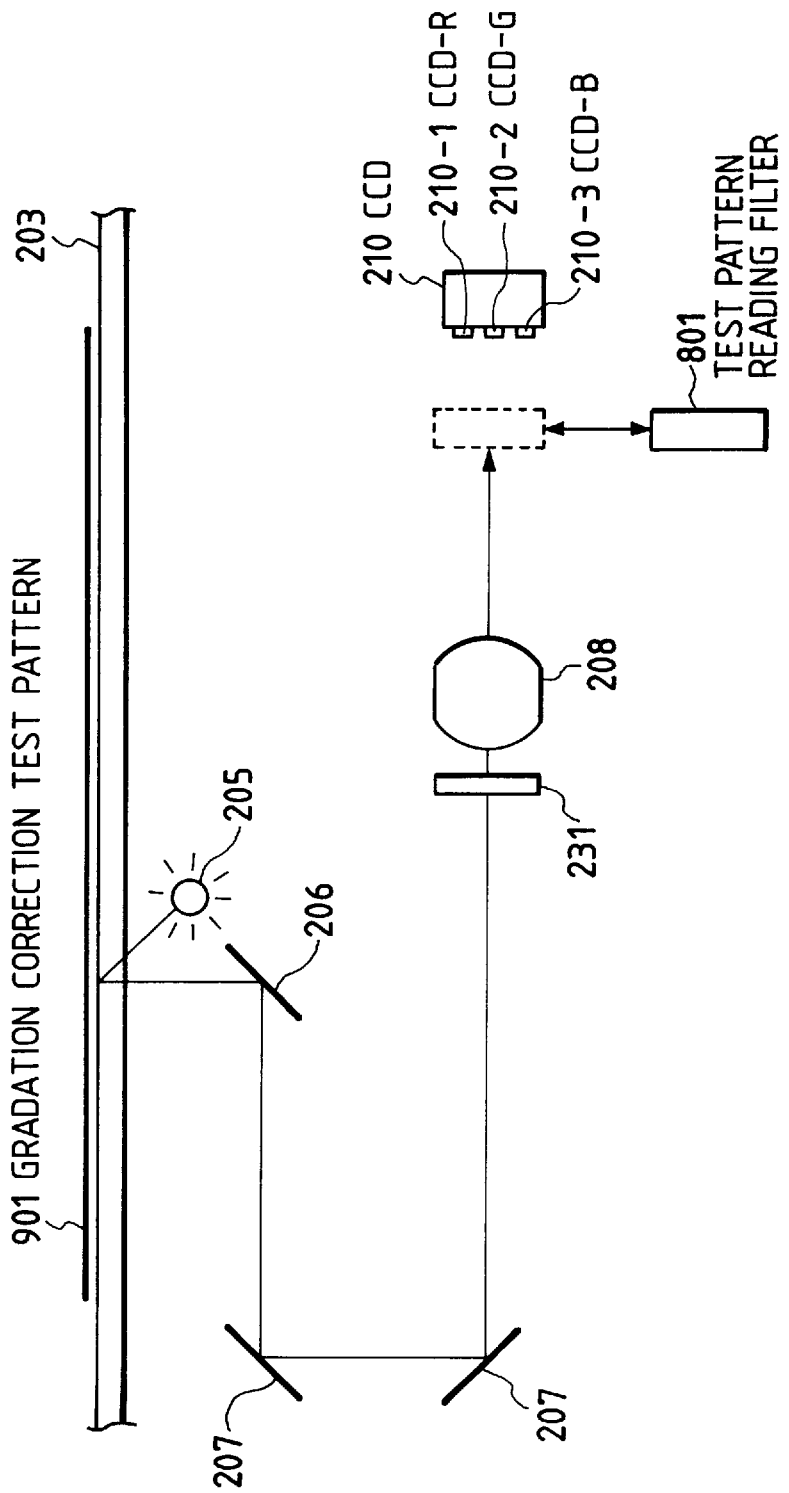

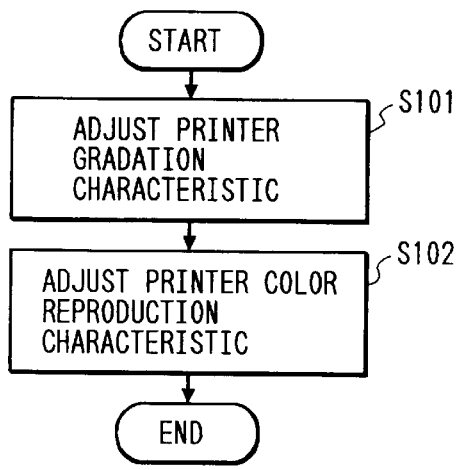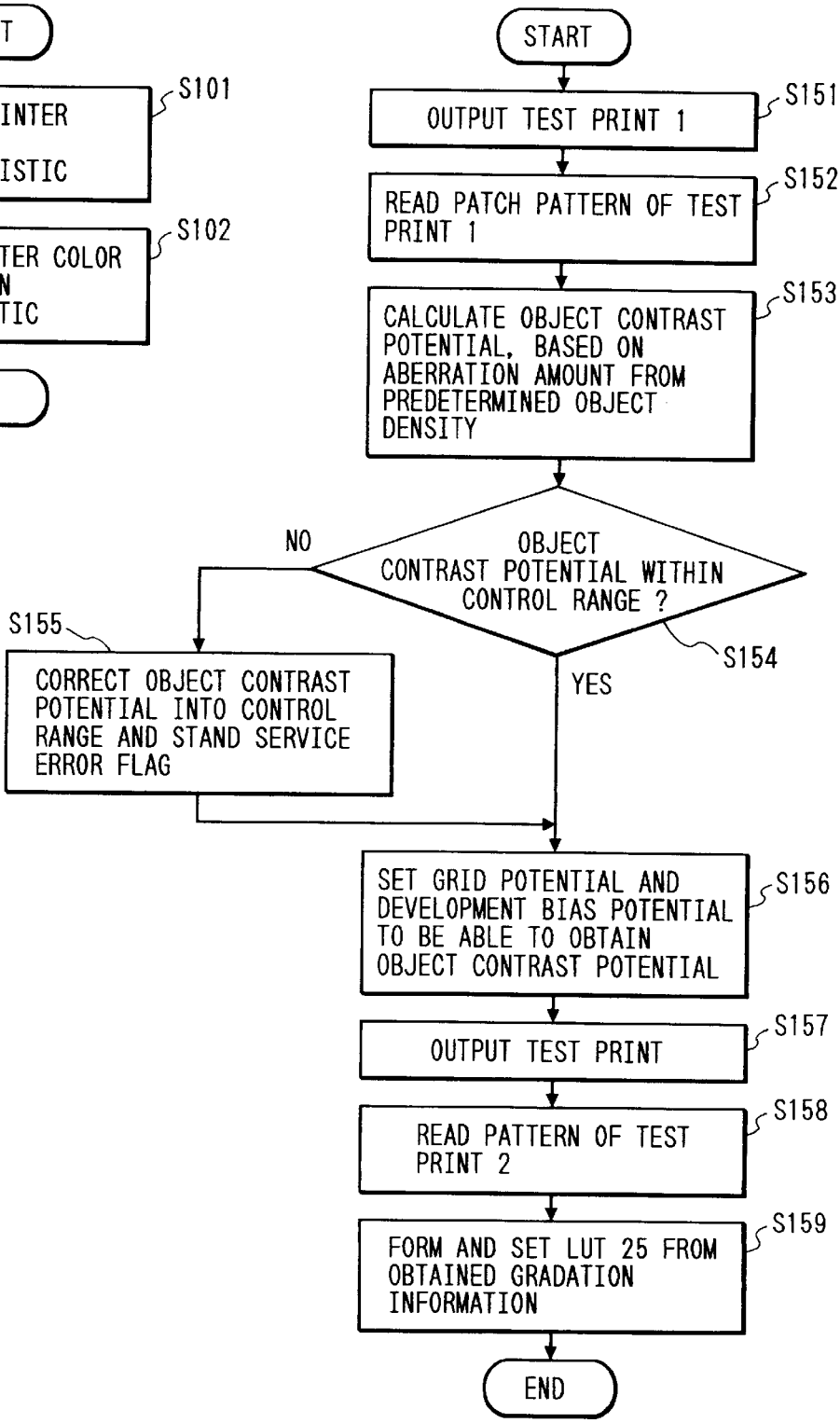

FIG. 19A

OUTPUT TEST PRINT TO BE USED IN AUTOMATIC GRADATION CORRECTION

[TEST PRINT 1]

[CANCEL] 1218

FIG. 19B

SET A3 OR B4 PAPER AT CASSETTE OR TRAY

[TEST PRINT 1]

[CANCEL] 1218

PRINTING IS BEING PERFORMED

TEST PRINT 1

CANCEL 1218

PLACE OUTPUT TEST PRINT 1 WITH FACING IT TOWARD ORIGINAL SUPPORT PLATE AND KEEPING BLACK - BELT SIDE LEFT, AND THEN DEPRESS READING KEY

COVER TEST PRINT 1 WITH WHITE PAPER IN CASE OF OHP

BLACK BELT

READING

CANCEL 1218

FIG. 21A

CANCEL

REMOVE TEST PRINT 1 FROM ORIGINAL SUPPORT PLATE, AND OUTPUT TEST PRINT TO BE NEXT USED

TEST PRINT 2

FIG. 21B

CANCEL

PRINTING IS BEING PERFORMED

TEST PRINT 2

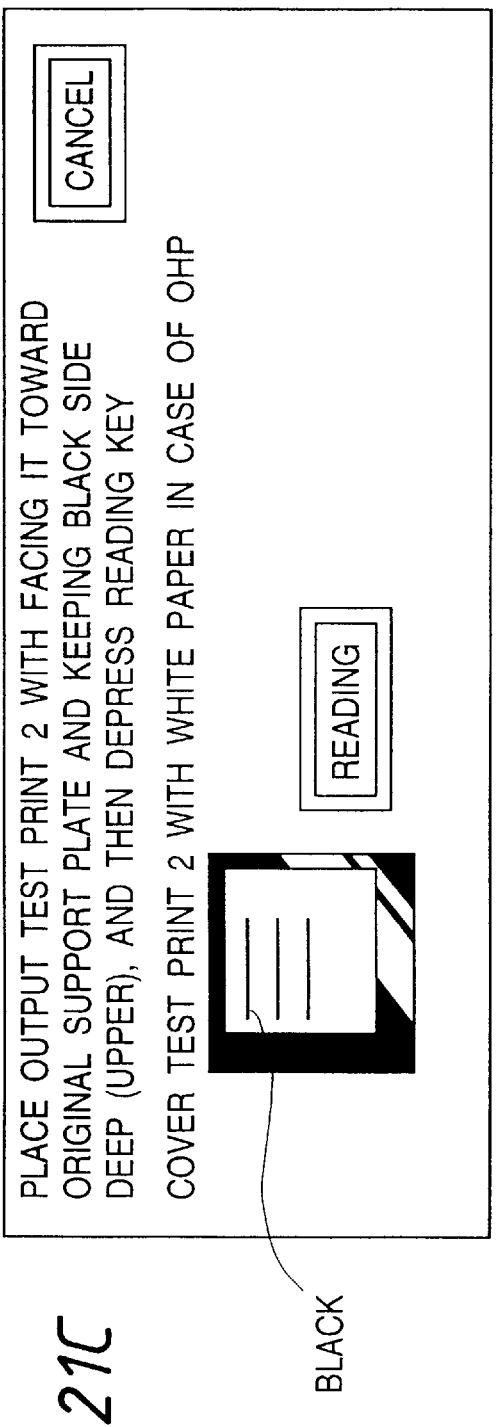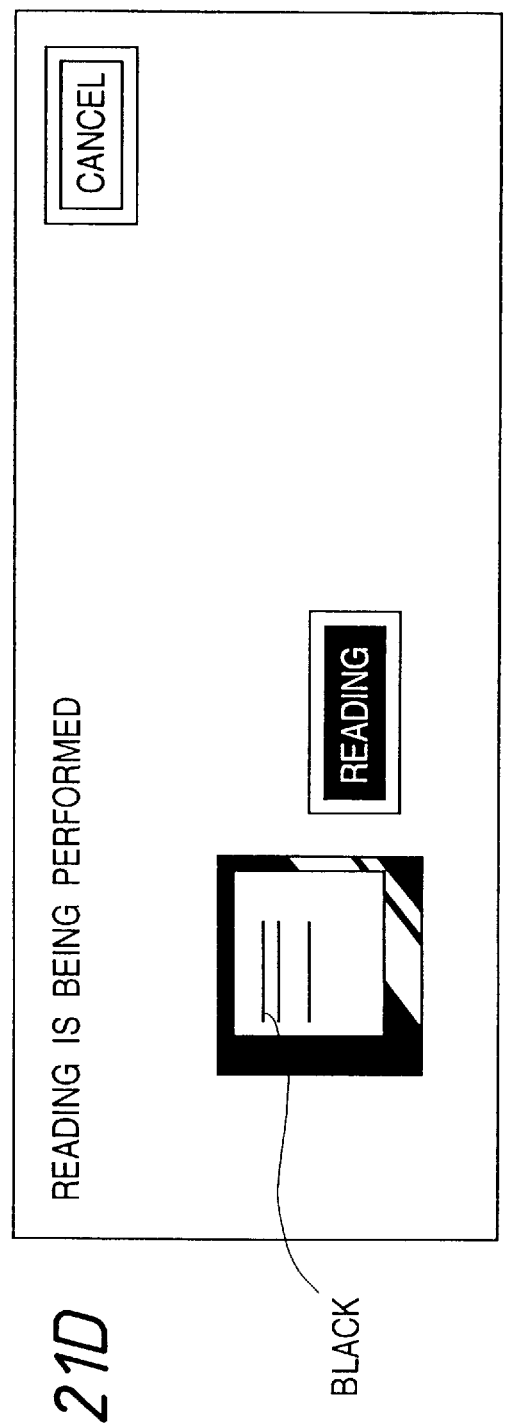

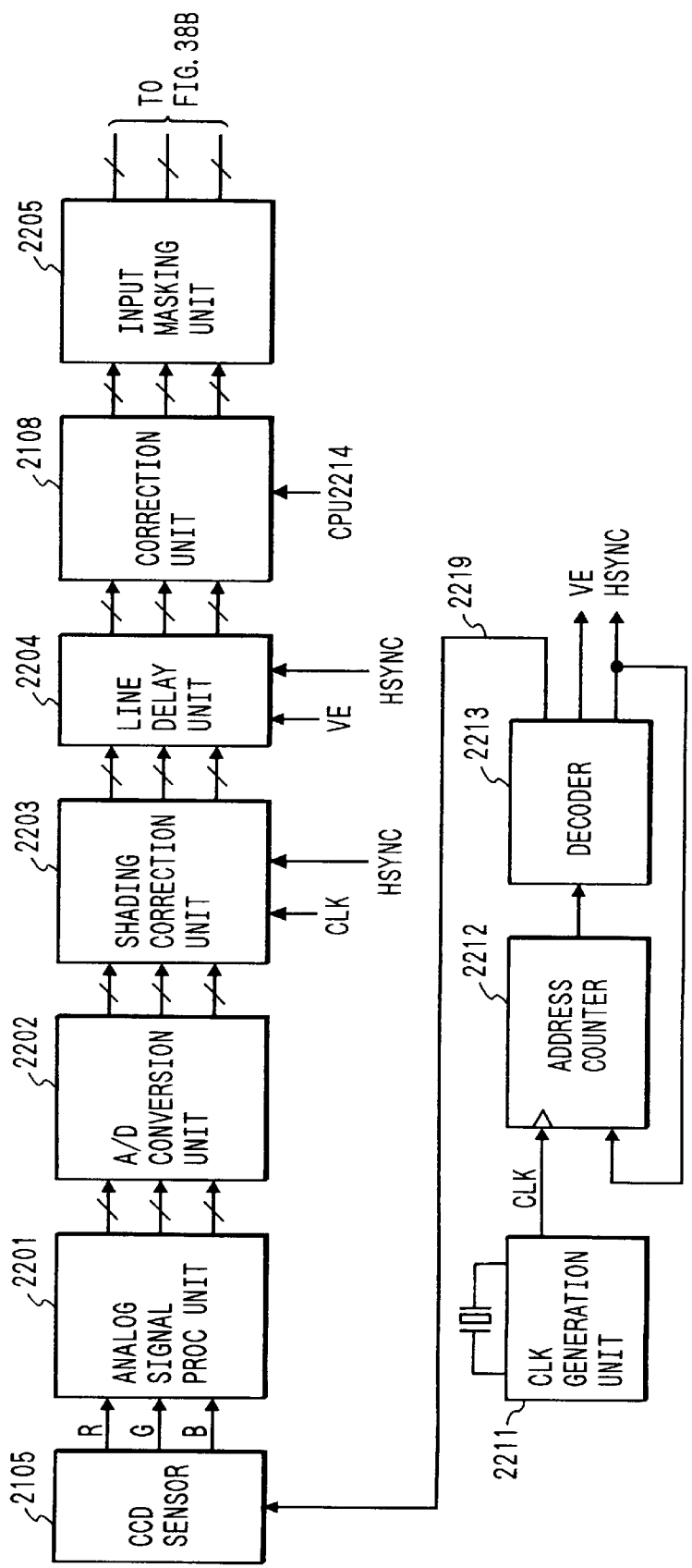

| SIGNAL VALUE OBTAINED BY STANDARD FILTER | ACTUALLY-OBTAINED SIGNAL VALUE |
| ---: | ---: |
| 5 | 12 |
| 10 | 17 |
| 20 | 27 |
| 30 | 37 |
| 50 | 56 |
| 100 | 105 |
| 150 | 154 |
| 230 | 233 |

| DENSITY VALUE OBTAINED BY STANDARD FILTER | ACTUALLY-OBTAINED DENSITY VALUE |
|---|---|
| 1.71 | 1.33 |
| 1.41 | 1.18 |
| 1.11 | 0.98 |
| 0.93 | 0.84 |
| 0.71 | 0.66 |
| 0.41 | 0.39 |
| 0.23 | 0.22 |
| 0.04 | 0.04 |

| SIGNAL VALUE OBTAINED BY STANDARD FILTER | ACTUALLY-OBTAINED SIGNAL VALUE | SIGNAL VALUE AFTER CORRECTION |
|---|---|---|
| 5 | 12 | 5 |
| 10 | 17 | 10 |
| 20 | 27 | 20 |
| 30 | 37 | 30 |
| 50 | 56 | 49 |
| 100 | 105 | 98 |
| 150 | 154 | 147 |
| 230 | 233 | 226 |

256-COLOR PATCH

IMAGE PROCESSING APPARATUS AND METHOD WITH GRADATION CHARACTERISTIC ADJUSTMENT

BACKGROUND OF THE INVENTION

1. Field of the Invention

The present invention relates to an image processing apparatus and method and, for example, to an image processing apparatus and method for correcting the gradation characteristics of a color image.

2. Related Background Art

A digital color copying machine has mechanisms for correcting the influence of ambient variations and variations caused by aging in a printer unit. As one of such mechanism, an automatic gradation correction function that uses an image scanner unit as a measurement device is known. The automatic gradation correction is performed by the following procedure.

(1) The printer unit prints out a test pattern having predetermined values of C, M, Y, and K colors.

(2) The image scanner unit reads the test pattern.

(3) The gradation characteristics of the printer unit are obtained based on the reading result of the test pattern, and a coefficient or table for correcting the obtained characteristics is calculated.

(4) The calculated coefficient or table is set in a printer gradation correction circuit.

With the above-mentioned automatic gradation correction, the gradation characteristics of the printer unit can be stabilized.

However, the above-mentioned technique suffers the following problem. That is, when a CMYK test pattern is read upon execution of the automatic gradation correction, errors caused by variations in color filters of a CCD may be generated. This problem will be explained in detail below.

FIG. 2A shows the spectral sensitivity characteristics of the R, G, and B channels of a so-called 3-line sensor. To obtain an image with good color reproducibility by faithfully reading a color image, the spectral sensitivity characteristics of the R, G, and B channels have overlapping portions, as shown in FIG. 2A, so as not to form non-detectable wavelength ranges. Therefore, signal processing must be performed under the assumption that the spectral sensitivity characteristics of the R, G, and B channels overlap each other to some extent.

FIG. 2B shows the spectral sensitivity characteristics of the B channel and the spectral reflection characteristics of the Y test pattern. Since the Y test pattern exhibits a high reflectance with respect to the wavelength ranges of the R and G channels, the density of the Y test pattern cannot be detected using the R or G channel, and hence, the density is detected using the B channel. However, when the spectral sensitivity characteristics of the B channel, i.e., the spectral transmission characteristics of the B color filter vary, as indicated by a broken curve, the density detection precision of the Y test pattern lowers due to the influence of the variation, and as a result, appropriate gradation correction is disturbed.

In another technique, N sets of known input signals An (print signals) are supplied to an image forming apparatus to form N sets of specific color patterns, luminance levels Bn of the formed patterns are read, and N sets of printer output signal values Cn are obtained based on the luminance levels Bn by, e.g., masking calculations. By adjusting image forming parameters such as masking parameters so that the N sets of input signals An roughly equal the output signals Cn, the stability of image quality is improved.

However, the above-mentioned technique suffers the following problem. That is, when image formation is repeated, toner turns into a powder and the toner powder becomes attached to carriers of a developing agent, resulting in a decrease in maximum density of a copied image. The decrease in maximum density narrows the color reproduction range. In this state, even when the image forming parameters such as masking coefficients are adjusted, a good image cannot be obtained. The deterioration of image quality due to deteriorated durability of the developing agent can be eliminated by exchanging the developing agent. However, when the developing agent is periodically exchanged in consideration of the deteriorated durability, the copy cost rises undesirably.

Also, in another technique, a specific pattern is formed on a recording medium in an image forming apparatus, the formed pattern is read to feed back the read data to the image forming condition such as γ correction, thereby improving the stability of the image quality.

However, the above-mentioned technique suffers the following problem. In a device for reading an image, when the characteristics of color separation filters in a CCD deviate from ideal spectral characteristics, different image signals are obtained even when a pattern formed on a single recording medium is read. Therefore, even when the image forming condition is calculated based on such image data, an optimal image output cannot often be obtained from the image forming apparatus.

As is conventionally known, in an image forming apparatus such as a copying machine, which comprises an image reading unit and a print unit for performing image formation on the basis of data read by the image reading unit, as one basic method for faithfully reproducing a read original image in a print out operation, the image processing condition is calibrated. For example, N sets of input signals An having known density values are input as print data, and the print unit forms specific patterns on a recording medium on the basis of the input signals. The patterns on the recording medium are read by the reading unit as luminance data, and the read data are subjected to image processing such as masking processing to obtain signal values Cn as print data. The image processing condition such as masking coefficients are calibrated by, e.g., a method of least square so that the signal values An roughly equal the obtained signal values Cn. With the above arrangement, a read image can be faithfully reproduced, and desired image quality can be obtained in the print out operation.

However, in the conventional image forming apparatus, the reading state and the print state of the reading unit and the print unit may vary even slightly upon calibration of the image processing condition. In particular, the print unit relatively easily causes such variation. For this reason, even when the image processing condition is calibrated, the calibration result depends on, e.g., the state of the print unit at the time of the calibration. Therefore, when the state upon execution of image formation in practice is different from that upon calibration, appropriate image processing is disturbed.

The above-mentioned variation in the image forming apparatus often appears as local spatial errors. That is, the reading state and the print state of the reading unit and the print unit are not uniform, and the reading state may vary in units of portions of, e.g., the reading unit. In this case, the calibrated image processing condition may become improper for a given image forming portion.

SUMMARY OF THE INVENTION

The present invention has been made to solve the above-mentioned problems and has as its object to provide an image processing apparatus and method, which can perform appropriate gradation correction for a color image.

An image processing apparatus according to the present invention comprises holding means for holding a value obtained by reading a color chart, a value of which is known, and correction means for correcting gradation characteristics of a plurality of color components on the basis of a value obtained by reading a pattern which consists of the plurality of color components for forming a color image and has a predetermined value, and the value held in the holding means.

Also, an image processing apparatus according to the present invention comprises reading means capable of reading a color image, output means for outputting a pattern which consists of a plurality of color components for forming a color image and has a predetermined value, holding means for holding a value obtained by reading a color chart, a value of which is known, by the reading means, and correction means for correcting gradation characteristics of the plurality of color components on the basis of a value obtained by reading the pattern output from the output means by the reading means, and the value held in the holding means.

It is another object of the present invention to provide an image recording apparatus and method which can obtain high image quality by adjusting a certain image forming parameter or parameters in consideration of a variation in image forming condition.

As one means for attaining the above object, the present invention comprises the following arrangement.

According to the present invention, an image recording apparatus for recording an image on a recording medium, comprises first feedback adjustment means for adjusting gradation characteristics, and second feedback adjustment means for adjusting color reproduction characteristics after the adjustment by the first feedback adjustment means.

According to the present invention, an image recording method for recording an image on a recording medium, comprises the step of adjusting gradation characteristics by a first feedback system and thereafter adjusting color reproduction characteristics by a second feedback system.

It is still another object of the present invention to provide an image recording apparatus and method, which can obtain an optimal image output by setting a certain image forming condition or conditions in consideration of the reading characteristics of an image.

It is still another object of the present invention to provide an image forming apparatus which can appropriately calibrate a certain image processing condition or conditions independently of a time or spatial variation of the apparatus.

In order to achieve the above object, there is provided an image forming apparatus for performing a print operation on a recording medium on the basis of data subjected to image processing, comprising image processing means for performing the image processing, print means for performing the print operation, print control means for controlling the print means to perform a plurality of print-out operations on the basis of identical print data, and condition setting means for calculating and setting an image processing condition of the image processing means on the basis of print results output from the print means under the control of the print control means, and the print data.

Also, there is provided an image forming apparatus for performing a print operation on a recording medium on the basis of data subjected to image processing, comprising image processing means for performing the image processing, print means for performing the print operation, error detection means for comparing a print result output from the print means on the basis of predetermined print data with the predetermined print data, and checking if an error not less than a predetermined value is present, print control means for, when the error detection means determines that an error not less than the predetermined value is present, controlling the print means to perform a print-out operation on the basis of print data in the neighborhood of print data, which caused the error, of the predetermined print data, and condition setting means for calculating and setting an image processing condition of the image processing means on the basis of a print result output from the print means under the control of the print control means, the print result output from the print means on the basis of the predetermined print data, and the predetermined print data.

Furthermore, there is provided an image forming apparatus for performing a print operation on a recording medium on the basis of data subjected to image processing, comprising image processing means for performing the image processing, print means for performing the print operation, error detection means for comparing a print result output from the print means on the basis of predetermined print data with the predetermined print data, and checking if an error not less than a predetermined value is present, and control means for, when the error detection means determines that an error not less than the predetermined value is present, interrupting the processing, and for, when the error detection means does not determine that an error not less than the predetermined value is present, calculating and setting an image processing condition of the image processing means on the basis of the comparison result.

Moreover, there is provided an image processing method, which comprises the steps of: outputting a test pattern by image output means on the basis of test pattern data; reading the output test pattern by image reading means and inputting the test pattern read data; and generating a processing parameter on the basis of the test pattern and the test pattern read data, the method further comprising the steps of: performing a plurality of test pattern output operations on the basis of the test pattern data; and generating the processing parameter on the basis of the test pattern read data obtained as a result of the plurality of test pattern output operations.

Other objects and features of the present invention will become apparent from the following description taken in conjunction with the accompanying drawings and the appended claims.

BRIEF DESCRIPTION OF THE DRAWINGS

FIG. 10 is a view for explaining a state wherein the test pattern reading filters are inserted into the optical path upon reading of gradation correction test patterns;

FIG. 17 is a flow chart showing the sequence of the image adjustment processing of the third embodiment;

FIG. 18 is a flow chart for explaining calibration of a printer unit using a reader unit according to the third embodiment;

FIG. 19A is a view showing an example of information and keys displayed on a display shown in FIGS. 12A and 12B;

FIG. 19B is a view showing an example of information and keys displayed on the display shown in FIGS. 12A and 12B;

FIG. 21A is a view showing an example of information and keys displayed on the display shown in FIGS. 12A and 12B;

FIG. 21B is a view showing an example of information and keys displayed on the display shown in FIGS. 12A and 12B;

FIG. 21C is a view showing an example of information and keys displayed on the display shown in FIGS. 12A and 12B;

FIG. 21D is a view showing an example of information and keys displayed on the display shown in FIGS. 12A and 12B;

DETAILED DESCRIPTION OF THE PREFERRED EMBODIMENTS

An image processing apparatus according to an embodiment of the present invention will be described in detail hereinafter with reference to the accompanying drawings. In the following description, a case will be exemplified wherein the present invention is applied to an image processing apparatus such as a digital color copying machine. However, the present invention is not limited to this, and may be applied to an image processing apparatus which performs gradation correction of a color image when a read color image is output to an output means such as a display, printer, or the like.

[First Embodiment]

Figure 1:
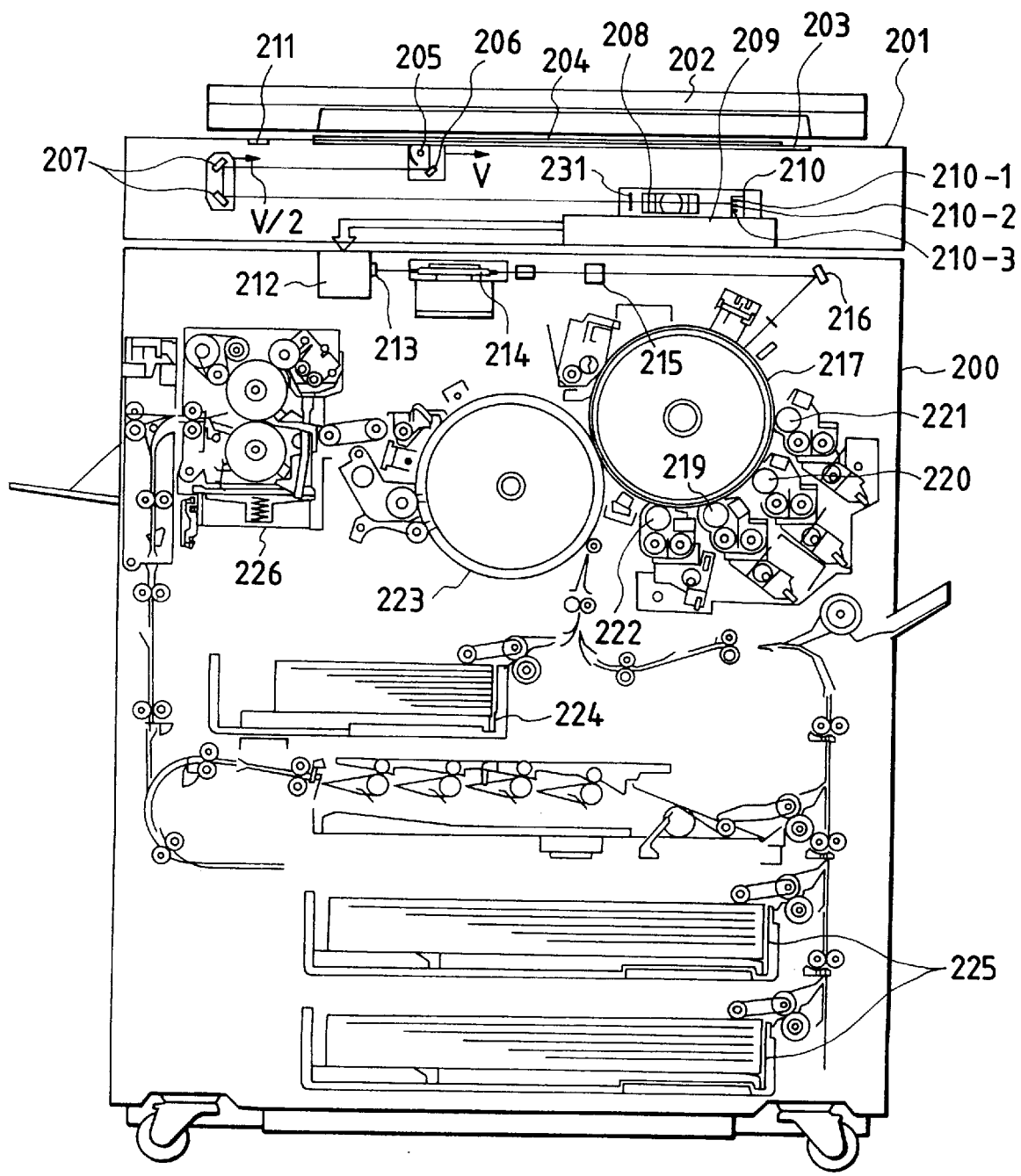
FIG. 1 is a sectional view showing the arrangement of a digital color copying machine according to the first embodiment of the present invention.
Figure 2A:
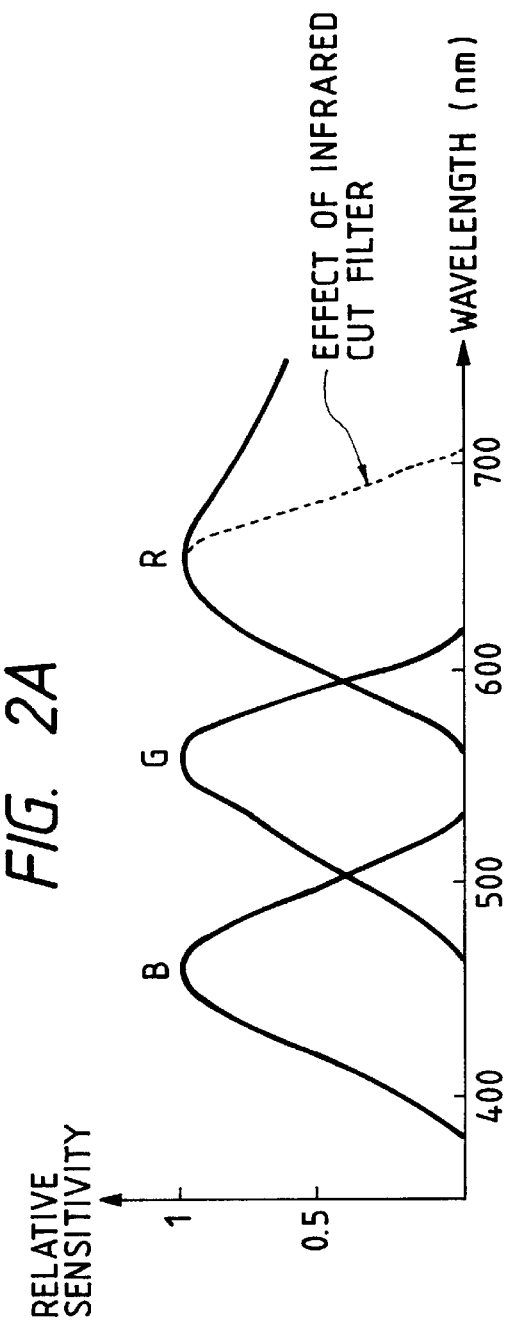
FIG. 2A is a graph showing the spectral sensitivity characteristics of the R, G, and B channels of a 3-line sensor.
Figure 2B:
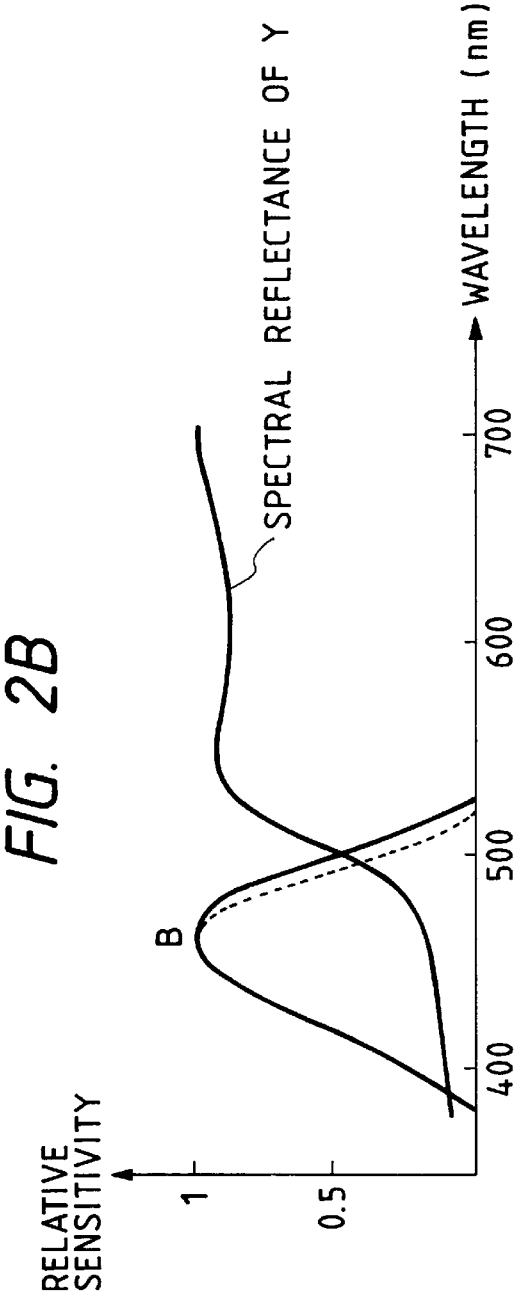
FIG. 2B is a graph showing the spectral sensitivity characteristics of the B channel and the spectral reflection characteristics of the Y test pattern.

FIG. 1 is a schematic sectional view showing the arrangement of a digital copying machine according to an embodiment of the present invention.

Referring to FIG. 1, an image scanner unit 201 reads an original image, and performs digital signal processing. A printer unit 200 prints a full-color image corresponding to the original image read by the image scanner unit 201 on a recording paper sheet.

In the image scanner unit 201, an original 204 placed between an original pressing plate 202 and an original support plate glass 203 is illuminated with light emitted by a halogen lamp 205, and light reflected by the original 204 is guided by mirrors 206 and 207 to form an image on a 3-line sensor 210 comprising a CCD via a lens 208. Note that the lens 208 has an infrared cut filter 231 for cutting infrared rays.

The 3-line sensor 210 color-separates the light reflected by the original 203, and supplies R, G, and B signals of full-color information to a signal processing unit 209. Each of sensor arrays for reading the respective color components of the 3-line sensor 210 consists of 5,000 pixels. With this sensor, the widthwise direction (297 mm) of an A3-size original 204 placed on the original support plate glass 203 can be read at a resolution of 400 dpi. R (red), G (green), and B (blue) filters are formed on the respective line sensors. Note that the halogen lamp 205 and the mirror 206 mechanically move at a speed v and the mirror 207 mechanically moves at a speed v/2 in a direction (sub scan direction) perpendicular to the electrical scan direction (main scan direction) of the 3-line sensor 210, thereby scanning the entire surface of the original 204.

A standard white plate 211 is used for generating data for correcting the R, G, and B data read by the 3-line sensor 210, and exhibits substantially uniform reflection characteristics for visible light.

The signal processing unit 209 includes a CPU for controlling an image reading operation, processes input analog R, G, and B signals to separate them into M, C, Y, and K color component signals, and supplies these color component signals to the printer unit 200. In this case, since the signal processing unit 209 supplies one of the M, C, Y, and K color component signals per original scan of the image scanner unit 201 to the printer unit 200, a single print out operation is completed by a total of four original scans.

An image signal output from the signal processing unit 209 is input to a laser driver 212. The laser driver 212 modulates and drives a semiconductor laser element 213 in accordance with the input image signal. A laser beam output from the semiconductor laser element 213 scans the surface of a photosensitive drum 217 via a polygonal mirror 214, an f-θ lens 215, and a mirror 216, thereby forming an electrostatic latent image on the surface of the photosensitive drum 217. Magenta, cyan, yellow, and black developers 219, 220, 221, and 222 alternately contact the photosensitive drum 217 to develop the latent image formed on the surface of the photosensitive drum 217 with corresponding toners. Each developed toner image is transferred onto a recording paper sheet which is fed from a recording paper cassette 224 or 225 and wound around a transfer drum 223.

In this manner, four color toner images, i.e., M, C, Y, and K toner images are sequentially transferred onto the recording paper sheet and are fixed by a fixing unit 226. Thereafter, the recording paper sheet is discharged outside the apparatus.

Figure 3B:
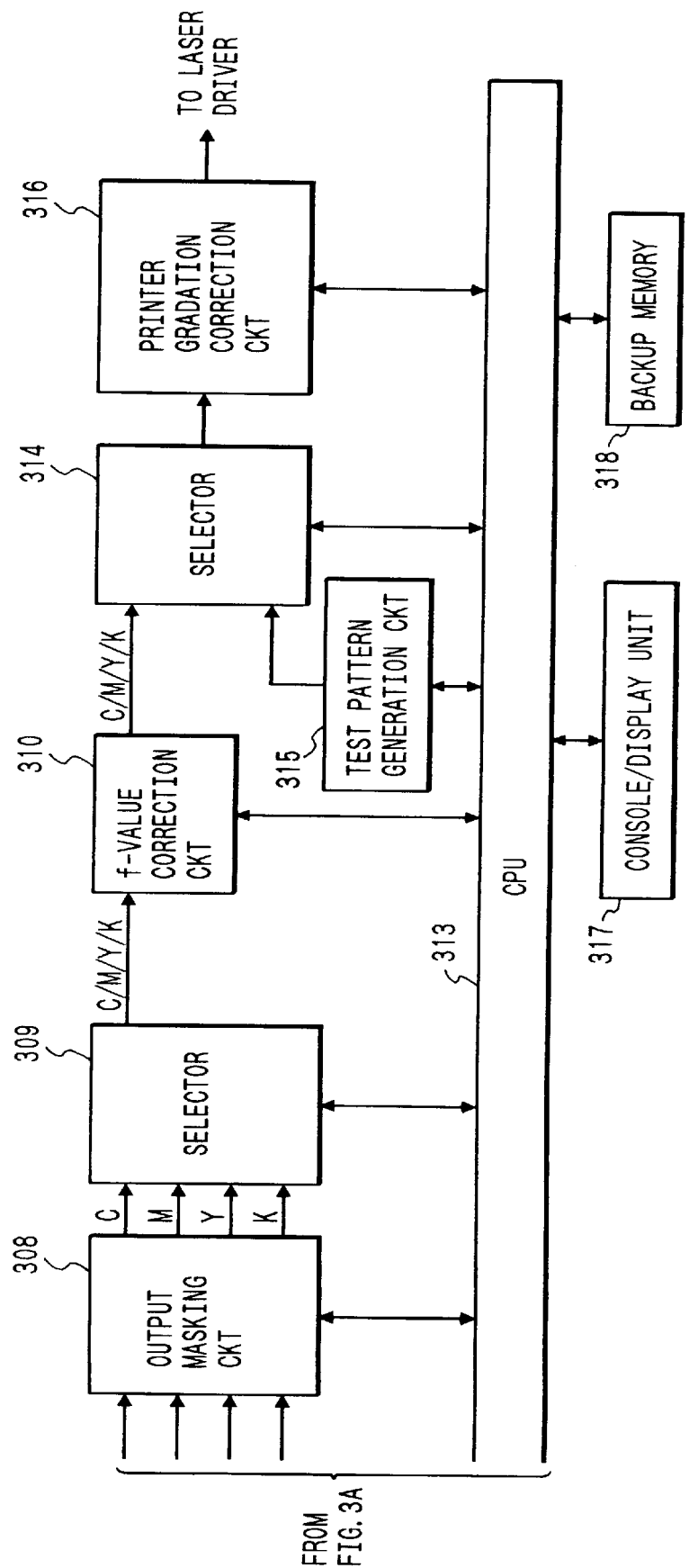
FIG. 3 which is composed of FIGS. 3A and 3B is a block diagram showing the arrangement of an image processing unit of an image processing apparatus according to the first embodiment of the present invention.

FIGS. 3A and 3B are block diagrams showing the arrangement of an image processing unit of the image processing apparatus according to the embodiment of the present invention. This image processing unit converts R, G, and B image signals output from the CCD into, e.g., signals to be supplied to the laser driver of the printer unit.

Referring to FIGS. 3A and 3B, a CPU 313 comprises, e.g., a one-chip microcomputer, and controls the entire apparatus of this embodiment in accordance with programs pre-stored in its internal ROM.

A color CCD linear image sensor (to be referred to as a "CCD" hereinafter) 301 comprises R, G, and B 3-line CCD sensors. The CCD 301 reads an original image, and outputs R, G, and B image signals. An A/D converter 302 converts analog image signals output from the CCD 301 into digital image signals. A shading correction circuit 303 corrects light amount nonuniformity generated in a reading optical system and included in the image signals output from the A/D converter 302, and sensitivity nonuniformity of the CCD 301 using shading correction coefficients stored in a correction memory 311. A pixel aberration correction circuit 304 corrects the reading position shift (or aberration) included in the image signals output from the shading correction circuit 303. Note that the reading position shift is caused since the R, G, and B lines of the CCD 301 are aligned in the sub scan direction. An input masking circuit 305 performs matrix calculations of the image signals output from the pixel aberration correction circuit 304 to correct the color tones of the R, G, and B signals. A memory 312 is used by the CPU 313 to monitor the outputs from the input masking circuit 305.

A LOG conversion circuit 306 converts R, G, and B image signals of luminance information output from the input masking circuit 305 into C, M, and Y image signals of density information by means of, e.g., table conversion. A black extraction circuit 307 extracts a black component by calculating, e.g., a minimum value of C, M, and Y image signals output from the LOG conversion circuit 306. An output masking circuit 308 performs matrix calculations of the C, M, Y, and K image signals output from the black extraction circuit 307 to correct the color tones of the C, M, Y, and K image signals. A selector 309 selects one of the C, M, Y, and K image signals output from the output masking circuit 308 in correspondence with the formation order of color component images of the printer unit, thereby frame-sequentially outputting color component image signals.

An f-value correction circuit 310 corrects the color component image signal selected by the selector 309 on the basis of the density reproduction characteristics of the printer unit by means of, e.g., table conversion. A selector 314 receives the image signal output from the f-value correction circuit 310 and an image signal output from a test pattern generation circuit 315, and selects and outputs one of these input signals. A printer gradation correction circuit 316 corrects the image signal output from the selector 314 on the basis of the gradation characteristics of the printer unit by means of, e.g., table conversion.

A console/display unit 317 comprises a display unit such as an LCD and an input unit including a keyboard, touch panel, and the like. With this unit 317, an operator inputs an operation instruction or condition of the apparatus, and the CPU 313 displays the operation state or condition of the apparatus. A backup memory 318 comprises a battery backed-up DRAM or SRAM, and stores the set operation conditions and image processing parameters of the apparatus.

Figure 4:
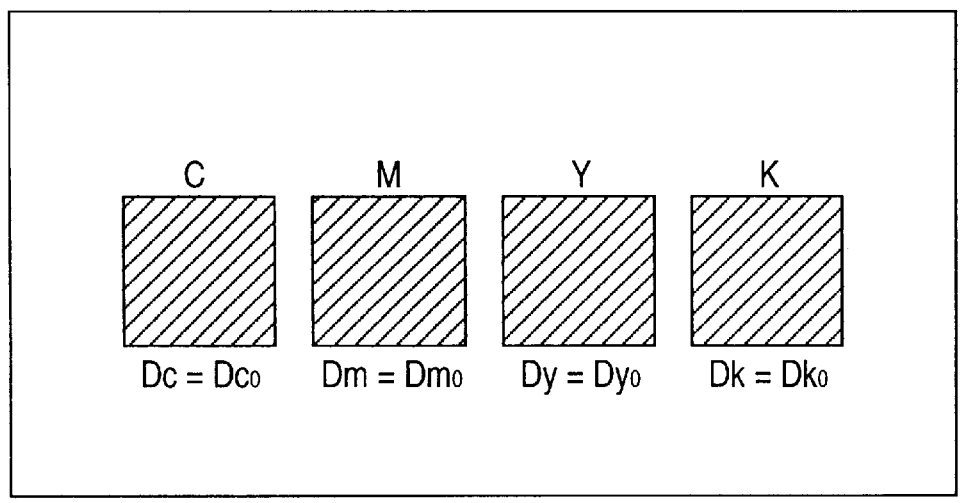
FIG. 4 is a view showing an example of a CMYK standard color chart.

FIG. 4 shows an example of a CMYK standard color chart. In this embodiment, upon execution of automatic gradation correction of the printer unit, the reading precision of the reader unit is corrected on the basis of the value of this color chart read by the reader unit. The density values of the respective color components on the color chart shown in FIG. 4 are measured in advance or the color chart is created so that the respective color components have predetermined density values. Let Dco, Dmo, Dyo, and Dko be the densities of the respective color components. Since these values are input by the operator from the console/display unit 317 or are pre-stored in the backup memory 318, the CPU 313 can recognize the density values of the respective color components of the color chart.

Figure 5:
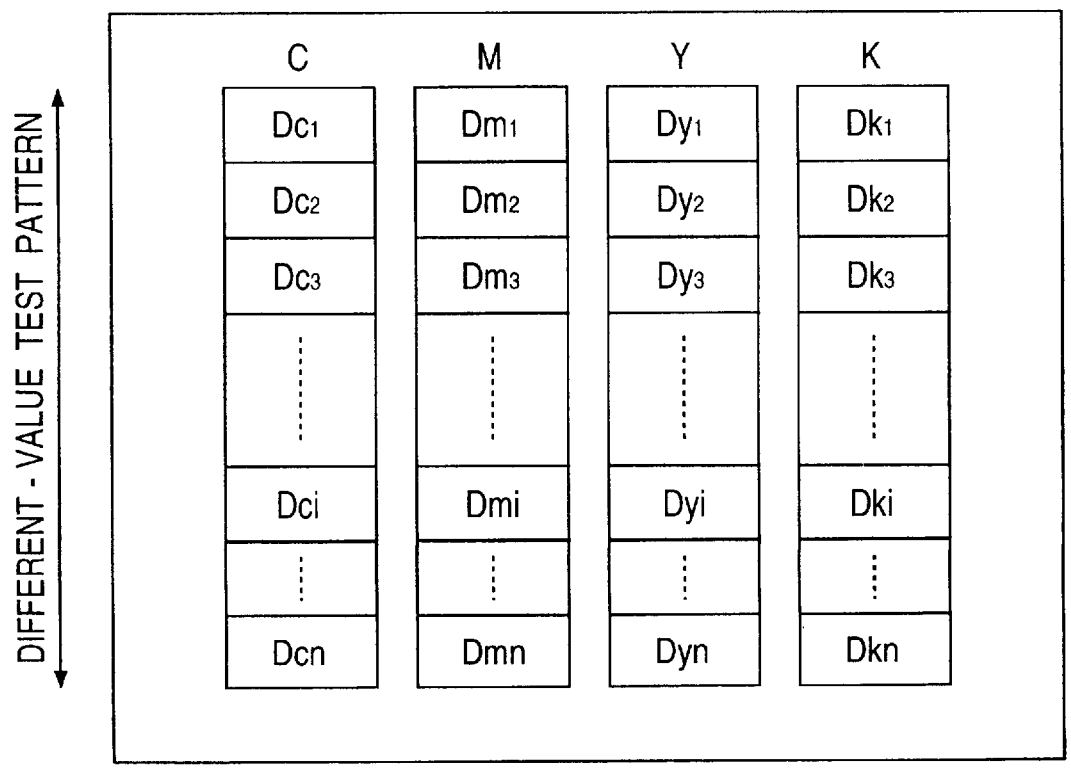
FIG. 5 is a view showing an example of a test pattern used for correcting the printer gradation characteristics.

FIG. 5 shows an example of a printer gradation correction test pattern. This test pattern is a color pattern which has a plurality of density values (D1 to Dn) for each of the C, M, Y, and K color components, and is generated by the test pattern generation circuit 315.

When the automatic gradation correction is performed in this embodiment, the CPU 313 controls the reader unit to read the color chart and the test pattern shown in FIGS. 4 and 5, and calculates correction values to be set in the printer gradation correction circuit 316 on the basis of the read results. Correction of the C color component will be exemplified below.

While the input masking processing is disabled (set in a through state), R, G, and B values obtained by reading a C color portion (density Dco) of the color chart shown in FIG. 4 are respectively represented by Rco, Gco, and Bco, and R, G, and B values obtained by reading a C color portion (density Dci) with a density Di of the test pattern shown in FIG. 5 are respectively represented by Rci, Gci, and Bci. When the C color component is to be corrected, the density is measured using the R signal. For this reason, for example, the table contents of the printer gradation correction circuit 316 are changed to output the C color component signal with a value given by equation (1) below when the C color component signal having the density Dci is input, thereby correcting the gradation characteristics of the printer unit.

$$Dci^* = Dco \times \log(Rci/Rco) \qquad (1)$$

Since it is nonsense to perform the calculation given by equation (1) for all the densities (e.g., 255 gradation levels), some representative density values Dci are set, density correction values Dci* are calculated for the set density values Dci, and density correction values between adjacent representative density values are calculated by interpolation processing in practice.

Figure 6:
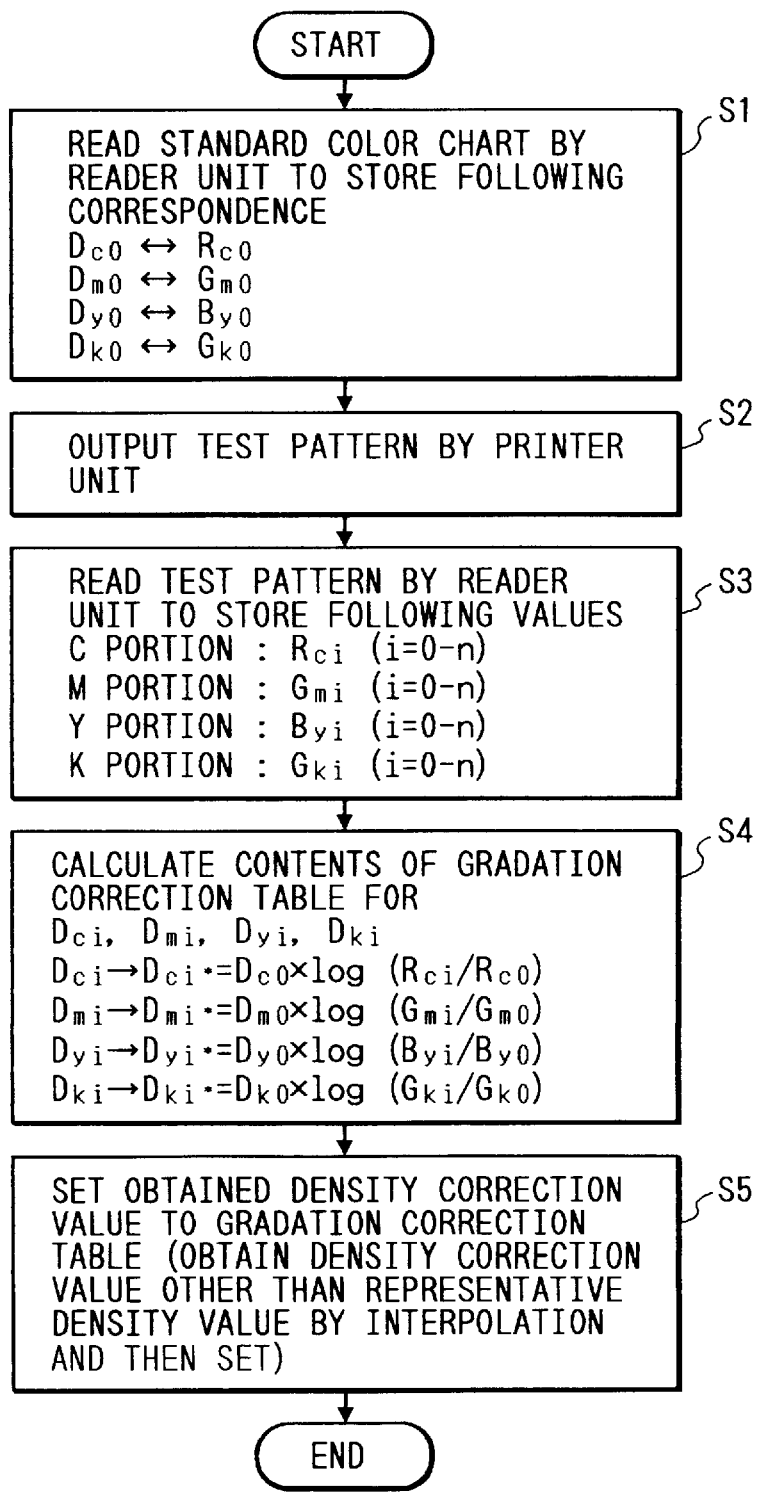
FIG. 6 is a flow chart showing an example of the sequence of the gradation correction processing.

FIG. 6 is a flow chart showing an example of the sequence of the gradation correction processing. This sequence is executed by the CPU 313.

In step S1, the standard color chart shown in FIG. 4 is read by the reader unit, and the read data are stored in, e.g., an internal work RAM of the CPU 313 to have the following correspondences.

Dco ↔ Rco

Dmo ↔ Gmo

Dyo ↔ Byo

Dko ↔ Gko

In step S2, the printer unit outputs the test pattern shown in FIG. 5. In step S3, the reader unit reads the output test pattern and stores the following data.

C portion: Rci (i=0 to n)

M portion: Gmi (i=0 to n)

Y portion: Byi (i=0 to n)

K portion: Gki (i=0 to n)

In step S4, density correction values are calculated using the following equations:

$$Dci^* = Dco \times \log(Rci/Rco)$$
$$Dmi^* = Dmo \times \log(Gmi/Gmo) \qquad (2)$$
$$Dyi^* = Dyo \times \log(Byi/Byo)$$
$$Dki^* = Dko \times \log(Gki/Gko)$$

In step S5, the obtained density correction values are set in a gradation correction table, and density correction values other than representative density values are calculated by interpolation and are set in the table, thus ending the processing.

Note that the order of "read standard color chart", "output test pattern", and "read test pattern" shown in FIG. 6 is not limited to this. These steps may be executed in the order of "output test pattern", "read test pattern", and "read standard color chart", or in the order of "output test pattern", "read standard color chart", and "read test pattern".

As described above, according to this embodiment, in the processing for correcting the gradation characteristics of the printer unit, since a decrease in reading precision of the test pattern caused by a variation of the spectral sensitivity characteristics of the R, G, and B channels of the CCD, i.e., a variation of the spectral characteristics of the color filters can be corrected by comparison with the standard color chart, the gradation correction of the printer unit can be appropriately performed.

Figure 7:
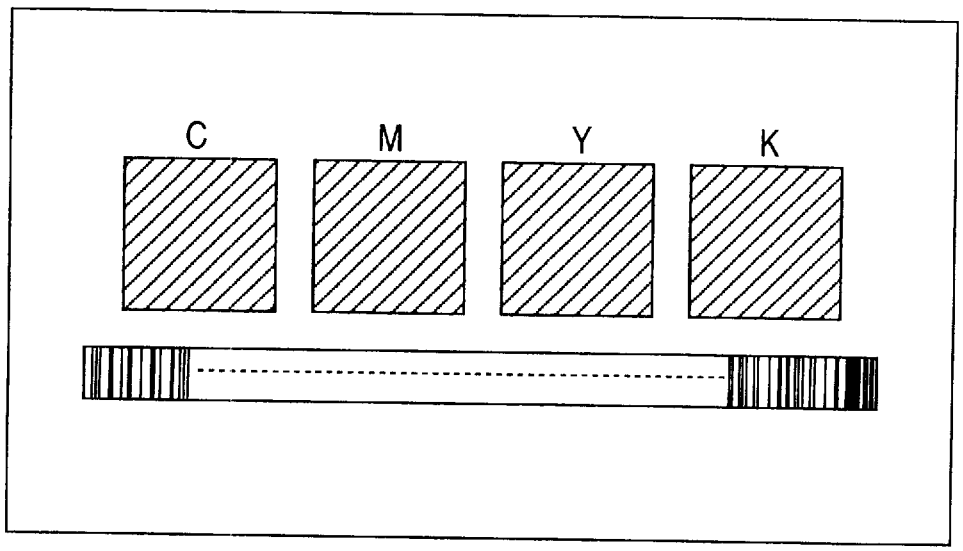
FIG. 7 is a view showing another example of a CMYK standard color chart.

In the above description, the density values of the standard color chart are input from the console/display unit 317 or are pre-stored in the backup memory 318. Alternatively, as shown in FIG. 7, information corresponding to the density values or densities of the respective color components may be recorded on the chart in the form of a bar code pattern. In this manner, since the density values or the like of the respective color components can be obtained from the bar code pattern upon reading the standard color chart, an operation for setting the density values of the standard color chart can be omitted, and a setting error can also be prevented. The recording format of the information is not limited to the bar code pattern. For example, numerical values on the chart may be recognized by character recognition processing.

[Second Embodiment]

An image processing apparatus according to the second embodiment of the present invention will be described below. In the second embodiment, the same reference numerals denote substantially the same parts as in the first embodiment, and a detailed description thereof will be omitted.

Figure 8:
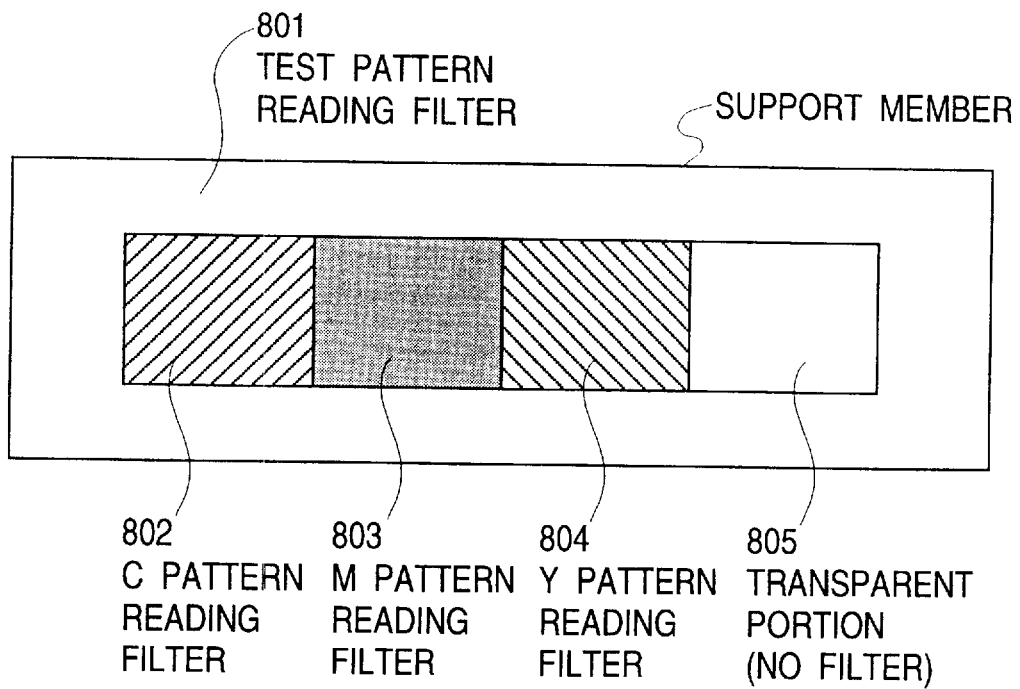
FIG. 8 is a view showing an example of a test pattern reading filter used upon correction of the printer gradation characteristics according to the second embodiment of the present invention.
Figure 9A:
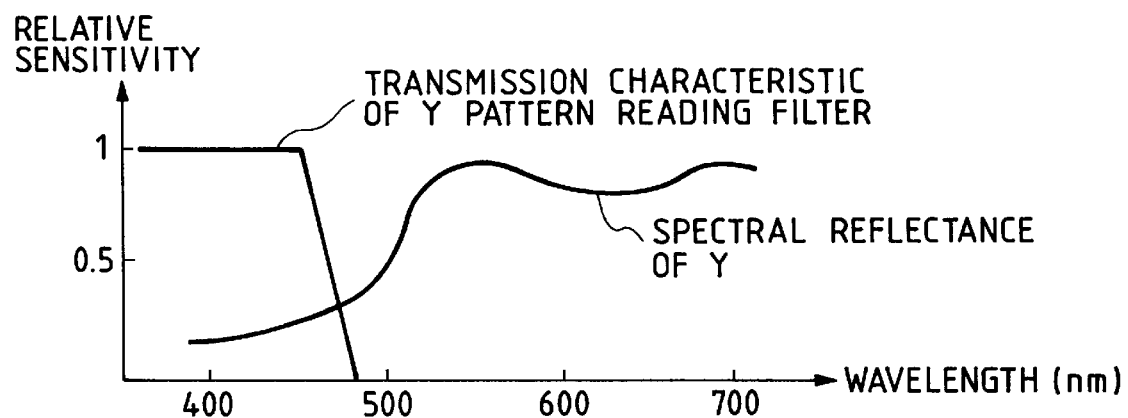
FIG. 9A is a graph showing the spectral transmission characteristics of one filter shown in FIG. 8.
Figure 9B:
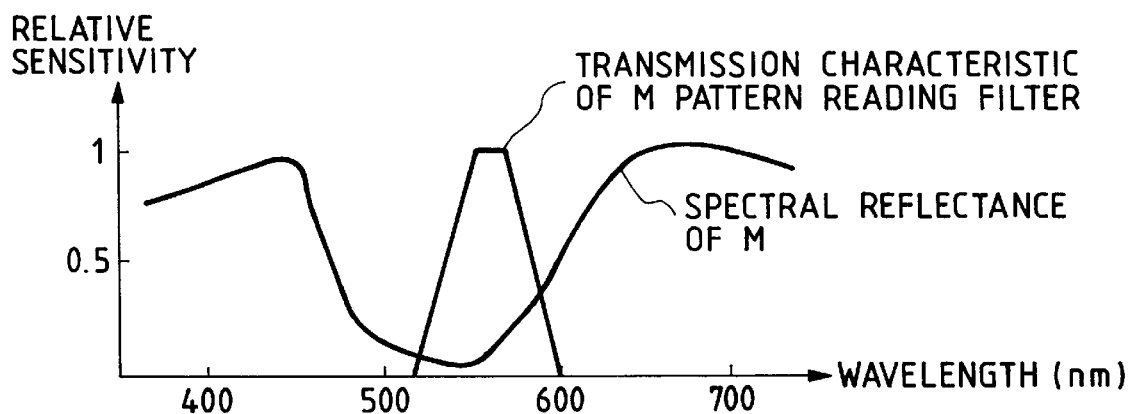
FIG. 9B is a graph showing the spectral transmission characteristics of another filter shown in FIG. 8.
Figure 9C:
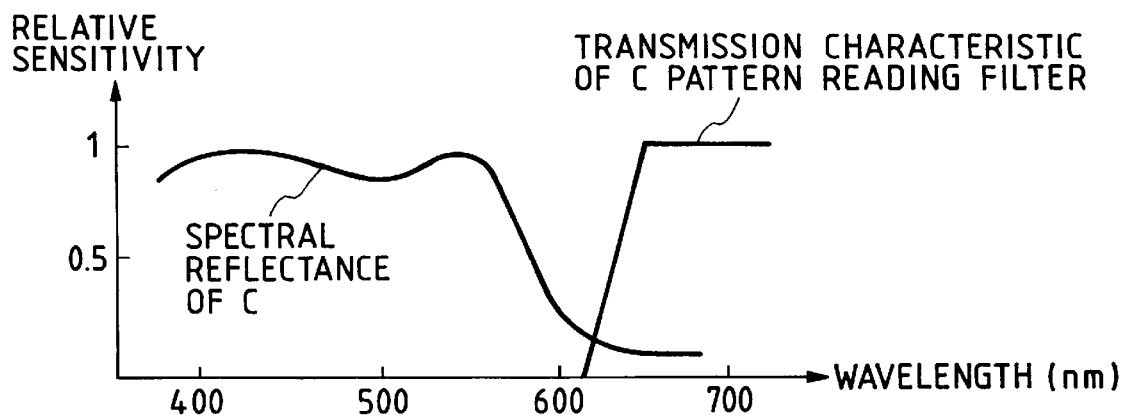
FIG. 9C is a graph showing the spectral transmission characteristics of still another filter shown in FIG. 8.

FIG. 8 shows an example of a test pattern reading filter 801 used in gradation correction of the printer unit. The filter 801 has a C pattern reading filter 802, an M pattern reading filter 803, a Y pattern reading filter 804, and a transparent portion 805 without any filters. FIGS. 9A to 9C show the spectral transmission characteristics of these filters. The spectral transmission characteristics of the respective filters are combined so as to remove overlapping portions of the spectral sensitivity characteristics of the R, G, and B channels of the CCD, i.e., the wavelength ranges where the transmission characteristics of the R, G, and B color filters are superposed on each other.

Upon reading a gradation correction test pattern 901, as shown in, e.g., FIG. 10, the test pattern reading filter 801 is inserted into the optical path by a moving means (not shown) to apparently narrow down the wavelength ranges where the R, G, and B channels of the CCD 210 respective have sensitivities, thereby eliminating a reading error caused by a variation of the spectral sensitivity characteristics. In this case, as shown in FIGS. 9A to 9C, in the transmission wavelength range of the test pattern reading filter 801, the spectral reflectance of the corresponding color component is low, and the transmission wavelength range is narrowed. As a result, the amount of light input to the CCD 210 decreases. In order to compensate for the decrease in amount of light, the amount of light to be irradiated or the gain of a signal output from the CCD 210 is increased as compared to that in a normal processing mode.

Alternatively, upon reading the test pattern, the test pattern reading filter 801 may be placed on the original support plate glass 203 and the test pattern 901 may be placed thereon, thus obtaining the same effect as above.

As described above, according to this embodiment, in the processing for correcting the gradation characteristics of the printer unit, a decrease in reading precision of the test pattern caused by a variation of the spectral sensitivity characteristics of the R, G, and B channels of the CCD, i.e., a variation of the spectral transmission characteristics of the color filters can be suppressed by inserting only the filter for correcting the spectral sensitivity characteristics of the CCD into the optical path of the reader unit during only the correction processing, thereby appropriately attaining gradation correction of the printer unit.

As described above, according to the above-mentioned embodiments, an image processing apparatus and method, which can appropriately perform gradation correction of a color image, can be provided.

[Third Embodiment]

An outline of a full-color image forming method will be explained below.

Figure 11:
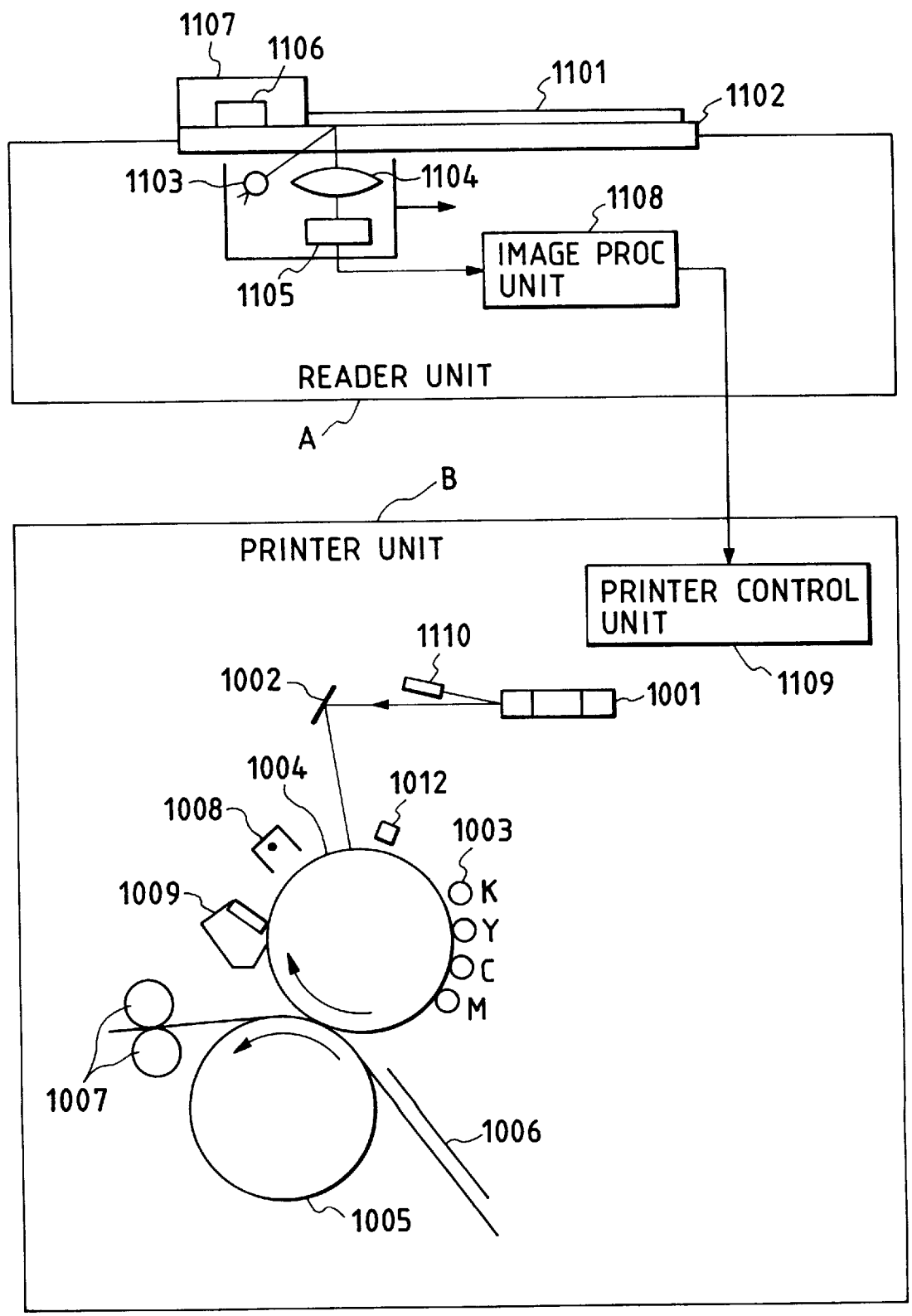
FIG. 11 is a schematic view showing the arrangement of an image recording apparatus according to the third embodiment of the present invention.

FIG. 11 is a block diagram showing the arrangement of an image recording apparatus according to the third embodiment of the present invention. The apparatus is constituted by a reader unit A and a printer unit B.

An original 1101 placed on an original support table glass 1102 of the reader unit A is illuminated with light emitted by a light source 1103. Light reflected by the original 1101 forms an image on a CCD sensor 1105 via an optical system 1104. The CCD sensor 1105 generates red, green, and blue color component signals in units of red, green, and blue line sensors which are arranged in three arrays. A reading optical system unit including the above-mentioned components is scanned in a direction indicated by an arrow in FIG. 11, thereby converting an original image into electrical signal data strings in units of lines.

On the original support table glass 1102, a positioning member 1107 which contacts one side of the original 1101 to prevent the original 1101 from being set with a ramp, and a reference white plate 1106 which determines the white level of the CCD sensor 1105 and is used for shading correction in the thrust (array) direction of the CCD sensor 1105 are arranged.

The image signals output from the CCD sensor 1105 are subjected to image processing in an image processing unit 1108, and thereafter, the processed signals are input to a printer control unit 1109 in the printer unit B.

Figure 12:
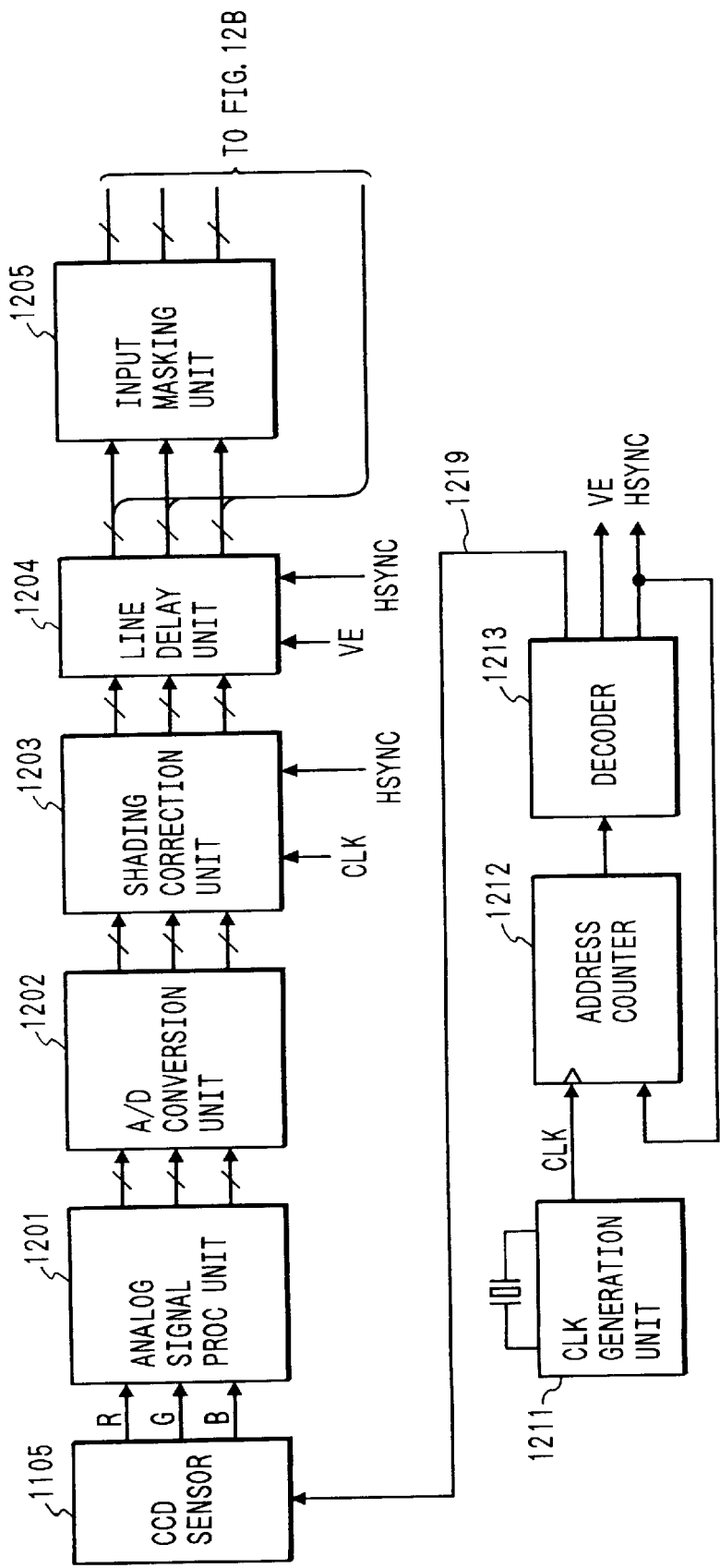
FIG. 12 which is composed of FIGS. 12A and 12B is a block diagram showing the arrangement of an image processing unit shown in FIG. 11.
Figure 12B:
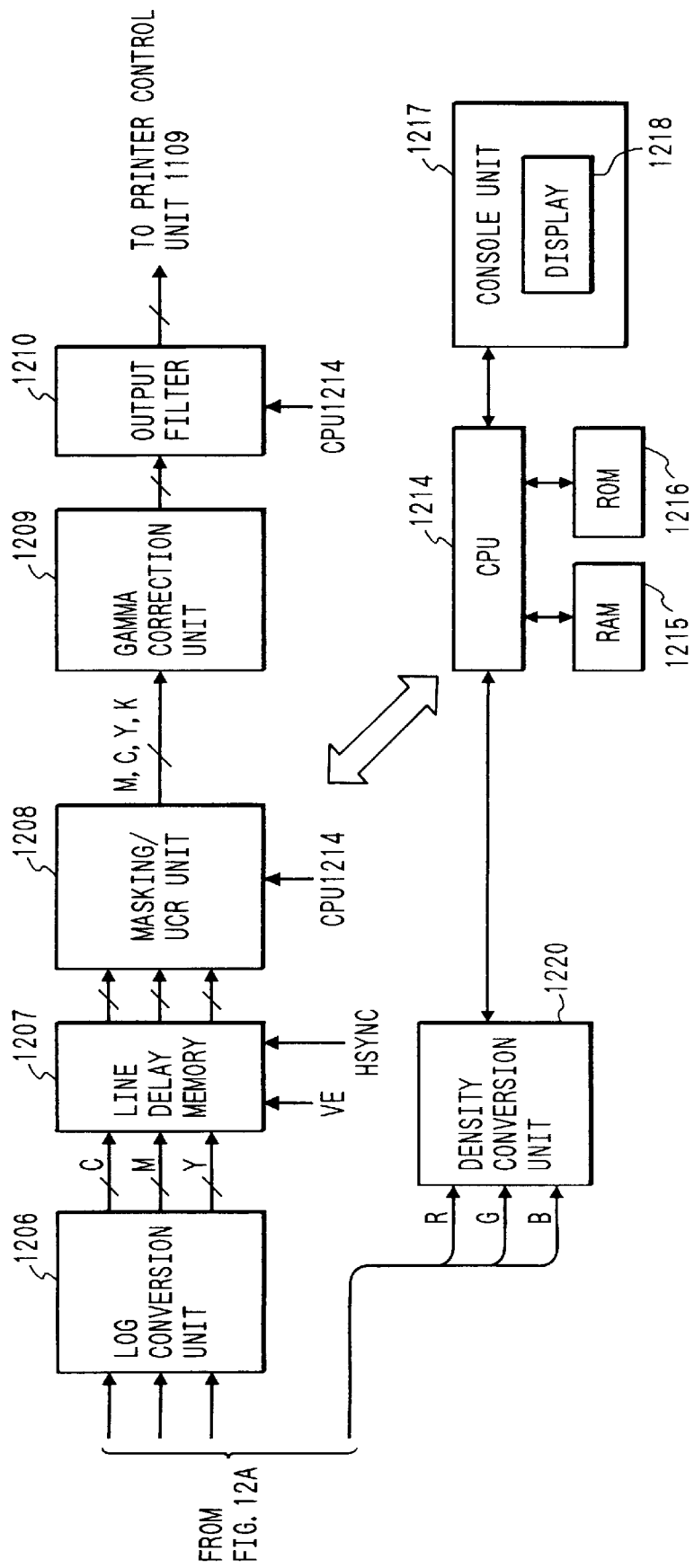

FIGS. 12A and 12B are block diagrams showing the arrangement of the image processing unit 1108.

Referring to FIGS. 12A and 12B, a CPU 1214 controls the entire reader unit A including the following units in accordance with programs pre-stored in a ROM 1216 and the like. A RAM 1215 is used as a work area of the CPU 1214, and the ROM 1216 stores image processing parameters and the like in addition to the control programs. A console unit 1217 has a keyboard and a touch panel, and a display 1218 such as an LCD. With the unit 1217, an instruction input by an operator is supplied to the CPU 1214, and the CPU 1214 displays the operation condition and state of the apparatus.

An address counter 1212 counts clocks CLK in units of pixels generated by a clock generation unit 1211, and outputs main scan address signals indicating the pixel addresses for one line. A decoder 1213 decodes the main scan address signals output from the address counter 1212, and generates a signal 1219 such as a shift pulse, reset pulse, or the like for driving the CCD sensor 1105 in units of lines, a signal VE indicating an effective region in a signal for one line output from the CCD sensor 1105, a line synchronization signal HSYNC, and the like. Note that in response to the signal HSYNC, the address counter 1212 is cleared and starts the count operation of main scan addresses of the next line.

The image signals output from the CCD sensor 1105 are input to an analog signal processing unit 1201, and are subjected to gain and offset adjustment operations. Thereafter, the image signals are converted by an A/D conversion unit 1202 into 8-bit R, G, and B digital signals in units of color components. The digital signals are subjected to known shading correction in units of colors using a signal obtained by reading the reference white plate 1106 in a shading correction unit 1203.

A line delay unit 1204 corrects spatial shifts included in the image signals output from the shading correction unit 1203. The spatial shifts are generated since the line sensors of the CCD sensor 1105 are arranged in the sub scan direction to be separated from each other by predetermined distances. More specifically, the R and G color component signals are line-delayed in the sub scan direction with reference to the B color component signal, thereby locking the phases of the three color component signals.

An input masking unit 1205 converts the color space of the image signals output from the line delay unit 1204 into an NTSC standard color space by matrix calculations given by equation (1') below. More specifically, the color space of the respective color component signals output from the CCD line sensor 1105 is determined by the spectral characteristics of the filters of the respective color components, and is converted into the NTSC standard color space.

$$\begin{bmatrix} Ro \\ Go \\ Bo \end{bmatrix} = \begin{bmatrix} a11 & a12 & a13 \\ a21 & a22 & a23 \\ a31 & a32 & a33 \end{bmatrix} \begin{bmatrix} Ri \\ Gi \\ Bi \end{bmatrix} \quad (1')$$

where Ro, Go, Bo: output image signals

Ri, Gi, Bi: input image signals

A LOG conversion unit 1206 is constituted by a look-up table comprising, e.g., a ROM, and converts the R, G, and B luminance signals output from the input masking unit 1205 into C, M, and Y density signals. A line delay memory 1207 delays the image signals output from the LOG conversion unit 1206 by a period (line delay) required for a black character discrimination unit (not shown) to generate control signals UCR, FILTER, SEN, and the like on the basis of the outputs from the input masking unit 1205.

A masking/UCR unit 1208 generates a black component signal K on the basis of a minimum value min(M, C, Y) of the image signals output from the line delay memory 1207. The unit 1208 also performs masking processing for optimizing matching among the spectral characteristics of color toners, those of the CCD used in the reading optical system, and those of the color separation filters by matrix calculations given by an equation given below, and outputs, e.g., 8-bit color component image signals in the order of M, C, Y, and K in units of reading operations of the reader unit A. Note that matrix coefficients b11 to b44 used in the matrix calculations are set by the CPU 1214.

$$\begin{bmatrix} Mo \\ Co \\ Yo \\ Ko \end{bmatrix} = \begin{bmatrix} b11 & b12 & b13 & b14 \\ b21 & b22 & b23 & b24 \\ b31 & b32 & b33 & b34 \\ b41 & b42 & b43 & b44 \end{bmatrix} \begin{bmatrix} Mi \\ Ci \\ Yi \\ Ki \end{bmatrix} \quad (2')$$

where Mo, Co, Yo, Ko: output image signals

Mi, Ci, Yi: input image signals

Ki=min(Mi, Ci, Yi)

A gamma correction unit 1209 performs density correction of the image signals output from the masking/UCR unit 1208 so as to match the image signals with ideal gradation characteristics of the printer unit B. An output filter (spatial filter processing unit) 1210 performs edge emphasis or smoothing processing for the image signals output from the gamma correction unit 1209 in accordance with a control signal from the CPU 1214.

A density conversion unit 1220 converts the R, G, and B image signals output from the line delay unit 1204 into optical densities, as will be described in detail later.

The processed frame-sequential M, C, Y, and K color component image signals are supplied to the printer unit B, and are subjected to PWM density recording.

Figure 13:
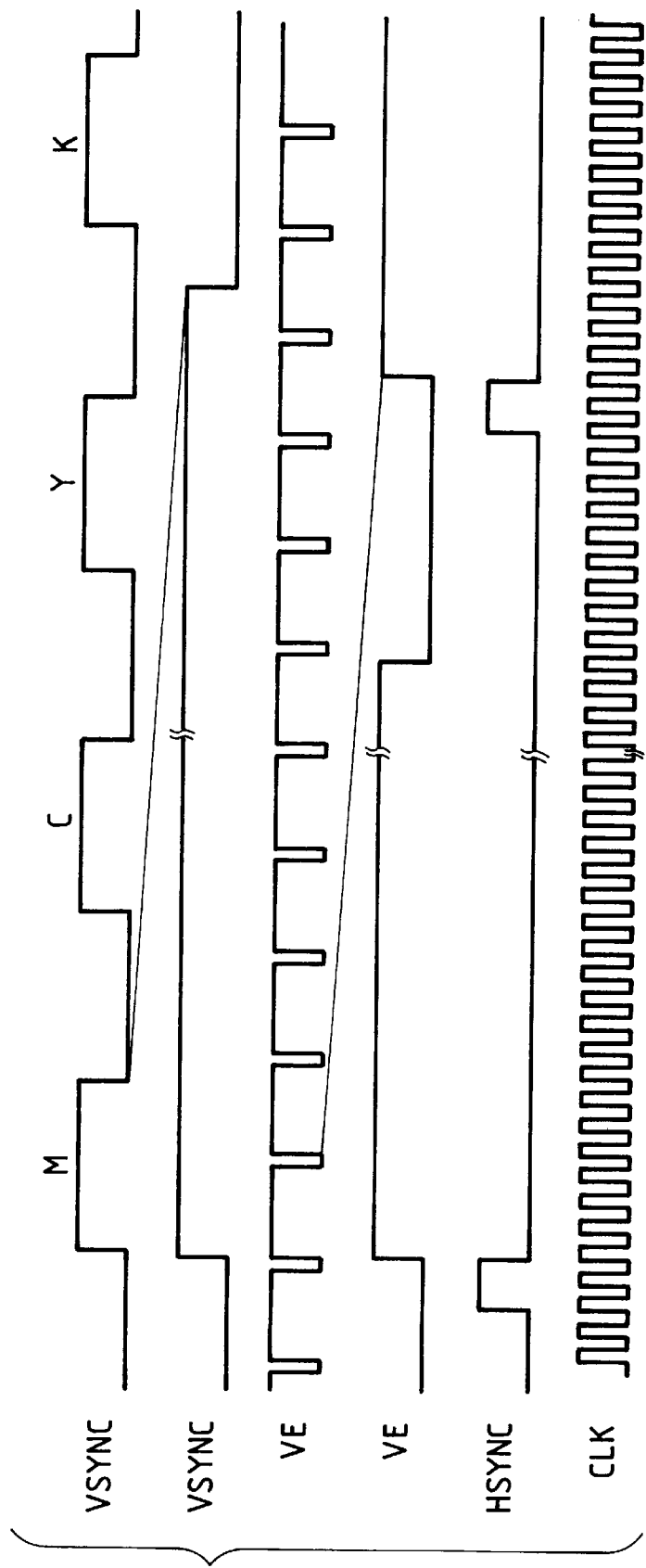
FIG. 13 is a timing chart showing the respective control signals in the image processing unit shown in FIGS. 12A and 12B.

FIG. 13 is a timing chart of the respective control signals in the image processing unit 1108.

Referring to FIG. 13, a signal VSYNC is an image effective period signal in the sub scan direction, and an image reading (scan) operation is performed during a "1" period of the signal VSYNC so as to sequentially form M, C, Y, and K image signals. A signal VE is an image effective period signal in the main scan direction. The start timing of a main scan (i.e., the timing at which the signal HSYNC changes from "1" to "0") is determined during a "1" period of the signal VE, and the signal VE is also used mainly in line count control for line delay. A signal CLK is a pixel synchronization signal, and image data is transferred at a timing at which the signal CLK changes from "0" to "1".

Figure 14:
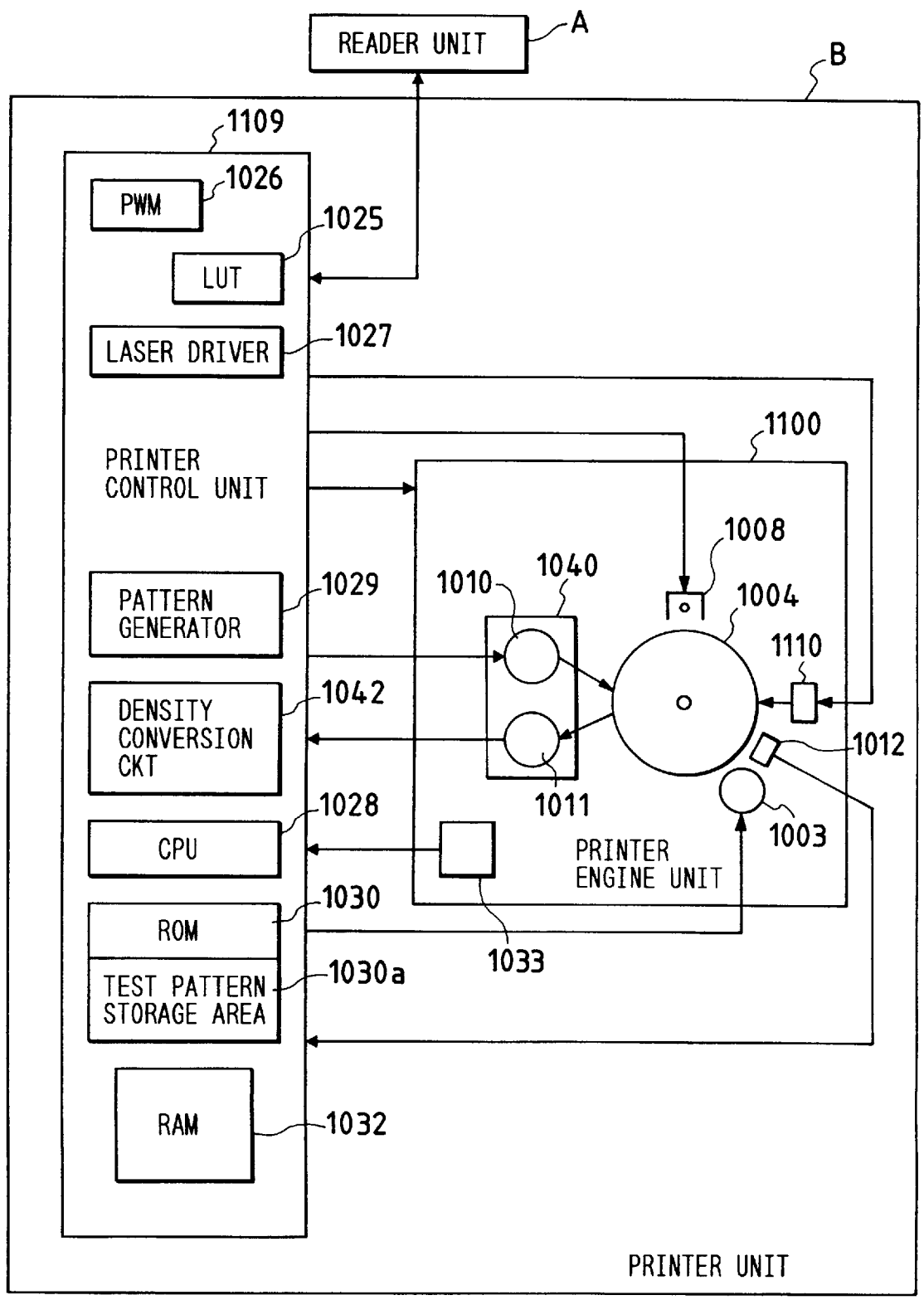
FIG. 14 is a block diagram showing the arrangement of a printer control unit shown in FIG. 11.

FIG. 14 is a block diagram showing the arrangement of the printer control unit 1109. The printer unit B will be described below with reference to FIGS. 14 and 11.

Image data input from the reader unit A to the printer unit B are converted into pulse signals corresponding to the image data by a pulse width modulator (PWM) 1026, and the pulse signals are input to a laser driver 1027 for driving a laser light source 1110. A laser beam output from the laser light source 1110 is scanned in the main scan direction by a polygonal mirror 1001, and is irradiated onto the surface of a photosensitive drum 1004, which is uniformly charged by a primary charger 1008, thereby forming an electrostatic latent image on the surface of the photosensitive drum 1004.

The photosensitive drum 1004 is rotating in the direction of an arrow in FIG. 14, and the latent image formed on the photosensitive drum 1004 is sequentially developed with toners by developers 1003 in units of colors. In this embodiment, a two-component system is used as the developing method, and black (K), yellow (Y), cyan (C), and magenta (M) color developers 1003 are arranged around the photosensitive drum 1004 in this order from the upstream side of the rotation direction of the drum 1004. Under the control of the printer control unit 1109, the developer 1003 corresponding to a color to be formed contacts the photosensitive drum 1004 at a timing for developing a latent image formed on the photosensitive drum 1004.

On the other hand, since a transfer drum 1005 around which a recording paper sheet 1006 fed from a recording paper cassette or the like is wound completes one revolution for each color to be formed, and the toner image on the photosensitive drum 1004 is transferred onto the recording paper sheet 1006, four color toner images are transferred onto the recording paper sheet in an overlapping state after a total of four revolutions.

The recording paper sheet 1006 on which the toner images have already been transferred is peeled from the transfer drum 1005, and the toner images on the sheet 1006 are fixed by a pair of fixing rollers 1007, thus completing a print operation of a full-color image.

Furthermore, a printer engine unit 1100 comprises a surface potential sensor 1012 arranged at the upstream side of the latent image forming position on the photosensitive drum 1004, an ambient sensor 1033 for measuring the moisture content contained in air in the apparatus, an optical reading device 1040 including an LED light source 1010 (having a main wavelength at about 960 nm) and a photodiode 1011. As will be described in detail later, the surface potential sensor 1012 is used by the printer control unit 1109 to detect the charge state on the photosensitive drum 1004 on the basis of the output from the sensor 1012, and to control the developing bias of each developer 1003. The optical reading device 1040 is used by the printer control unit 1109 to detect the amount of light reflected by a toner patch pattern formed on the photosensitive drum 1004. On the other hand, a cleaner 1009 is arranged at the upstream side of the primary charger 1008, and cleans the residual toner remaining on the photosensitive drum 1004 after the transfer operation.

In the printer control unit 1109, a CPU 1028 controls the entire printer unit B including the printer engine unit 1100 and the following units in accordance with programs prestored in a ROM 1030 and the like, and communicates with the CPU 1214 in the reader unit A to perform, e.g., a copying operation in cooperation with each other. A RAM 1032 is used as a work area of the CPU 1028, and the ROM 1030 also stores control parameters in addition to the control programs. In addition, a test pattern storage area 1030a that pre-stores test patterns to be described later is allocated on a portion of the ROM 1032.

As will be described in detail later, a look-up table (LUT) 1025 is used for matching the density of an original image with that of an output image, and comprises, e.g., a RAM. The conversion table of the LUT 1025 is set by the CPU 1028. A pattern generator 1029 generates a test print 1002 (to be described later), and a density conversion unit 1042 converts a luminance signal input from the optical reading device 1040 into a density signal.

Figure 15:
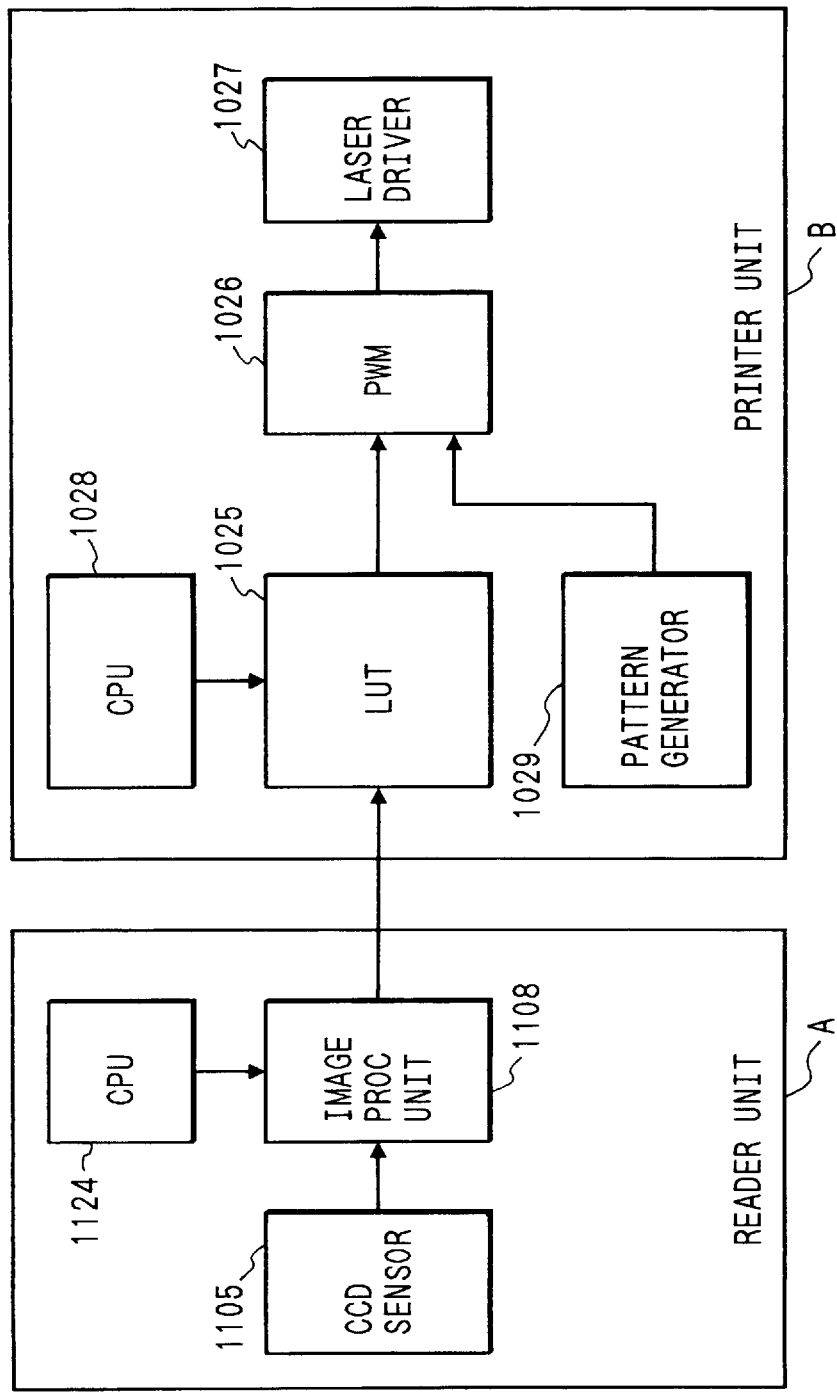
FIG. 15 is a block diagram for explaining the image processing for obtaining a gradation image.

FIG. 15 is a diagram for explaining the image processing for obtaining a gradation image according to this embodiment.

Luminance data of an original image output from the CCD 1105 are converted into frame-sequential density data by the image processing unit 1108. These density data correspond to image data corrected in correspondence with the gamma characteristics of the printer in an initial setting state. The LUT 1025 converts the density characteristics of the image data input from the image processing unit 1108 so that the density of an original image matches that of an output image. The image data output from the LUT 1025 are input to the PWM 1026.

Figure 16:
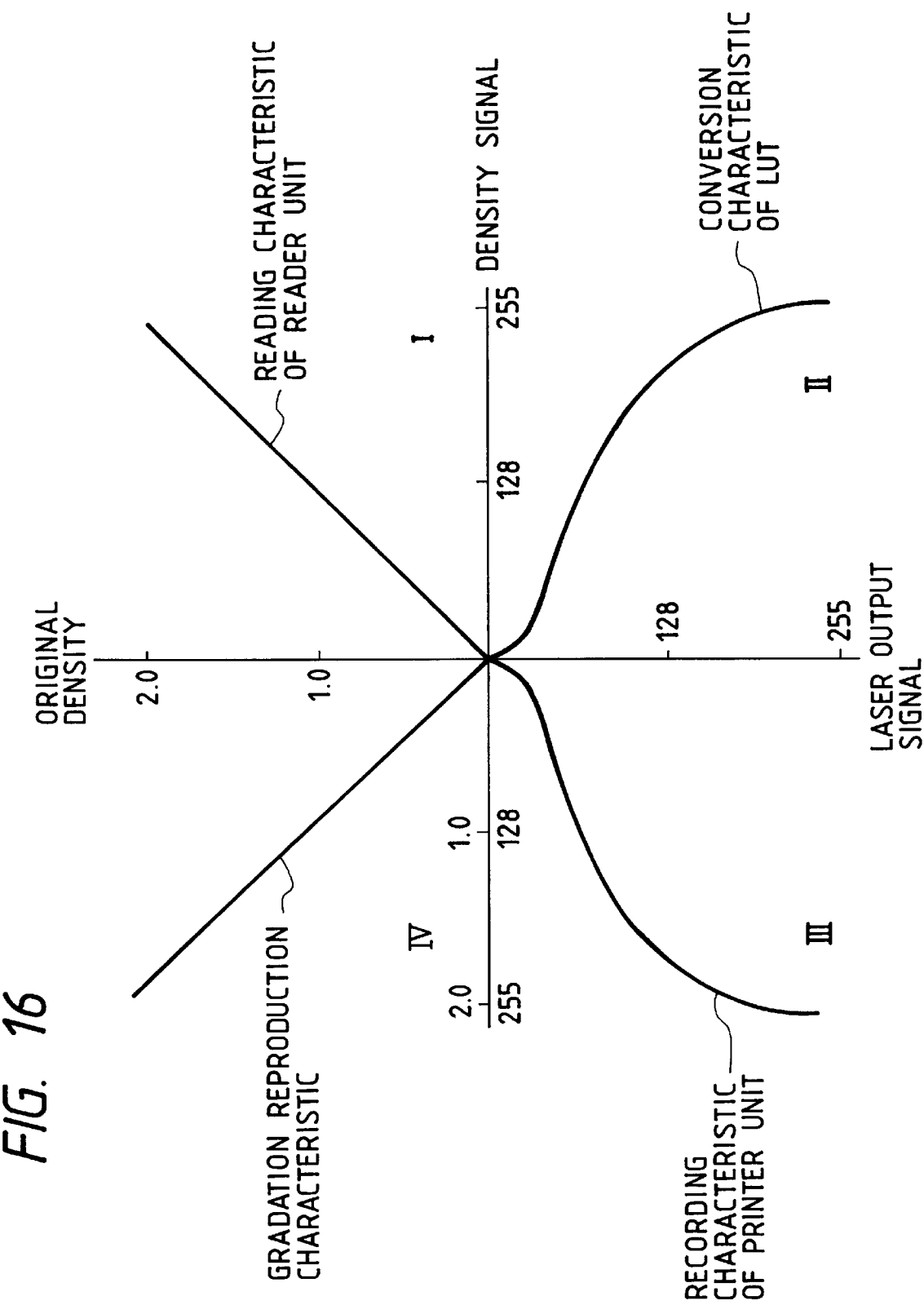
FIG. 16 is a four-quadrant chart showing the gradation reproduction state.

FIG. 16 is a four-quadrant chart showing the gradation reproduction state. The first quadrant shows the reading characteristics of the reader unit A for converting an original density into a density signal, the second quadrant shows the conversion characteristics of the LUT 1025 for converting the density signal into a laser output signal, the third quadrant shows the recording characteristics of the printer unit B for converting the laser output signal into an output density, and the fourth quadrant shows the relationship between the original density and the output density, i.e., the total gradation reproduction characteristics of the apparatus. Note that the number of gradation levels is 256 since 8-bit digital processing is performed.

In this embodiment, in order to obtain linear gradation reproduction characteristics shown in the fourth quadrant, a nonlinear component of the recording characteristics of the printer unit B shown in the third quadrant is corrected by the conversion characteristics of the LUT 1025 shown in the second quadrant. Note that the conversion characteristics of the LUT 1025 are set based on calculation results (to be described later).

FIG. 17 is a flow chart showing the sequence of the image adjustment processing of this embodiment. This sequence is executed by the CPU 1214 in the reader unit A and the CPU 1028 in the printer unit B in cooperation with each other. The gradation characteristics of the printer are adjusted in step S101, and the color reproduction characteristics of the printer are adjusted in step S102, thus ending the image adjustment processing. The respective processing operations will be described in turn below.

[Gradation Control of System Including Reader and Printer (First Feedback System)]

A control system for stabilizing the gradation reproduction characteristics of a system including both the reader unit A and the printer unit B will be described below.

FIG. 18 is a flow chart for explaining calibration of the printer unit B using the reader unit A. When an operator depresses an automatic gradation correction mode setting key provided to the console unit 1217, the CPU 1214 in the reader unit A and the CPU 1028 in the printer unit B start this control in cooperation with each other. When this control is started, various kinds of information and keys shown in FIGS. 19A to 21E are displayed on the display 1218, serving as a liquid crystal operation panel (touch panel display), of the console unit 1217.

Figures 19C, 20A:
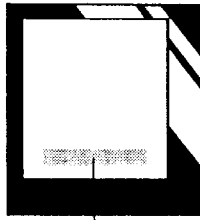
FIG. 19C is a view showing an example of information and keys displayed on the display shown in FIGS. 12A and 12B.
FIG. 20A is a view showing an example of information and keys displayed on the display shown in FIGS. 12A and 12B.

In step S151, the CPU 1214 displays a "test print 1" key for starting a test print operation on the display 1218 (FIG. 19A). When the operator depresses this key, the printer unit B prints out an image of test print 1, as shown in, e.g., FIG. 22. FIG. 19C shows a display example on the display 1218 during the print operation of test print 1.

At this time, the CPU 1028 checks if a recording medium on which test print 1 is to be printed is present, and supplies the checking result to the CPU 1214. When no recording medium is present, the CPU 1214 displays a warning message on the display 1218 (FIG. 19B). Upon formation of test print 1, since a standard state value corresponding to an ambient condition is registered as an initial value, this value is used as a contrast potential (to be described later).

The apparatus of this embodiment comprises a plurality of recording paper cassettes, and a plurality of recording medium sizes such as B4 size, A3 size, A4 size, B5 size, and the like can be selected. However, a recording medium used for printing test print 1 is set to use a so-called large-size medium (e.g., B4, A13, 11×17, LGR, or the like) so that the operator can be prevented from placing test print 1 on the original support plate glass 1102 in a wrong direction in a reading operation later.

Figure 22:
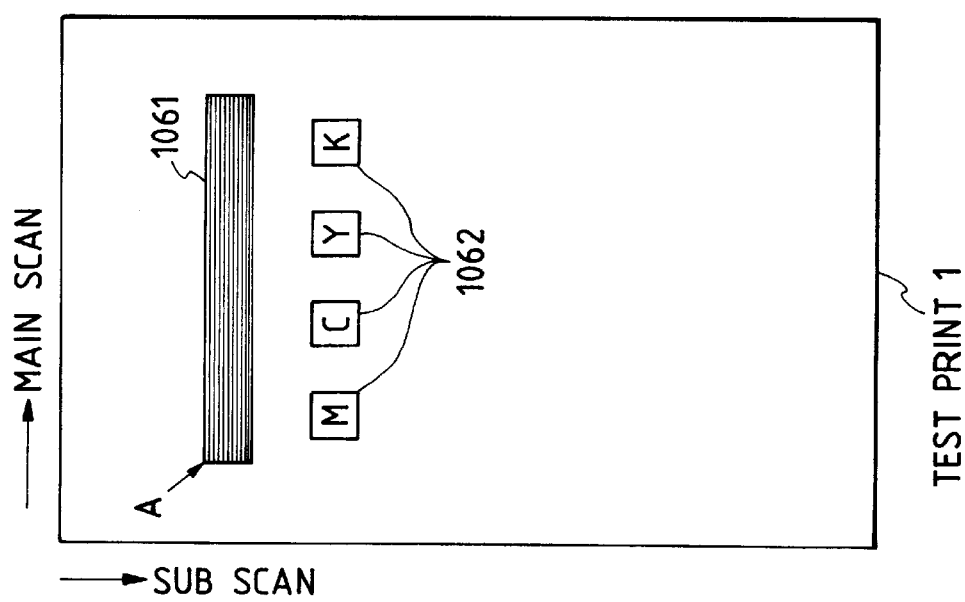
FIG. 22 is a view showing an example of test print

A belt pattern 1061 defined by the halftone gradation densities for four, i.e., Y, M, C, and K colors is formed on test pattern 1, as shown in FIG. 22. The operator visually inspects this belt pattern 1061 to confirm if a stripe-shaped abnormal image, density nonuniformity, or color nonuniformity is generated. If the operator finds any abnormality on the belt pattern 1061, he or she prints out test print 1 again. If the operator finds an abnormality again, processing for calling a service person or the like is required. On the other hand, patterns 1062 are Y, M, C, and K maximum density patches (density signal values 255 in the case of 8 bits).

Figure 23:
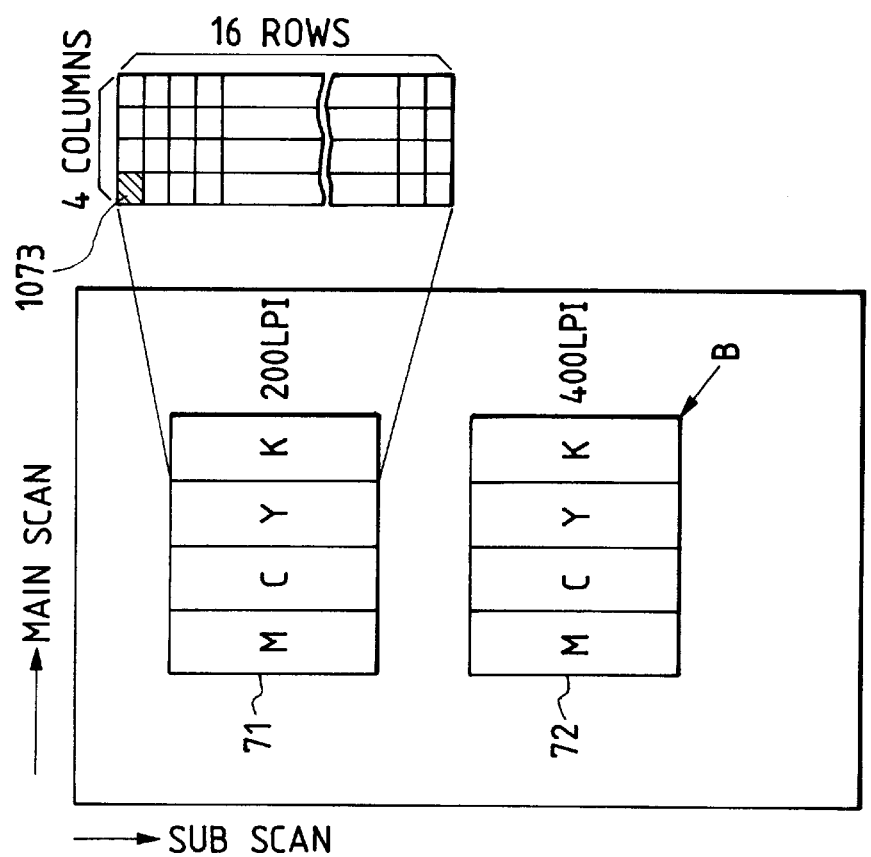
FIG. 23 is a view showing an example of test print 2.

The dimension, in the main scan direction, of the pattern 1061 is set to cover the patch patterns 1062 and gradation patterns 1071 and 1072 shown in FIG. 23. The belt pattern 1061 is read by the reader unit A, and whether or not the subsequent control is performed can be automatically determined based on the density information in the main scan direction.

Figure 24:
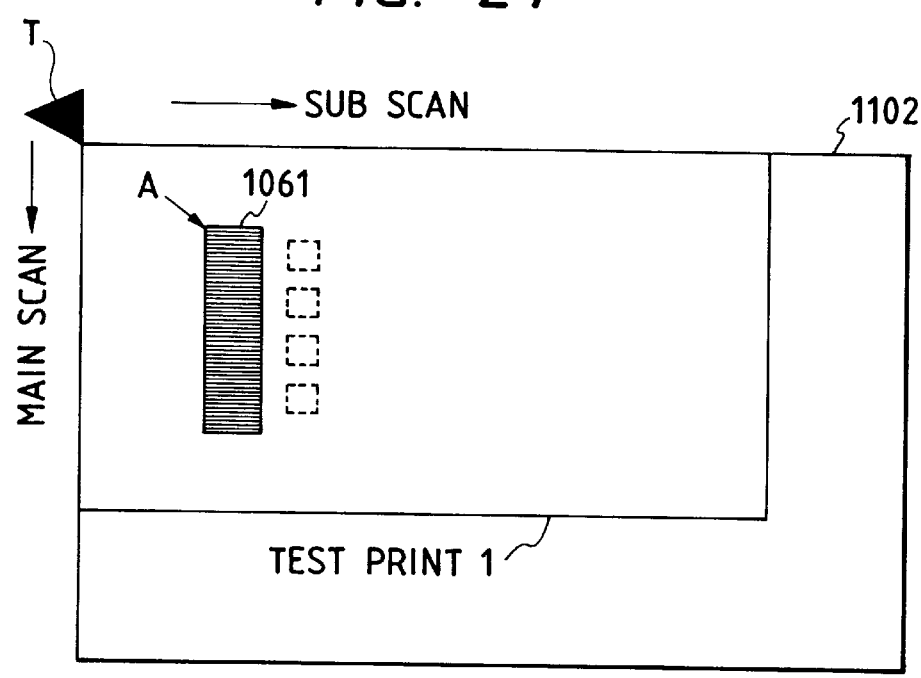
FIG. 24 is a view showing the state wherein test print 1 is placed on an original support plate glass.

Subsequently, in step S151, the operator places test print 1 on the original support plate glass 1102 so that the main and sub scan directions upon formation of test print 1 match those upon reading of test print 1 (FIG. 24), and then depresses a "reading" key shown in FIG. 20A. At this time, as shown in FIG. 20A, the CPU 1214 displays a guidance message for the operator on the display 1218 so as to instruct a method of placing test print 1 on the original support plate glass 1102. That is, FIG. 24 is a top view of the original support plate. A wedge-shaped mark T on the upper left corner in FIG. 24 is an alignment (registration) mark for an original on the original support plate, and test print 1 must be placed on the original support plate glass 1102 with its printed surface facing down so that the belt pattern 1061 is located at the mark T side.

Figure 20B:
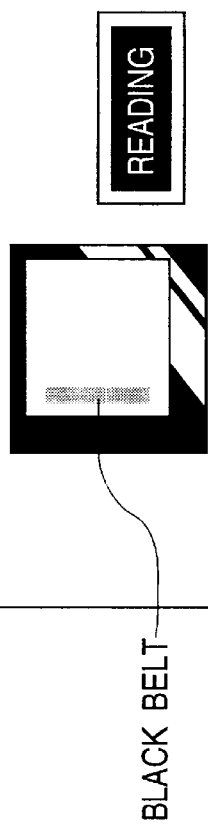
FIG. 20B is a view showing an example of information and keys displayed on the display shown in FIGS. 12A and 12B.
Figure 20C:
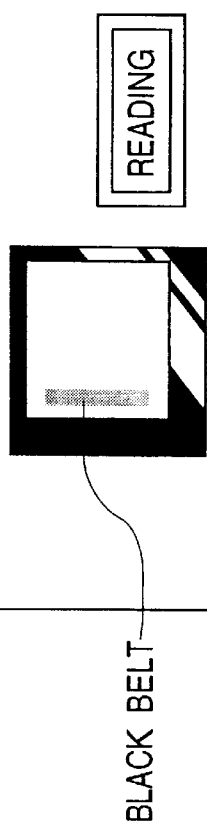
FIG. 20C is a view showing an example of information and keys displayed on the display shown in FIGS. 12A and 12B.

The reading operation of the patch patterns 1062 by the reader unit A is performed as follows. More specifically, when a scan operation is started from the position of the mark T and is performed gradually, the first steep change in density (density gap) is detected at the corner (a point A) of the belt pattern 1061. Then, the positions of the respective patch patterns 1062 are calculated relative to the coordinate position of the density gap, and the density values of the patch patterns 1062 are read. During this reading operation, the display state on the display 1218 is as shown in FIG. 20B. When test print 1 is set in an inaccurate direction or position, and the patch patterns 1062 cannot be read, the CPU 1214 displays a message shown in FIG. 20C on the display 1218. Thereafter, when the operator places test print 1 again and depresses the "reading" key, the CPU 1214 starts the reading operation of patch patterns 1062 again.

At this time, the CPU 1214 controls to transfer image signals from the line delay unit 1204 to the density conversion unit 1220. The CPU 1214 sets conversion formulas given by equations (3) (or corresponding conversion table) below in the density conversion unit 1220 and controls the unit 1220 to convert the read R, G, and B values into optical densities. Note that the density conversion unit 1220 adjusts the conversion results with correction coefficients km, kc, ky, and kk so as to obtain the same values (absolute densities) as those obtained by a commercially available densitometer.

$$M = -km \times \log(G/255)$$

$$C = -kc \times \log(R/255)$$

$$Y = -ky \times \log(B/255)$$

$$K = -kk \times \log(G/255) \tag{3}$$

where the base of log is 10

Subsequently, the CPU 1028 calculates an object contrast potential B for obtaining an object density on the basis of the density information obtained from the patch patterns 1062 in units of color components in step S153.

Figure 25:
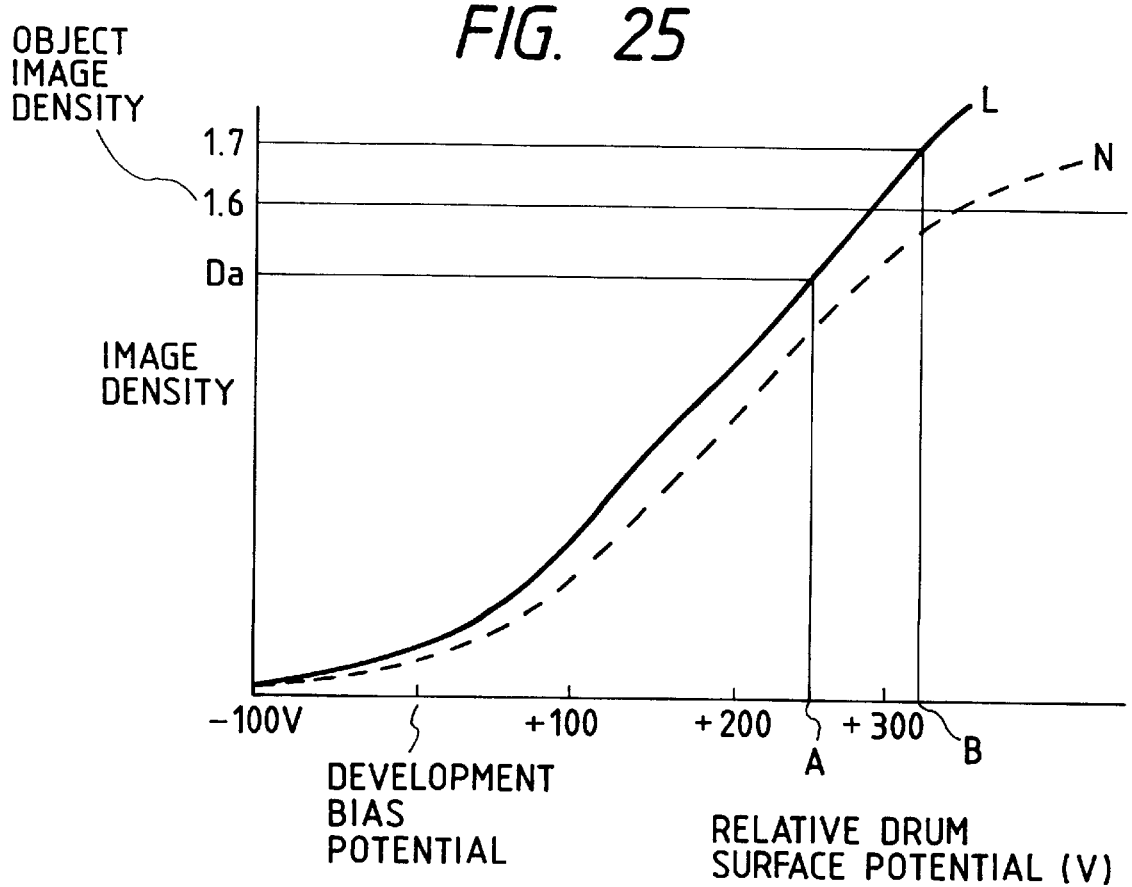
FIG. 25 is a graph showing the relationship between the relative drum surface potential and the image density.

FIG. 25 shows the relationship between the relative drum surface potential and the image density. A method of calculating the object contrast potential B from the obtained density information, and correcting the maximum density will be described below with reference to FIG. 25.

Assume that the density of the patch pattern 1062 is Da when the difference between the developing bias potential and the surface potential of the photosensitive drum 1004 obtained when the surface of the drum 1004 is primarily charged and thereafter is subjected to charge removal by a laser beam corresponding to the maximum density level, i.e., the contrast potential, is A. The object image density is set to be, e.g., 1.6. However, for the following reason, a margin of 0.1 is added to the object image density of 1.6, i.e., an object value Dr of the maximum density is set to be 1.7 to determine the contrast potential. That is, the image density with respect to the relative drum surface potential in the maximum density region changes almost linearly, as indicated by a solid line L in FIG. 25. However, in a two-component developing system, when the toner density in the developer 1003 varies and lowers, the image density may change nonlinearly in the maximum density region, as indicated by a broken curve N. For this reason, a margin of, e.g., 0.1 is added to the object image density.

Note that the image density D means an optical density, and is defined by the following equation:

$$D = -\log(I/Io) \tag{4}$$

where Io: incident light

I: reflected light the base of log is 10

More specifically, the contrast potential B with respect to the object value Dr is calculated using equation (5) below. Ka included in equation (5) is a correction coefficient, and its value is preferably optimized depending on the type of developing method.

$$B = (A + Ka) \times Dr/Da \tag{5}$$

Figure 26:
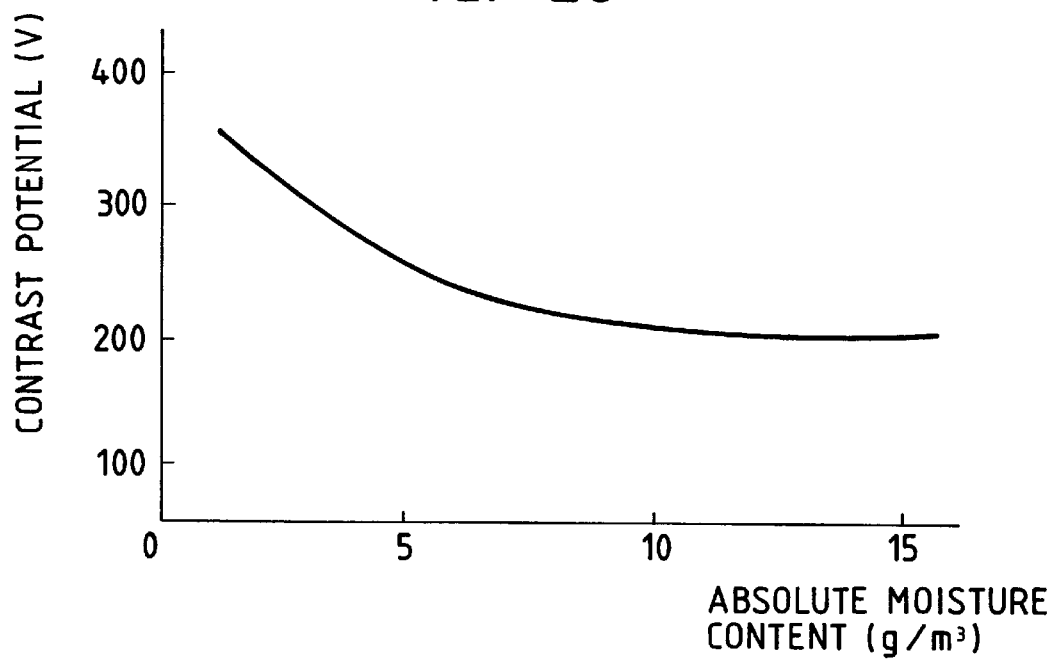
FIG. 26 is a view for explaining control for changing the setting state of the contrast potential in correspondence with the moisture content contained in air in the apparatus.

As an example of the correction coefficient Ka, in the case of an actual electrophotography method, the image density cannot be adjusted unless the contrast potential to be set changes in correspondence with the ambient condition. In view of this problem, the contrast potential to be set is changed, as shown in FIG. 26, in correspondence with the ambient sensor 1033 for monitoring the moisture content contained in air in the apparatus. In a detailed method for correcting the contrast potential in correspondence with the ambient moisture content, a correction coefficient Vcont.rate calculated from equation (6) below is saved in a backup area 1032a of the RAM 1032, and a variation in ambient condition (moisture content) is monitored at, e.g., 30-minute intervals. Then, a corrected contrast potential B' is calculated based on the correction coefficient Vcont.rate corresponding to the detection result and a contrast potential Atemp calculated in correspondence with the ambient moisture content upon execution of an image forming operation.

$$Vcont.rate = B/A \tag{6}$$

$$B' = Vcont.rate \times Atemp \tag{7}$$

Subsequently, the CPU 1028 checks in step S154 if an object contrast potential B of each color component falls within the control range. If the object contrast potential falls outside the control range, the CPU 1028 determines that the developer 1003 or the like suffers an abnormality. In this case, the CPU 1028 sets an error flag corresponding to the developer 1003 of the corresponding color, and corrects the object contrast potential B to be a limit value of the control range in step S155. Thereafter, the flow advances to step S156. Note that the error flag indicates a portion to be checked that corresponds to the error flag when a service person executes a predetermined service mode.

Subsequently, in step S156, the CPU 1028 sets the grid potential and developing bias potential of the primary charger 1008 to obtain the object contrast potential B. A method of calculating the grid potential and developing bias potential on the basis of the object contrast potential B will be briefly described below.

Figure 27:
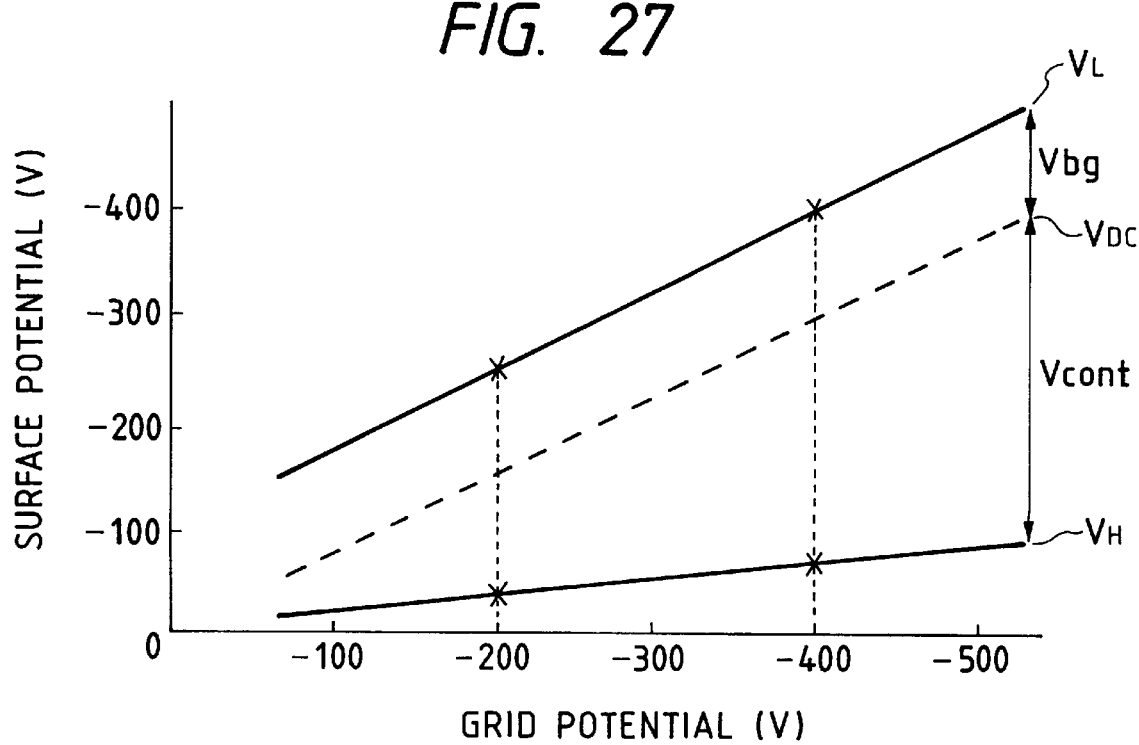
FIG. 27 is a graph showing the relationship between the grid potential of a primary charger and the surface potential of the photosensitive drum.

The grid potential of the primary charger 1008 is set to be −200 V, and the surface potential sensor 1012 measures the surface potential, VL, of the photosensitive drum 1004 when the drum 1004 is scanned with a laser beam corresponding to the lowest density level, and the surface potential, VH, of the photosensitive drum 1004 when the drum 1004 is scanned with a laser beam corresponding to the highest density level. Similarly, the grid potential is set to be −400 V, and the surface potentials VL and VH are measured. Thereafter, the relationship between the grid potential and the surface potential is calculated by interpolation and extrapolation on the basis of the data obtained at −200 V and −400 V. FIG. 27 shows the calculation result. Note that control for calculating potential data will be referred to as potential measurement control hereinafter.

Since a voltage difference Vbg (e.g., 100 V) is set to prevent so-called toner fogging, i.e., to prevent toner from being attached to a portion where toner must not be attached, the developing bias potential, VDC, is set to be VL−Vbg. Therefore, the contrast potential, Vcont, corresponds to the differential voltage between the developing bias potential VDC and the surface potential VH, and the maximum density can become higher as Vcont increases, as described above. In this manner, the grid potential and developing bias potential required for obtaining the object contrast potential B can be calculated based on the relationship shown in FIG. 27.

Figure 28:
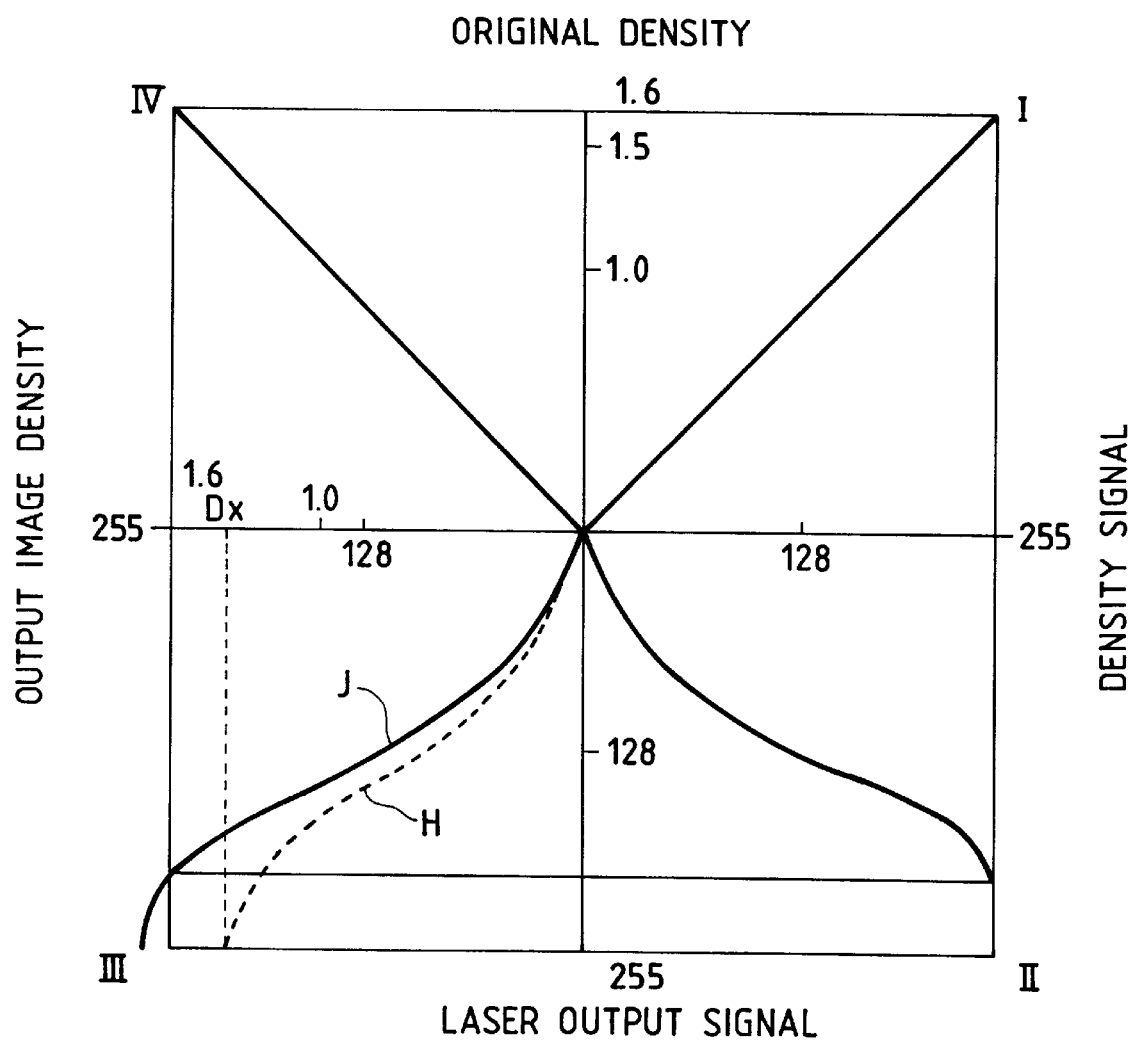
FIG. 28 is a graph showing an example of the density conversion characteristics.

FIG. 28 shows an example of the density conversion characteristics. Since the maximum density control in this embodiment sets the maximum density to be higher than the final object value, the printer characteristics in the third quadrant are as shown in a solid curve J in FIG. 28. If such control is not performed, the printer characteristics that do not reach 1.6 may be obtained, as indicated by a broken curve H in FIG. 28. In the case of the characteristics defined by the broken curve H, since the LUT 1025 has no performance for increasing the maximum density independently of its contents, it is impossible to reproduce the density between a density DH and 1.6. On the other hand, as indicated by the solid curve J, when the printer characteristics are defined to set a density slightly higher than the maximum density, a sufficient density reproduction range can be assured by the total gradation characteristics in the fourth quadrant.

Subsequently, in step S157, the CPU 1214 displays a message for starting test print 2 and a "test print 2" key on the display 1218 (FIG. 21A). When the operator depresses this key, the printer unit B prints out an image of test print 2, as shown in, e.g., FIG. 23. FIG. 21B shows a display example on the display 1218 during the print operation of test print 2. Note that test print 2 is generated by the pattern generator 1029 and is output without going through the LUT 1025.

Test print 2 has 4 (columns)×16 (rows) gradation patches (a total of 64 gradation levels) for each color component. In this case, the laser output level is set so that lower density regions of a total of 256 gradation levels are preponderantly assigned to 64 gradation levels, and higher density regions are assigned while being thinned out. In this manner, in particular, the gradation characteristics of a highlight portion can be satisfactorily adjusted.

Also, test print 2 has a pattern 1071 with a resolution of 200 LPI (lines/inch) and a pattern 1072 with a resolution of 400 LPI, each including patches 1073. In this embodiment, for example, since a gradation image is formed at a resolution of 200 LPI and a line image such as a character is formed at a resolution of 400 LPI, patterns having identical gradation levels are output at these two different resolutions. However, when a large gradation characteristic deviation is obtained depending on the difference in resolution, the above-mentioned gradation levels are preferably set in correspondence with the resolutions. Note that image forming operations at different resolutions can be realized by setting a triangular wave to be compared with image data to be processed to have a period corresponding to the resolution in the PWM 1026.

Figure 29:
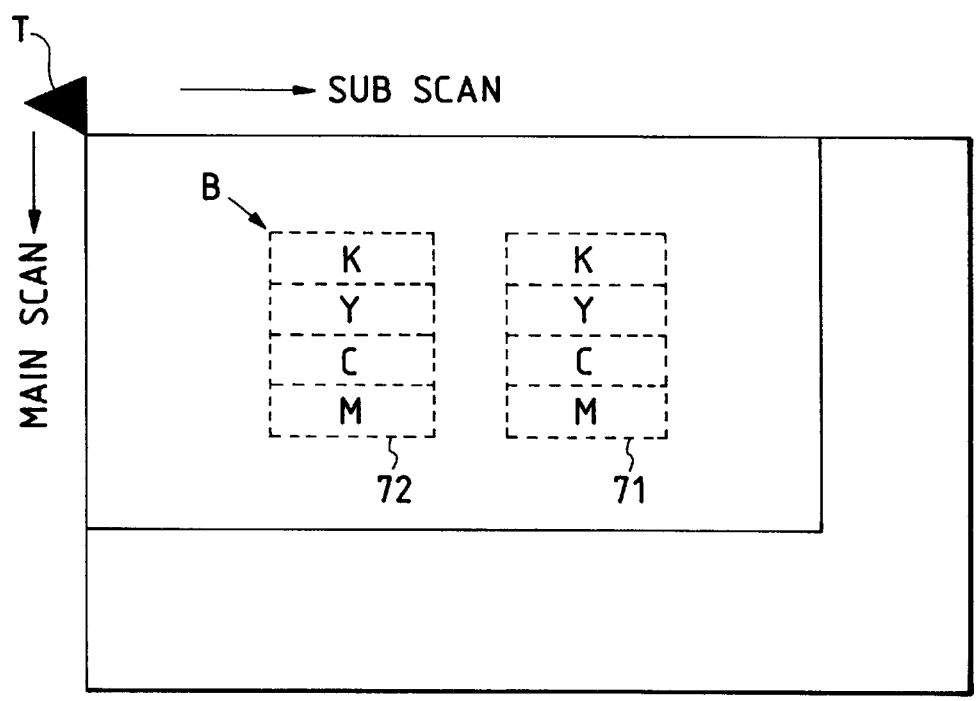
FIG. 29 is a view showing the state wherein test print 2 is placed on the original support plate glass.

In step S158, the operator places test print 2 on the original support plate glass 1102 so that the main and sub scan directions of test pattern 2 upon formation match those of test pattern 2 upon reading (FIG. 29), and depresses the "reading" key shown in FIG. 21C. At this time, the CPU 1214 displays a guidance message for the operator on the display 1218 to instruct the method of placing test print 2 on the original support plate glass 1102, as shown in FIG. 21C. FIG. 29 is a top view of the original support plate. As shown in FIG. 29, test print 2 must be placed on the original support plate glass 1102 with its printed surface facing down so that a K pattern is located at the wedge-shaped mark T side.

The reader unit A reads the patterns 1071 and 1072 as follows. More specifically, when a scan operation is started from the position of the mark T and is performed gradually, the first steep change in density (density gap) is detected at the corner (a point B) of the pattern 1072. Then, the positions of the respective patches 1073 are calculated relative to the coordinate position of the density gap, and the density values of the patches 1073 are read.

Figure 30:
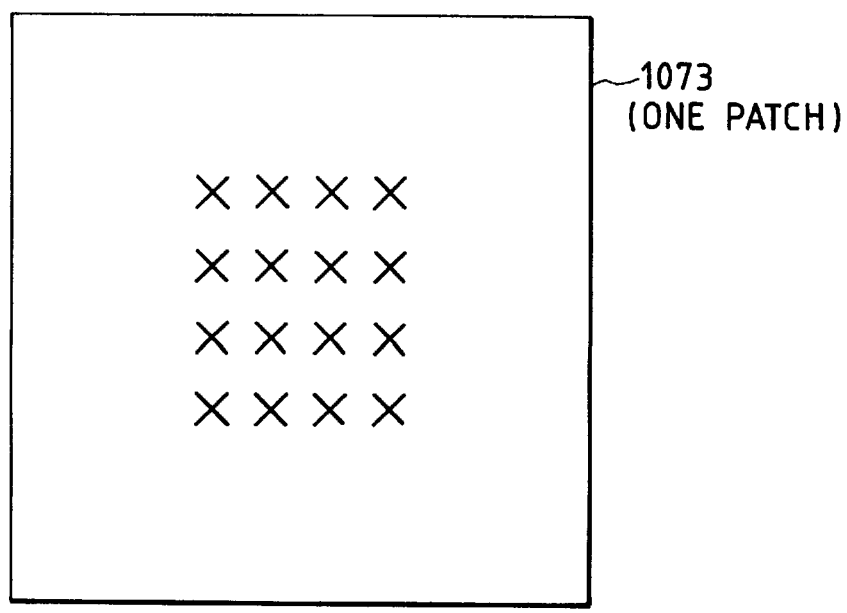
FIG. 30 is a view showing an example of reading points per patch of test print 2.

FIG. 30 shows an example of reading points per patch 1073. For example, 16 reading points are set in each path, the 16 read values are averaged, and the average read value (RGB signal) is converted into a density value using conversion formula (2) above into an optical density above. Note that the number of reading points is preferably optimized in correspondence with the reader unit A and the printer unit B.

Figure 31:
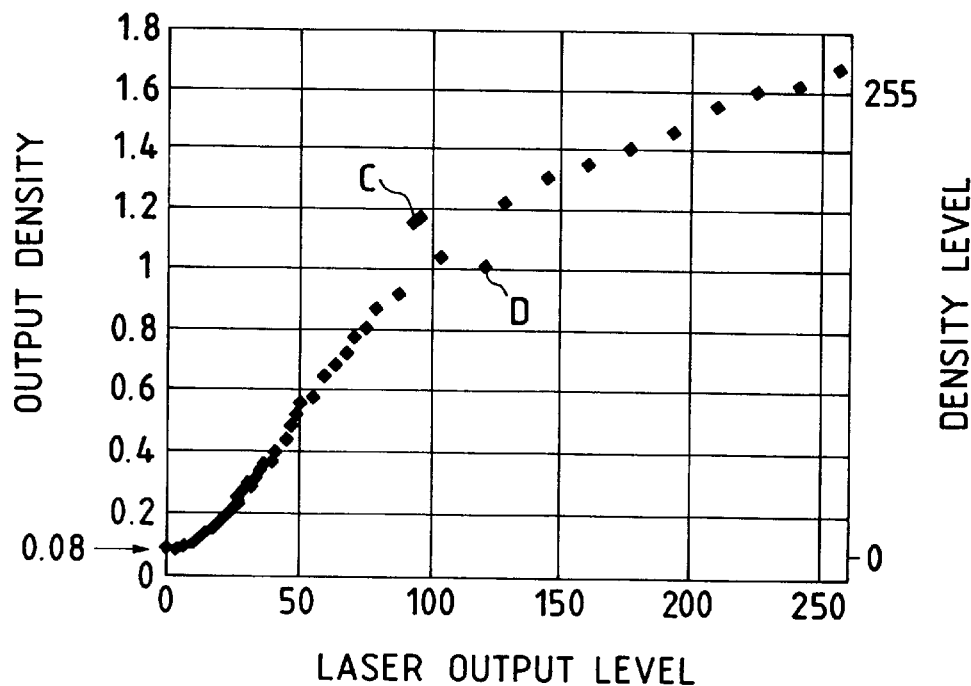
FIG. 31 is a graph showing the relationship between the output density obtained from test print 2 and the laser output level.

FIG. 31 shows the relationship between the output density and the laser output level obtained as described above. The right ordinate in FIG. 31 plots the density levels normalized by defining that the base density (0.08 in FIG. 31) is "0", and the maximum density (e.g., 1.60) of this apparatus is "255".

If the obtained density value is extraordinarily high or low, as indicated by a point C or D in FIG. 31, the surface of the original support plate glass 1102 may have a contaminated portion or scratches, or test print 2 may include errors. Thus, in order to continuously save a data string, the CPU 1028 corrects the data string to be saved by limiting the slope of the characteristics. The limitation is attained such that when the slope is 3 or more, it is fixed to be 3; when the slope has the negative sign, the corresponding density value is set to have the same value as the immediately preceding density value.

Figure 21E:
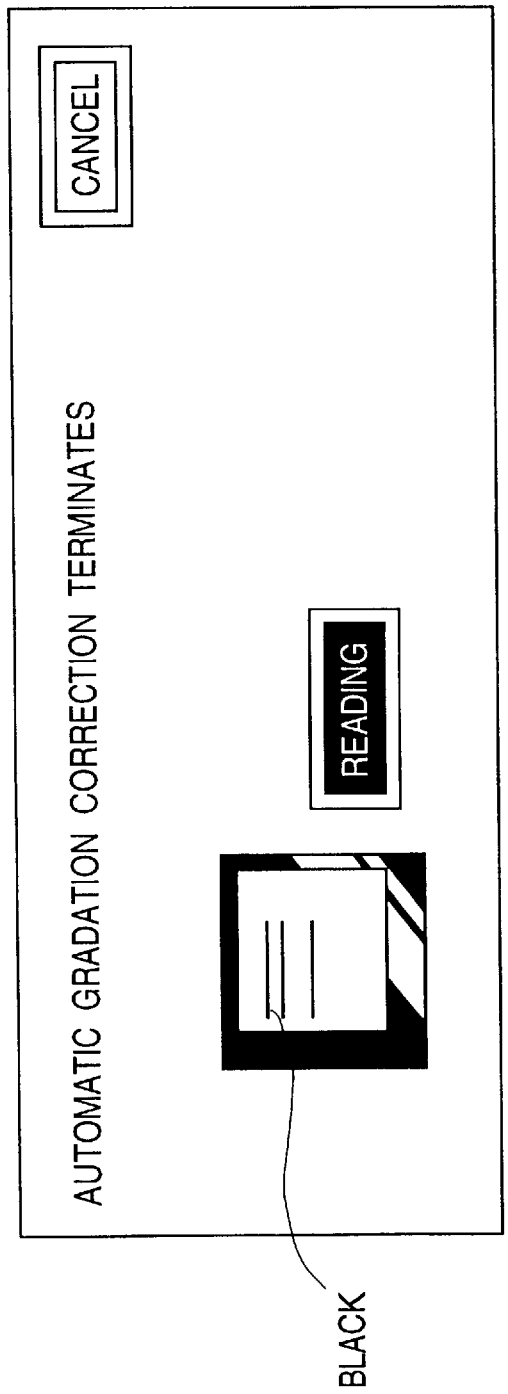
FIG. 21E is a view showing an example of information and keys displayed on the display shown in FIGS. 12A and 12B.

Subsequently, in step S159, the CPU 1028 creates and sets a table of the LUT 1025. This table can be easily created by replacing coordinates such that the input level (the density signal axis in FIG. 16) replaces the density level in FIG. 31, and the output level (the laser output signal axis in FIG. 16) replaces the laser output level. Note that the table values of density levels which do not correspond to the patches are calculated by interpolation. At this time, the limitation condition is set so that the output level becomes "0" in correspondence with "0" input level. Note that the CPU 1214 makes a display as shown in FIG. 21D on the display 1218 during the processing in step S159, and then makes a display as shown in FIG. 21E upon completion of the automatic gradation correction.

As described above, the contrast potential control and creation of the gamma conversion table by the control system using the reader unit A are completed.

[Supplementary Control for Gradation Characteristics]

Next, supplementary control for the gradation characteristics after the above-mentioned automatic gradation control (to be also referred to as a "first control system" hereinafter) will be explained below. As described above, the maximum density is corrected by controlling the contrast potential in correspondence with a variation in ambient condition. In this embodiment, the gradation characteristics are also corrected.

Figure 32:
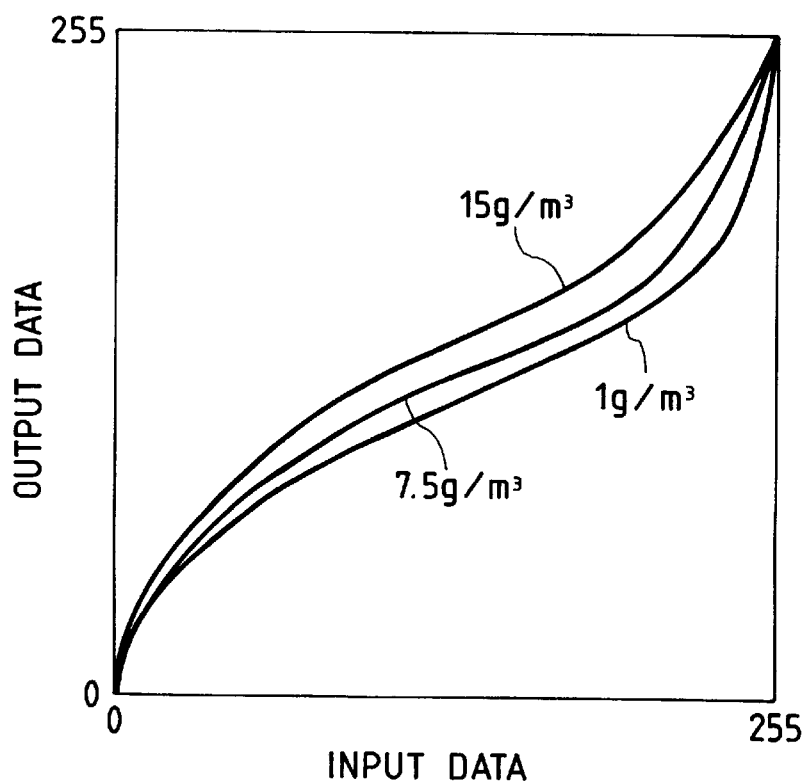
FIG. 32 is a graph showing an example of the table values of an LUT which is pre-stored in a ROM shown in FIG. 14.

FIG. 32 shows an example of the table values of the LUT 1025 pre-stored in the ROM 1030. These table values correspond to a case wherein the ambient condition changes while the first control system is disabled.

The CPU 1028 saves moisture content data obtained upon execution of the control by the first control system in the backup area 1032a, and obtains LUT.A corresponding to the saved moisture content from the ROM 1030. Thereafter, every time the ambient condition changes (or the moisture content is measured), LUT.B corresponding to the moisture content is obtained from the ROM 1030, and LUT.1 obtained by the first control system is corrected by equation (8) below using LUT.B and LUT.A.

$$\text{LUT.present} = \text{LUT.1} + (\text{LUT.B} - \text{LUT.A}) \quad (8)$$

With this control, the apparatus can obtain linear characteristics with respect to the density signal, and as a result, a variation in density gradation characteristics in units of apparatuses can be suppressed, thus allowing to set a standard state.

On the other hand, this control may be put into the hands of a normal user, and the user may execute this control as needed when he or she determines that the gradation characteristics of the apparatus have deteriorated. In this manner, the gradation characteristics of the system including both the reader and printer can be easily corrected, and correction with respect to a variation in ambient condition can be appropriately made.

[Assisting Management for Service Maintenance]

The service person can set to enable or disable the first control system. In the service maintenance mode, the service person can disable the first control system, so that he or she can appropriately discriminate the state of the apparatus. When the first control system is disabled, a standard contrast potential and gamma conversion table for the type of apparatus are read out from, e.g., the ROM 1030. In this manner, the service person can easily recognize the characteristic deviation from the standard state, and can efficiently attain an optimal maintenance.

[Control of Color Reproduction Characteristics (Second Feedback System)]

A control system for adjusting the color reproduction characteristics of the system including both the reader unit A and the printer unit B will be explained below.

Figure 33:
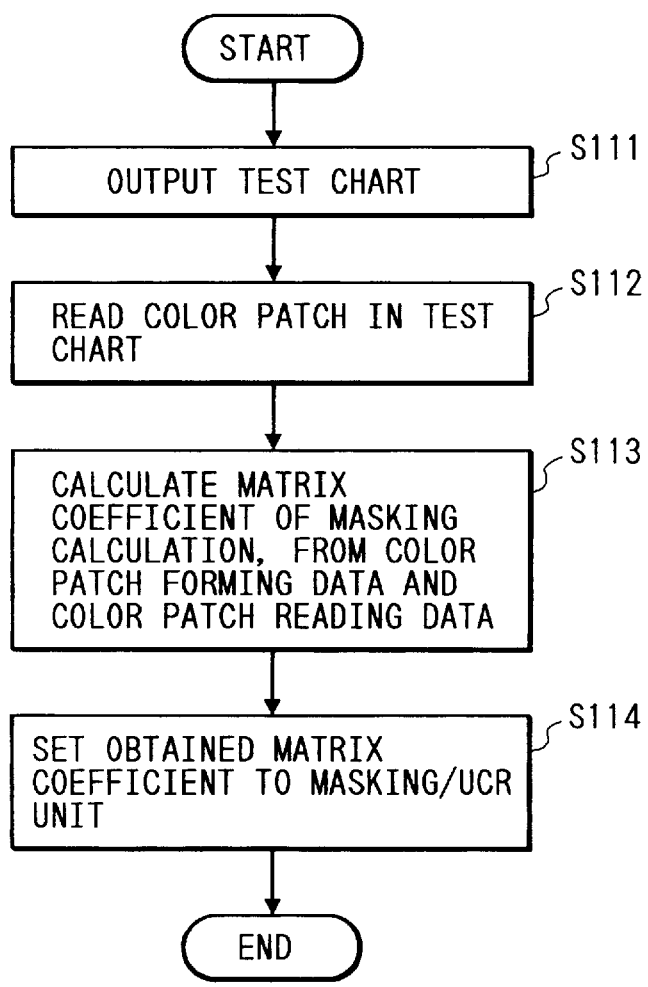
FIG. 33 is a flow chart for explaining the adjustment of the color reproduction characteristics of a printer unit B using a reader unit A.

FIG. 33 is a flow chart for explaining the adjustment of the color reproduction characteristics of the printer unit B using the reader unit A. Upon completion of the adjustment of the gradation characteristics described above, the CPU 1214 of the reader unit A and the CPU 1028 of the printer unit B start this control in cooperation with each other.

Figure 34:
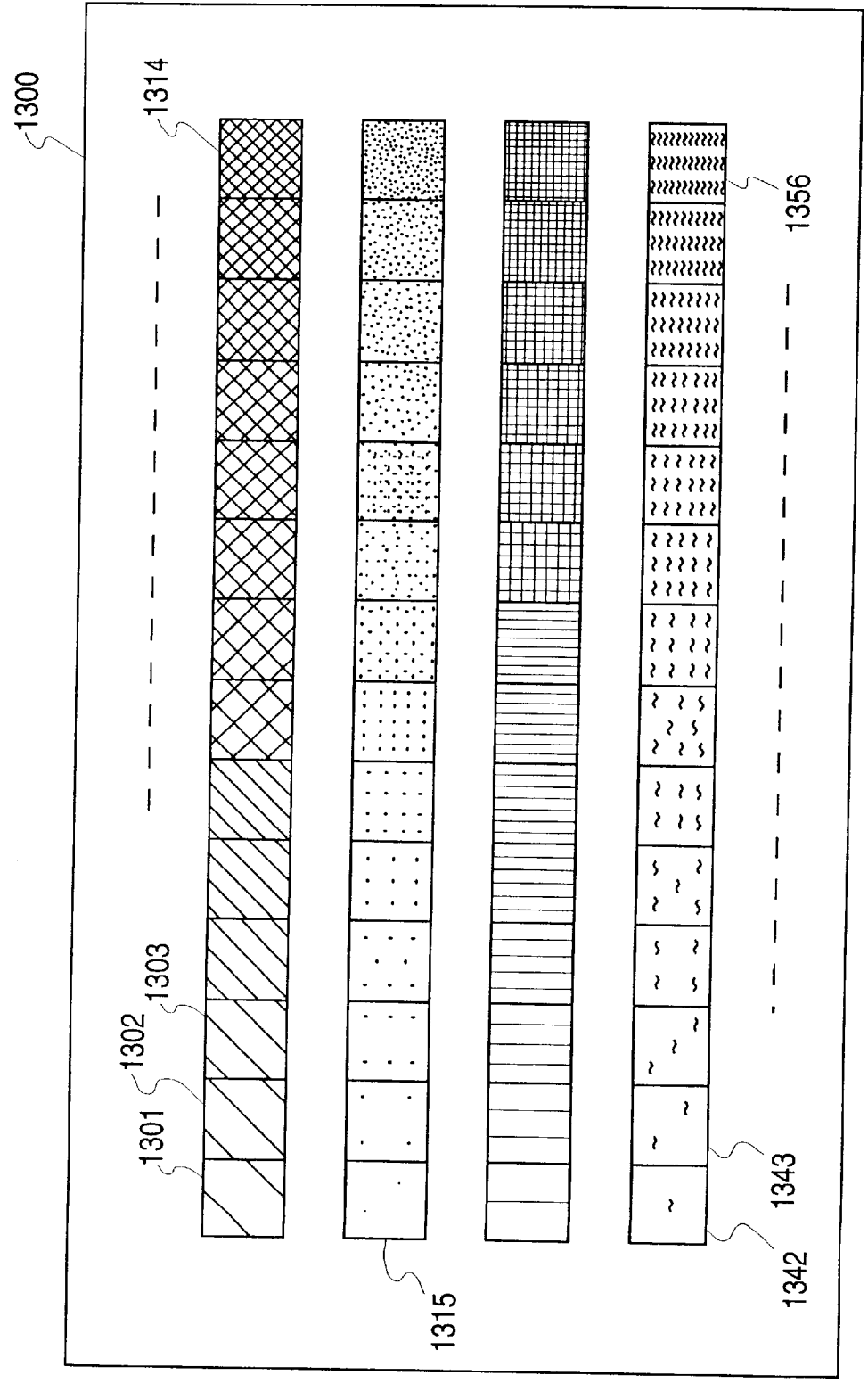
FIG. 34 is a view showing an example of a test chart.

In step S111, the CPU 1028 controls the pattern generator 1029 to output predetermined M, C, Y, and K signals and supplies them to the printer engine unit 1100 via the LUT 1025 whose table is set on the basis of the adjustment result of the gradation characteristics described above, thereby forming a predetermined test chart 1300 on a recording medium. FIG. 34 shows an example of this test chart 1300 on which color patches 1301 to 1356 corresponding to various combinations of M, C, Y, and K signals are formed.

In step S112, the CPU 1214 displays a message for prompting the operator to place the test chart 1300 at a predetermined position on the original support plate lass 1102 on the display 1218. When the operator places the test chart 1300 on the original support plate glass 1102 in accordance with the displayed instruction and then depresses, e.g., a "reading" key, the CPU 1214 drives the reading optical system unit to read an image on the test chart 1300. The reading operation is substantially the same as the sequence upon adjustment of the gradation characteristics described above, and a detailed description thereof will be omitted. In this case, data at a plurality of points are read for each color patch, and the read data are averaged. In addition, the averaged M, C, Y, and K data are stored in the RAM 1215 or the like in correspondence with the reading coordinate positions, i.e., the combinations of M, C, Y, and K signals on the respective color patches.

Subsequently, the CPU 1214 calculates the matrix coefficients b11 to b44 of equation (2) above on the basis of M, Y, C, and K data that form the respective color patches and M, C, Y, and K data obtained by reading the respective color patches and stored in the RAM 1215 using a known method of least square in step S113. In step S114, the CPU 1214 stores the obtained matrix coefficients in the RAM 1215 or the like, and sets them in the masking/UCR unit 1208.

As described above, according to this embodiment, by executing a series of image adjustment processing operations shown in FIG. 17, the gradation reproduction characteristics of the printer unit B can be stabilized, and the color reproduction characteristics of color mixing can also be stabilized. With this operation, since the gradation and color reproduction characteristics of the printer unit B alone can be assured, expected image quality can be obtained for, e.g., an image signal input from an external device via an external interface (not shown), and the user does not feel the individual difference of the printer unit B. Furthermore, since the color reproduction characteristics are adjusted for colors output from the apparatus itself, even when a copied original is to be copied, i.e., a so-called "grandchild copy" is to be formed, good color reproduction characteristics can be obtained.

[Fourth Embodiment]

An image recording apparatus according to the fourth embodiment of the present invention will be described below. In the fourth embodiment, the same reference numerals denote substantially the same parts as in the third embodiment, and a detailed description thereof will be omitted.

For example, as the number of copies increases, the charge amount given to toner may vary or the surface state of the photosensitive drum 1004 or the transfer drum 1005 may change, and good gradation characteristics cannot be maintained, as is well known. Therefore, the apparatus does not always fall within the range that allows the above-mentioned image adjustment.

Figure 35:
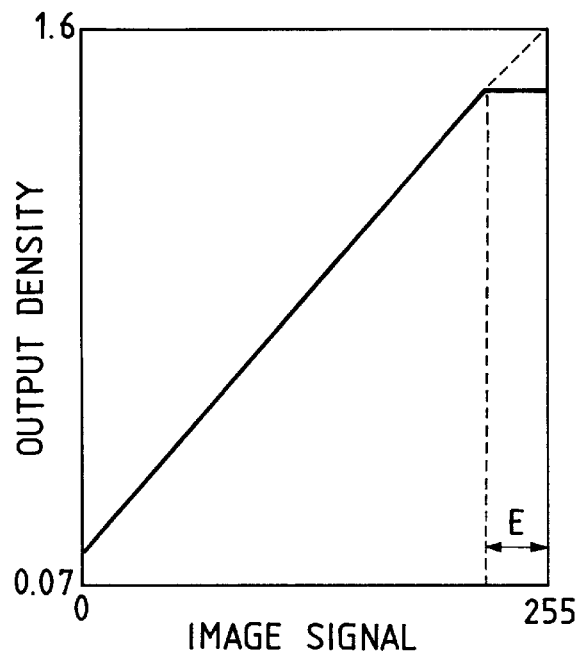
FIG. 35 is a graph showing an example of a region undesirably having flat gradation characteristics.

Assume that toner density control suffers a problem (for example, a toner density sensor (not shown) is contaminated and toner cannot be supplied in an optimal amount), and a predetermined maximum density cannot be obtained. When the above-mentioned gradation control is performed in this state, almost linear gradation characteristics can be obtained up to a given density level, as shown in FIG. 35, but the density cannot increase any more at the given density level or higher and reaches the upper limit. As a result, flat gradation characteristics are undesirably obtained in a region E shown in FIG. 35.

In the control of the color reproduction characteristics, it is not preferable to use density data in this region E since an error tends to be generated upon calculation of matrix coefficients by the method of least square.

Therefore, a region where the gamma characteristics become flat at the higher density side upon execution of the gradation control, i.e., the region E in FIG. 35, is recognized, and calculations associated with color patches that use density data included in the region E are inhibited in the control of the color reproduction characteristics. When such a measure is taken, even when the printer unit B is not in an ideal state, the color reproduction characteristics can be effectively controlled. For example, even in an apparatus with lowered developing performance, the best possible image quality can be obtained.

Figure 36:
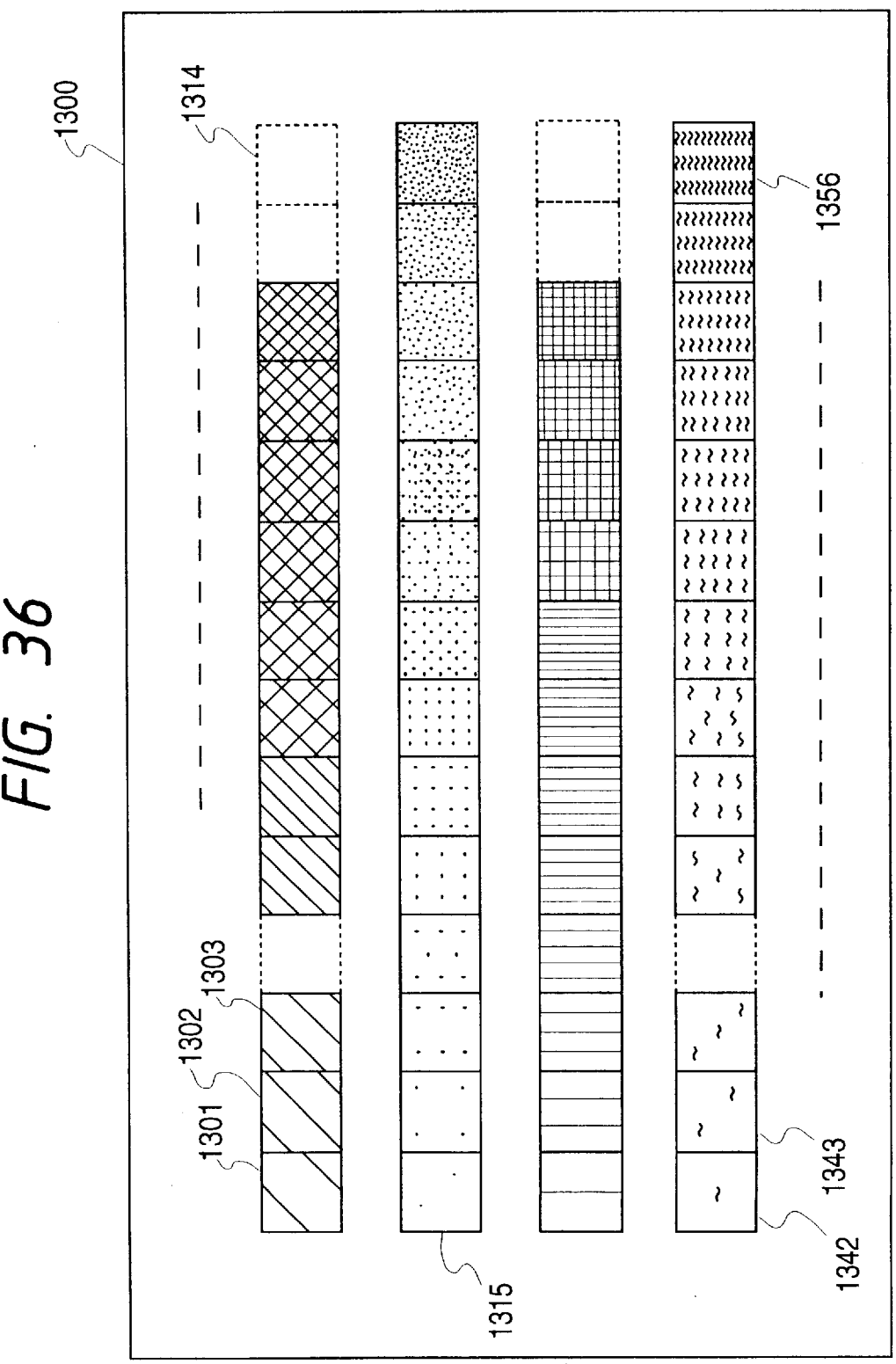
FIG. 36 is a view showing an example of a test chart in the fourth embodiment according to the present invention.

Furthermore, in the control of the color reproduction characteristics, color patches that use density data included in the region E can be inhibited from being output, as shown in, e.g., FIG. 36. With this control, since no color patches including density data in the region E in which density control is impossible to attain are output, the operator and service person can recognize a decrease in developing performance by observing the test chart 1300, and can easily obtain information indicative of a color developer which suffers a problem. In this manner, the operator and service person can acquire information effective for the maintenance of the apparatus.

In the above description, a case has been exemplified wherein the developing performance lowers due to a problem associated with toner density control. However, even when similar problems are posed due to other factors, the control of this embodiment is effective.

In the above embodiments, 4×4 matrix coefficients are exemplified as masking coefficients. Alternatively, higher-order color correction including second-order terms or higher may be performed.

As the first feedback system, a system including both a reader and a printer has been exemplified in the above embodiments. Alternatively, the present invention may be applied to a feedback system which reads a reference image formed on the photosensitive drum in the printer.

In each of the above embodiments, a color image is formed by the electrophotography method. However, the above-mentioned image adjustment processing is effective for every image forming apparatuses using a method of forming a full-color image by digital processing, i.e., an ink-jet method, sublimation dye type method, dot-impact method, and the like.

As described above, according to the above embodiments, an image recording apparatus and method, which can obtain high image quality by adjusting a certain image formation parameter in consideration of a variation in image forming condition, can be provided.

[Fifth Embodiment]
[Arrangement]

Figure 37:
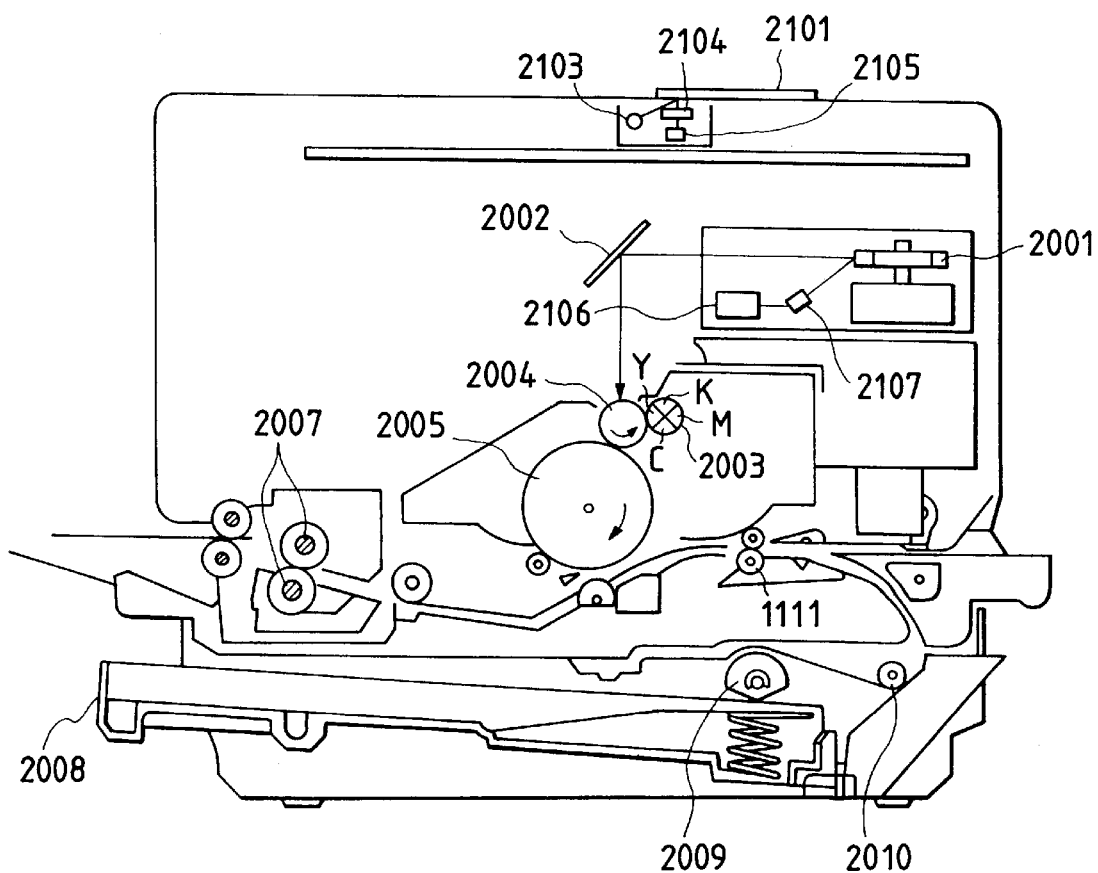
FIG. 37 is a sectional view showing an image recording apparatus according to the fifth embodiment of the present invention.

FIG. 37 is a schematic view showing the arrangement of an image recording apparatus according to the fifth embodiment of the present invention.

An original 2101 is illuminated with light emitted by a lamp 2104, and light reflected by the original 2101 forms an image on a line image sensor 2105 comprising, e.g., a CCD, via an optical system 2104 constituted by lenses, and the like. Note that an image reading unit constituted by the lamp 2103, the optical system 2104, the line image sensor (CCD sensor) 2105, and the like is scanned in the sub scan direction by a driving system (not shown) to read an image on the entire original 2101.

As will be described later, an image signal output from the CCD sensor 2105 is converted into a laser beam by a laser driver 2106 and a laser light source 2107. A laser beam output from the laser light source 2107 is scanned on the surface of a photosensitive drum 2004 while being reflected and guided by a polygonal mirror 2001 and a mirror 2002. The photosensitive drum 2004 is rotating in the direction of an arrow in FIG. 37, and a latent image is formed on its surface upon scanning of the laser beam. The latent image formed on the surface of the photosensitive drum 2004 is developed by rotary developers 2003 in units of color components. Note that FIG. 37 illustrates a state wherein development using yellow (Y) toner is performed.

On the other hand, a recording paper sheet fed from a recording paper cassette 2008 by a paper feed cam 2009 and a feed roller 2010 is fed to a transfer drum 2005 at a predetermined timing by registration rollers 2111, and is wound around the transfer drum 2005. Every time the transfer drum 2005 completes one revolution, a color toner image is formed on the recording paper sheet in the order of Y (yellow), M (magenta), C (cyan), and K (black). Upon completion of a total of four revolutions of the transfer drum 2005, the transfer operation of the toner images is completed.

The recording paper sheet on which the toner images have been transferred is peeled from the transfer drum 2005, and the toner images are fixed by a pair of fixing rollers 2007, thus completing a color image print operation. Thereafter, the recording paper sheet is exhausted outside the apparatus. Note that each color toner used in the apparatus of this embodiment is prepared by dispersing a color agent using a styrene-based polymer resin as a binder.

Figure 38B:
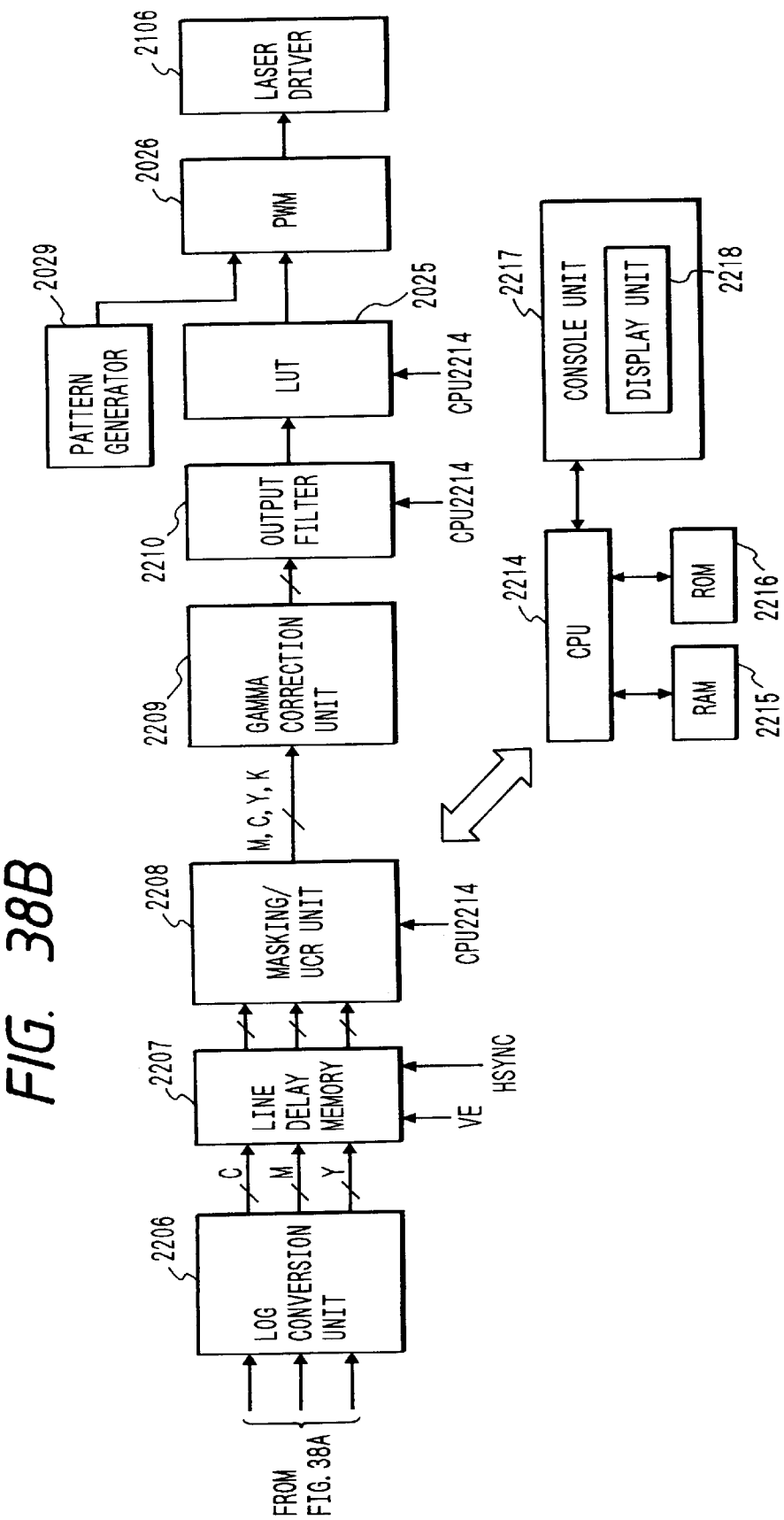
FIG. 38 is composed of FIGS. 38A and 38B is a block diagram showing an example of an image signal processing circuit for obtaining a gradation image in the fifth embodiment.

FIGS. 38A and 38B are block diagrams showing an example of an image signal processing circuit for obtaining a gradation image in this embodiment.

Referring to FIGS. 38A and 38B, a CPU 2214 controls the entire apparatus of this embodiment including the following components in accordance with programs pre-stored in, e.g., a ROM 2216. A RAM 2215 is used as a work area of the CPU 2215, and the ROM 2216 also stores image processing parameters and the like in addition to the control programs. A console unit 2217 comprises a keyboard, a touch panel, and a display 2218 such as an LCD. With the unit 2217, an instruction input by an operator is supplied to the CPU 2214, and the CPU 2214 displays the operation condition and state of the apparatus.

An address counter 2212 counts clocks CLK in units of pixels generated by a clock generation unit 2211, and outputs main scan address signals indicating the pixel addresses for one line. A decoder 2213 decodes the main scan address signals output from the address counter 2212, and generates a signal 2219 such as a shift pulse, reset pulse, or the like for driving the CCD sensor 2105 in units of lines, a signal VE indicating an effective region in a signal for one line output from the CCD sensor 2105, a line synchronization signal HSYNC, and the like. Note that in response to the signal HSYNC, the address counter 2212 is cleared and starts the count operation of main scan addresses of the next line.

The image signals output from the CCD sensor 2105 are input to an analog signal processing unit 2201, and are subjected to gain and offset adjustment operations. Thereafter, the image signals are converted by an A/D conversion unit 2202 into 8-bit R, G, and B digital signals in units of color components. The digital signals are subjected to known shading correction in units of colors using a signal obtained by reading the reference white plate 2106 in a shading correction unit 2203.

A line delay unit 2204 corrects spatial shifts in the image signals output from the shading correction unit 2203. The spatial shifts are generated since the line sensors of the CCD sensor 2105 are arranged in the sub scan direction to be separated from each other by predetermined distances. More specifically, the R and G color component signals are line-delayed in the sub scan direction with reference to the B color component signal, thereby locking the phases of the three color component signals.

A correction unit 2108 performs luminance correction of the image signals output from the line delay unit 2204, as will be described in detail later.

An input masking unit 2205 converts the color space of the image signals output from the correction unit 2208 into an NTSC standard color space by matrix calculations given by equation (1") below. More specifically, the color space of the respective color component signals output from the CCD line sensor 2105 is determined by the spectral characteristics of the filters of the respective color components, and is converted into the NTSC standard color space.

$$\begin{bmatrix} Ro \\ Go \\ Bo \end{bmatrix} = \begin{bmatrix} a11 & a12 & a13 \\ a21 & a22 & a23 \\ a31 & a32 & a33 \end{bmatrix} \begin{bmatrix} Ri \\ Gi \\ Bi \end{bmatrix} \quad (1")$$

where Ro, Go, Bo: output image signals

Ri, Gi, Bi: input image signals

A LOG conversion unit 2206 is constituted by a look-up table comprising, e.g., a ROM, and converts the R, G, and B luminance signals output from the input masking unit 2205 into C, M, and Y density signals. A line delay memory 2207 delays the image signals output from the LOG conversion unit 2206 by a period (line delay) required for a black character discrimination unit (not shown) to generate control signals UCR, FILTER, SEN, and the like on the basis of the outputs from the input masking unit 2205.

A masking/UCR unit 2208 extracts a black component signal K from the image signals output from the line delay memory 2207, and performs matrix calculations for correcting color turbidity of recording color agents of a printer unit B for the Y, M, C, and K image signals, thus outputting 8-bit color component image signals in the order of M, C, Y, and K in correspondence with each reading operation of a reader unit A. Note that matrix coefficients used in the matrix calculations are set by the CPU 2214.

A gamma correction unit 2209 performs density correction of the image signals output from the masking/UCR unit 2208 so as to match the image signals with ideal gradation characteristics of the printer unit B. An output filter (spatial filter processing unit) 2210 performs edge emphasis or smoothing processing for the image signals output from the gamma correction unit 2209 in accordance with a control signal from the CPU 2214.

As will be described in detail later, a look-up table (LUT) 2025 is used for matching the density of an original image with that of an output image, and comprises, e.g., a RAM. A conversion table of the LUT 2025 is set by the CPU 2214. A pattern generator 2029 generates a test print (to be described later). A pulse width modulator (PWM) 2026 outputs a pulse signal having a pulse width corresponding to the level of an input image signal, and the pulse signal is input to the laser driver 2106 for driving the laser light source 2107.

In this embodiment, in order to obtain linear gradation reproduction characteristics shown in the fourth quadrant in FIG. 16, a nonlinear component of the recording characteristics of the printer unit B shown in the third quadrant is corrected by the conversion characteristics of the LUT 2025 shown in the second quadrant. Note that the conversion characteristics of the LUT 2025 are set based on calculation results (to be described later).

[Gradation Control]

Figure 39:
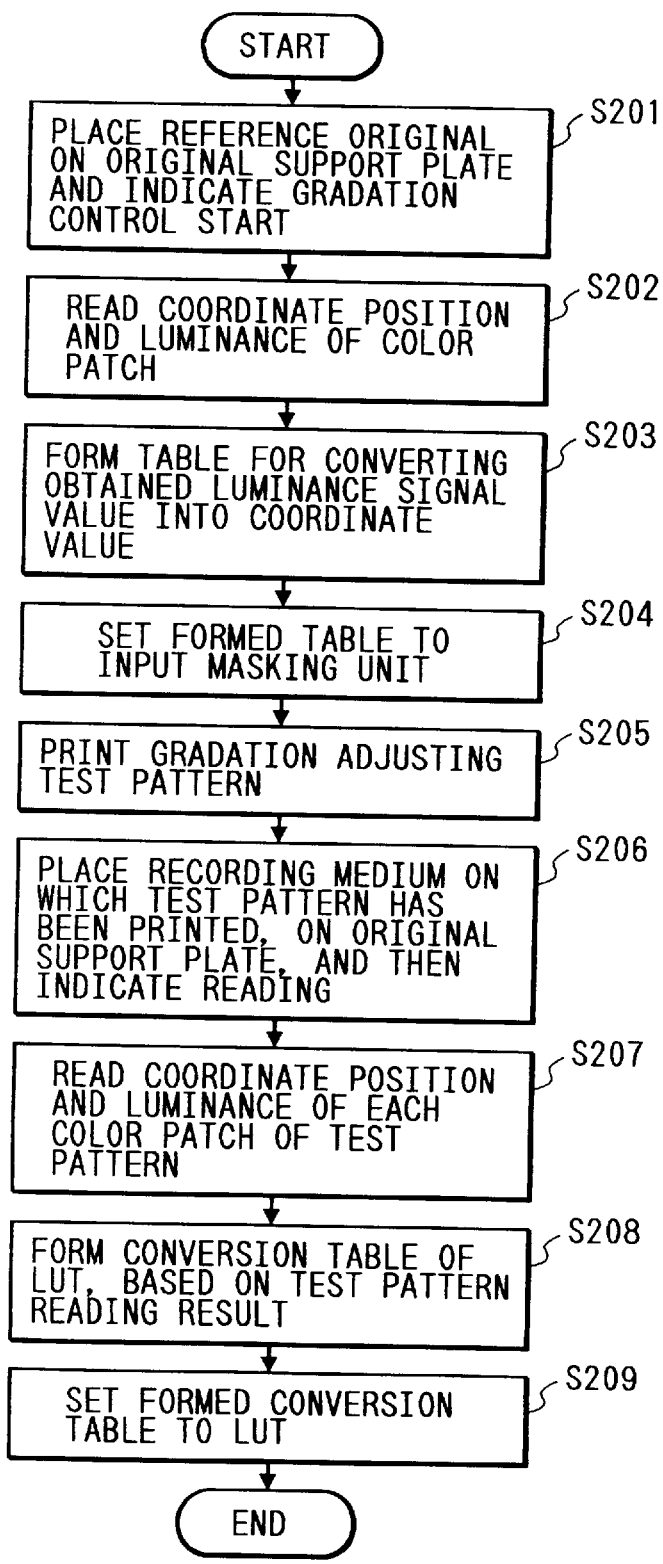
FIG. 39 is a flow chart showing an example of gradation control using a reader unit in the fifth embodiment.

FIG. 39 is a flow chart showing an example of the gradation control using the reader unit in this embodiment.

Figure 40:
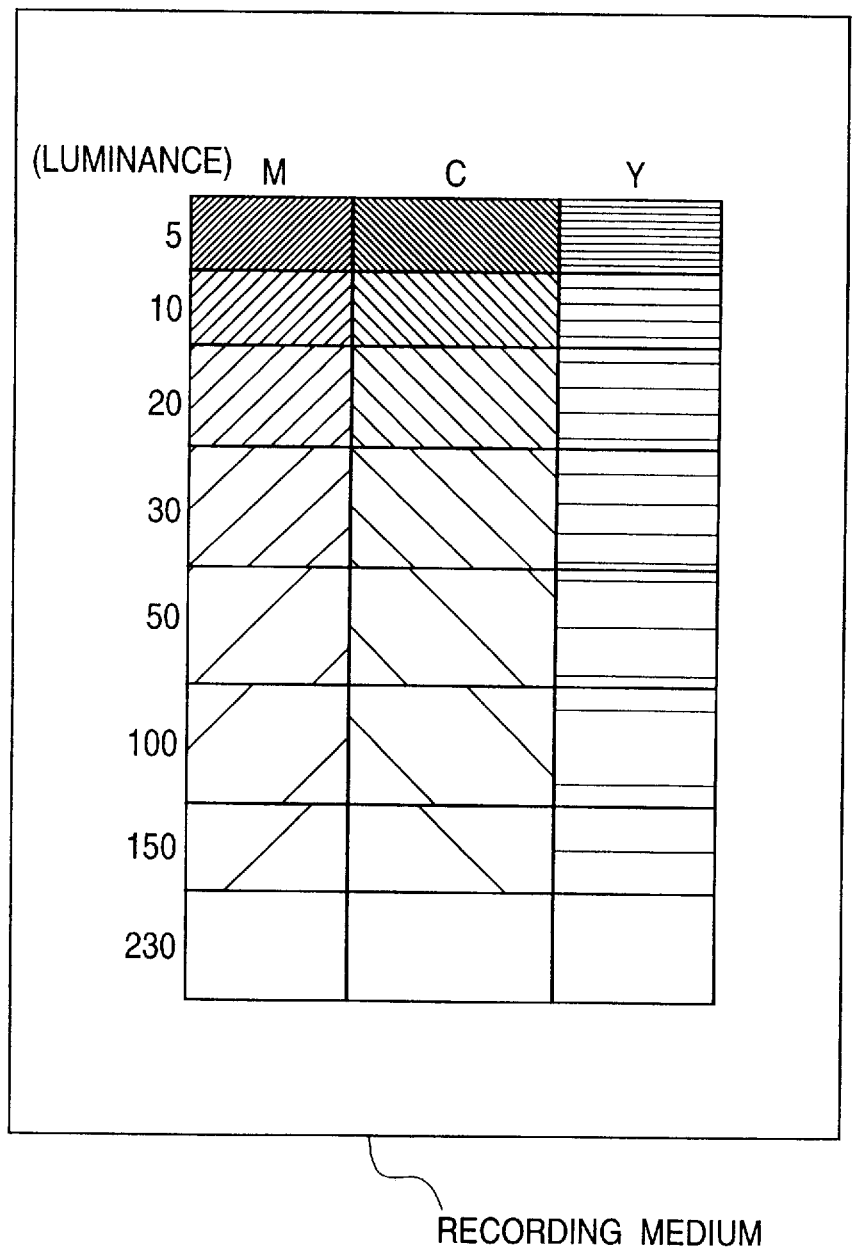
FIG. 40 is a view showing an example of a reference original formed with standard color patches.

In step S201, if an operator finds abnormal gradation characteristics, he or she places a reference original formed with standard color patches shown in, e.g., FIG. 40, on an original support plate, designates a color that exhibits abnormal gradation characteristics using the console unit 2217, and instructs start of the gradation control. Note that the reference original is placed on the original support plate in a predetermined direction, needless to say.

Figures 41, 42:
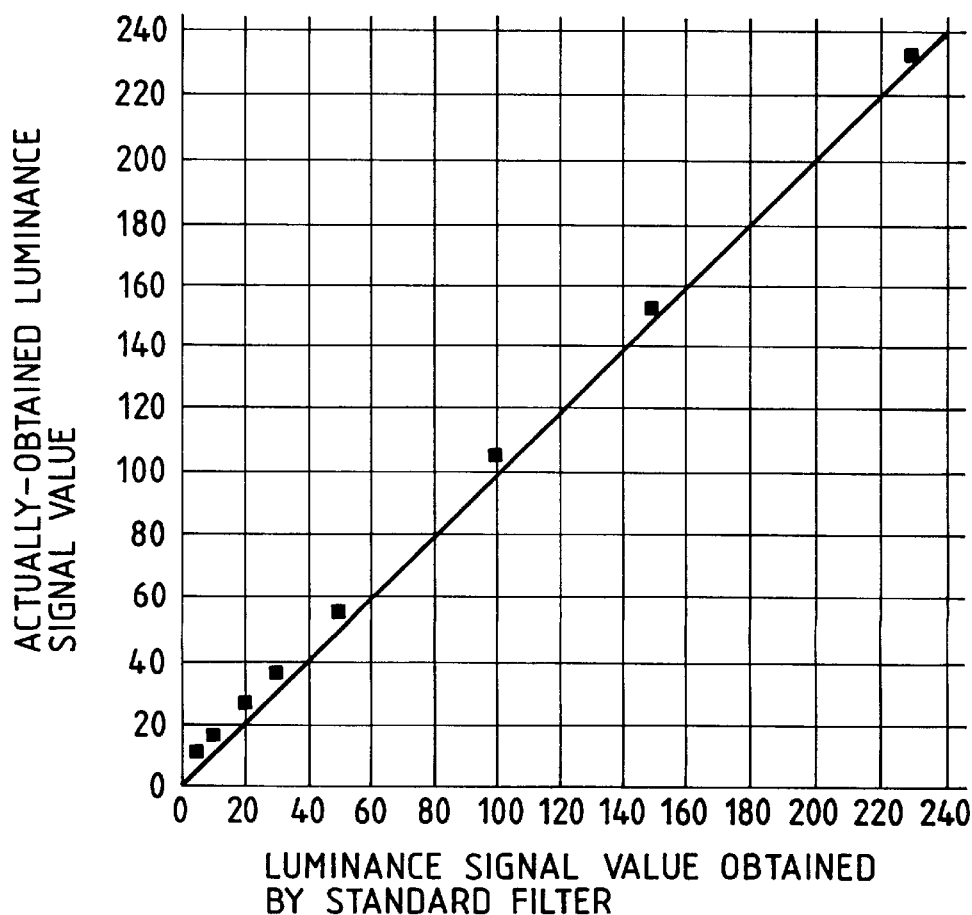
FIG. 41 is a table showing an example of the reading results of, e.g., a Y patch on the reference original.
FIG. 42 is a graph showing an example of the reading results of, e.g., the Y patch on the reference original.

The reference original is formed with 8-gradation color patches for three colors (C, M, and Y), which have predetermined luminance signal values when the patches are read by a CCD sensor having standard spectral characteristics. More specifically, when the C, M, and Y color patches are read by a standard CCD sensor, for example, luminance values 230, 150, 100, 50, 30, 20, 10, 5 are obtained as R, G, and B signals. FIGS. 41 and 42 are respectively a table and a graph showing the reading result of Y patches on the reference original. As can be seen from FIGS. 41 and 42, the reading result of the CCD sensor 2105 is different from that of the standard CCD sensor. This error is generated since the spectral characteristics of the color separation filters of the CCD sensor 2105 are different from those of the color separation filters of the standard CCD sensor.

Upon reception of the reading instruction of the reference original from the console unit 2217, the CPU 2214 reads the coordinate positions and luminance values of the respective color patches in step S202, and creates a table for converting the obtained luminance signal values into standard values (i.e., values obtained when the patches are read by the standard CCD sensor) on the basis of the corresponding coordinate positions in units of color components (R, G, and B) in step S203. The CPU 2214 stores the table information in the RAM 2215, and also sets it as luminance correction coefficients of the correction unit 2108 in step S204, thereby correcting luminance signals read upon execution of the subsequent adjustment of the gradation characteristics. Note that conversion data between adjacent ones of the 8-gradation color patches for each color shown in FIG. 40 are obtained by 1st-order interpolation. Alternatively, when the number of color patches is increased, or higher-order (e.g., second- or third-order) interpolation is used, the luminance signals can be corrected with high precision. Note that the present invention is not limited to the luminance signals to be used in correction, but density signals converted from the luminance signals may be corrected.

With the above-mentioned operation, the spectral characteristics of the color separation filters of the CCD sensor 2105 are corrected, and the CPU 2214 starts execution of processing for adjusting the gradation characteristics.

Figure 43:
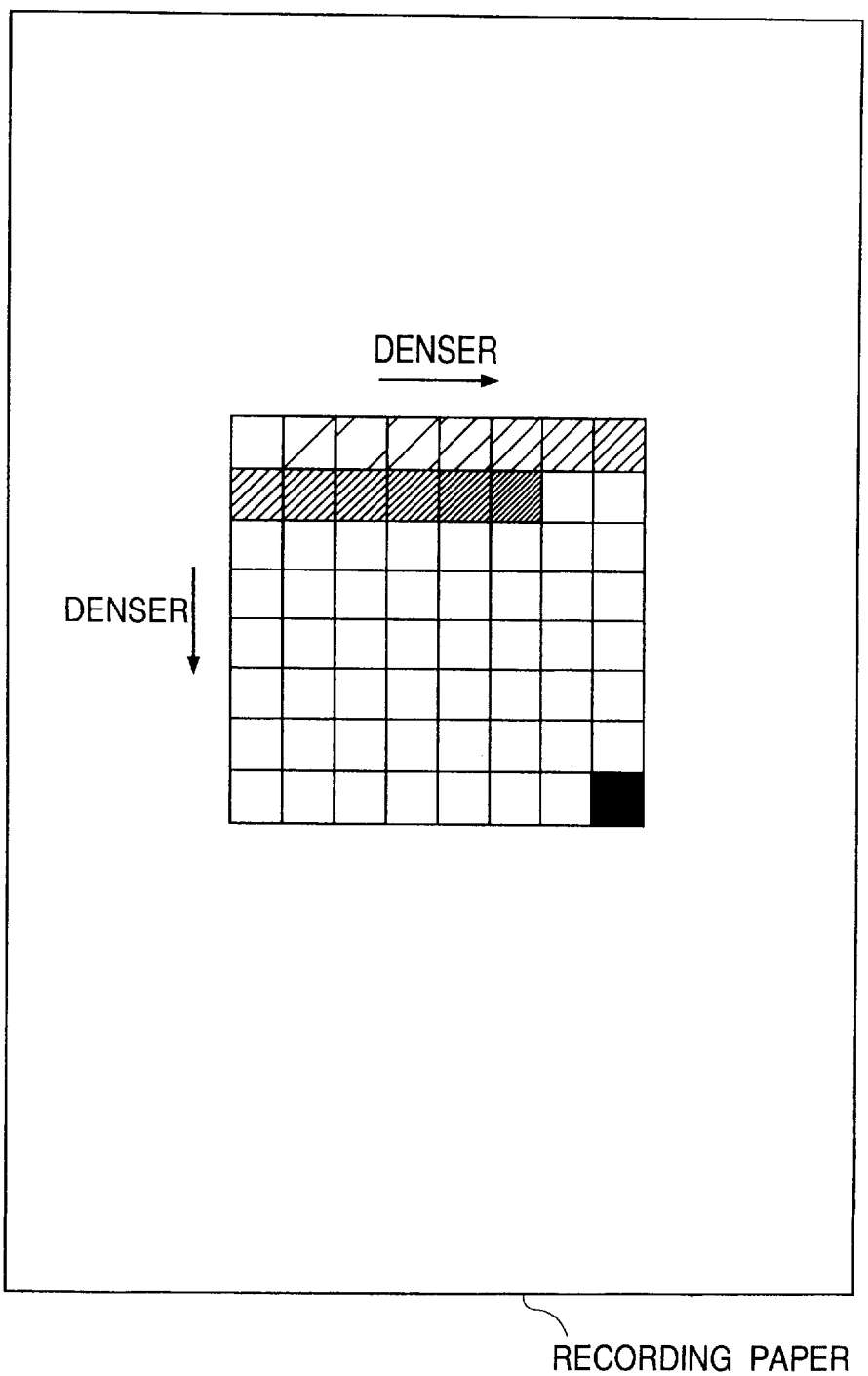
FIG. 43 is a view showing an example of a test pattern to be recorded on a recording medium.

The CPU 2214 generates a 256-gradation test pattern as shown in, e.g., FIG. 43 of the color designated in step S201, and prints out this pattern on a recording medium in step S205.

Subsequently, the operator sets the recording medium, on which the test pattern is printed, on the original support plate in accordance with a guidance message displayed on the display 2218 by the CPU 2214, and inputs a reading instruction of the test pattern using the console unit 2217 in step S206.

In response to this instruction, the CPU 2214 reads the test pattern in step S207 to obtain R, G, and B image signals of the test pattern. In general, the measurement reproducibility of an optical system using a CCD can be satisfactorily maintained by performing shading correction. The input masking unit 2205 corrects errors in the obtained R, G, and B image signals caused by the spectral characteristics of the color separation filters of the CCD sensor 2105, and the corrected image signals are converted into C, M, and Y density signals by the LOG conversion unit 2206.

Subsequently, the CPU 2214 calculates the relationship between the laser output and the density, i.e., the recording characteristics of the printer unit B shown in the third quadrant in FIG. 16, on the basis of the obtained coordinate positions and the corresponding density data, and creates a conversion table (with the conversion characteristics shown in the second quadrant in FIG. 16) of the LUT 2025 for converting the gradation reproduction characteristics into linear characteristics, in step S208. In step S209, the CPU 2214 saves this table information in the RAM 2215 and sets it in the LUT 2025.

Figures 44, 45:
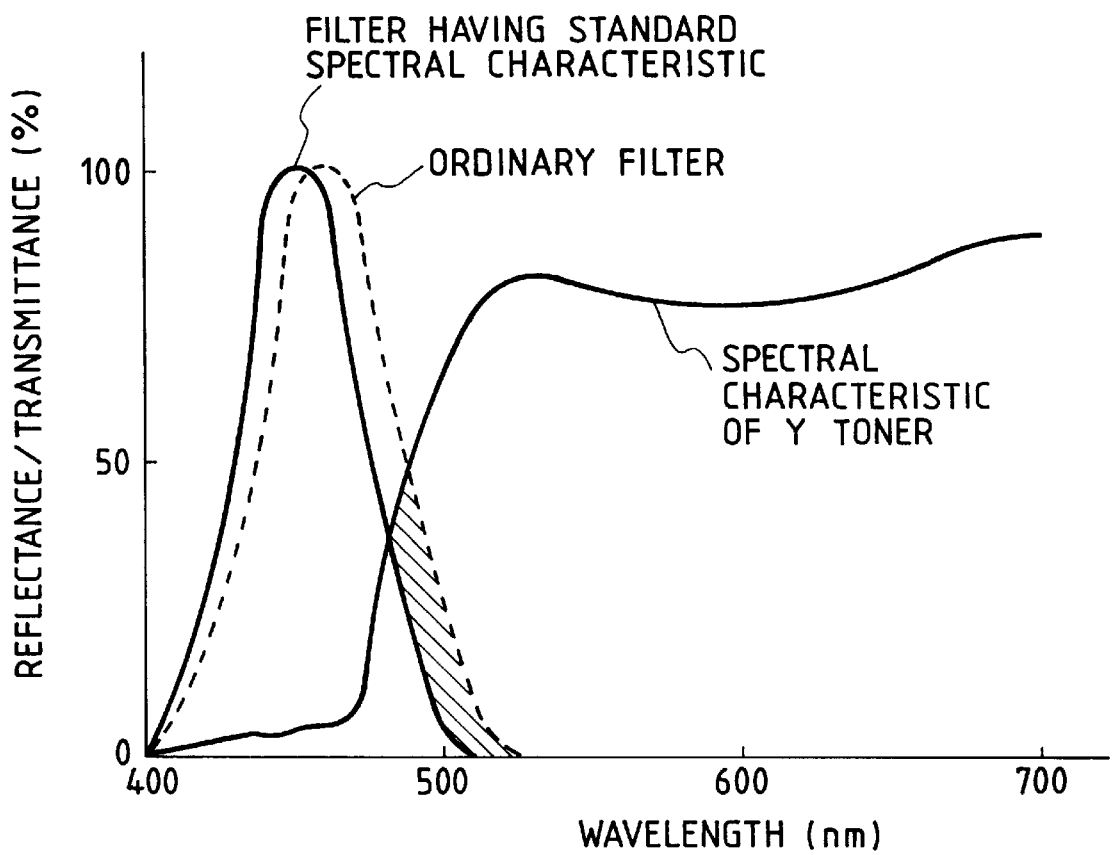
FIG. 44 is a graph showing the reflection spectral characteristics of Y toner and the spectral characteristics of a filter which transmits blue (B) components.
FIG. 45 is a table for explaining the fact that the error increases as the density becomes higher.

FIG. 44 is a graph showing an example of the reflection spectral characteristics of Y toner and the spectral characteristics of a filter for transmitting blue (B) (to be referred to as a "B filter" hereinafter). In general, the spectral characteristics of a normal B filter indicated by a broken curve deviate from those of a standard B filter indicated by a solid curve. An image signal output from the CCD 2105 is proportional to the product of the reflection spectral characteristics of Y toner and the spectral characteristics of the B filter, i.e., the overlapping portion of these characteristics. Therefore, a hatched portion in FIG. 44 gives an error of a luminance signal B. Since a luminance signal including such error component is converted into a density signal by LOG conversion, the error increases as the density becomes higher, as shown in, e.g., FIGS. 45 and 46. When the gradation characteristics are adjusted in this state, an abnormal image is obtained.

However, since this embodiment performs the gradation control shown in FIG. 39, even when the spectral characteristics of the color separation filters of the CCD sensor 2105 deviate from standard characteristics, the spectral characteristic deviation is corrected prior to adjustment of the gradation characteristics. Therefore, an error shown in FIGS. 45 and 46 can be suppressed, and a high-quality image can be obtained.

Figures 46, 47:
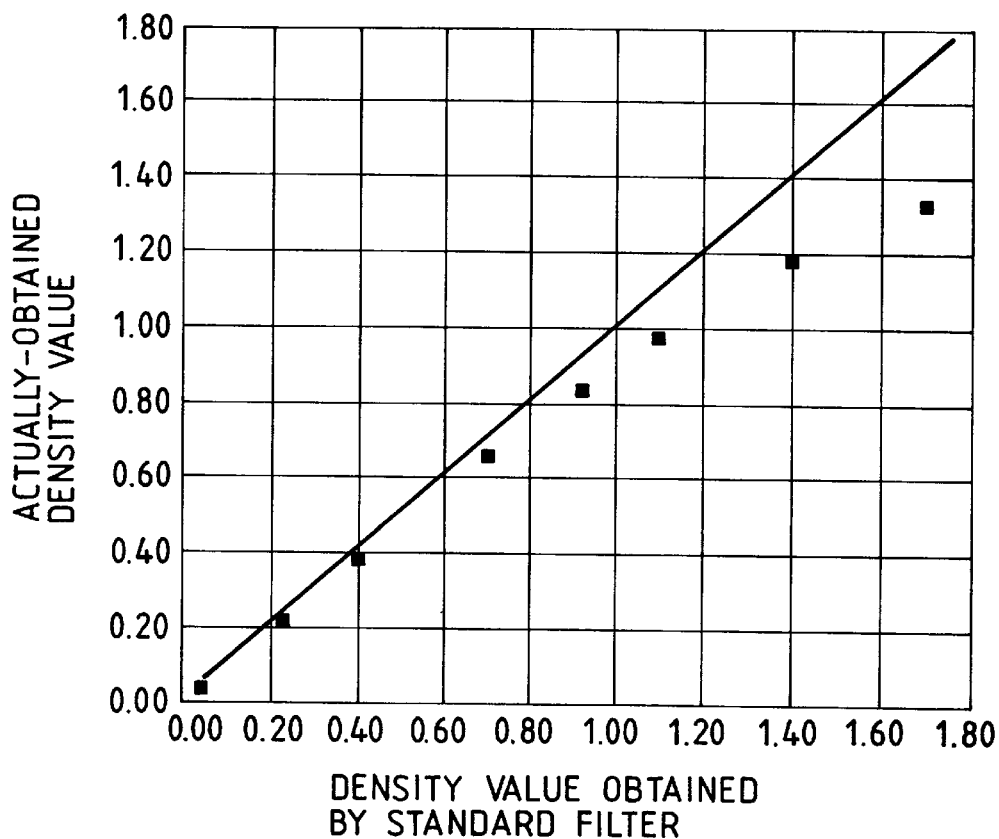
FIG. 46 is a graph for explaining the fact that the error increases as the density becomes higher.
FIG. 47 is a table showing in detail a method of correcting the spectral characteristics in the sixth embodiment according to the present invention.

Note that a density value D shown in FIGS. 45 and 46 is given by equation (2″) below. For example, density value D=1 corresponds to a density at which upon irradiation of light onto an image with a predetermined density, the light reflected by the image attenuates to $\frac{1}{10}$ the incident light (reflectance $\lambda = \frac{1}{10}$).

$$D = -\log \lambda \qquad (2'')$$

where the base of log is 10.

[Sixth Embodiment]

An image recording apparatus according to the sixth embodiment of the present invention will be described below. In the sixth embodiment, the same reference numerals denote substantially the same parts as in the fifth embodiment, and a detailed description thereof will be omitted.

In general, as shown in, e.g., FIG. 41, the spectral characteristic deviation of the color separation filters of the CCD sensor 2105 is large at the lower luminance (higher density) side, is small at the higher luminance (lower density) side, and changes roughly proportionally therebetween. As described above, since a luminance signal is converted into a density signal by LOG conversion, the deviation at the higher density side increases, but the deviation at the lower density side decreases.

Figure 48:
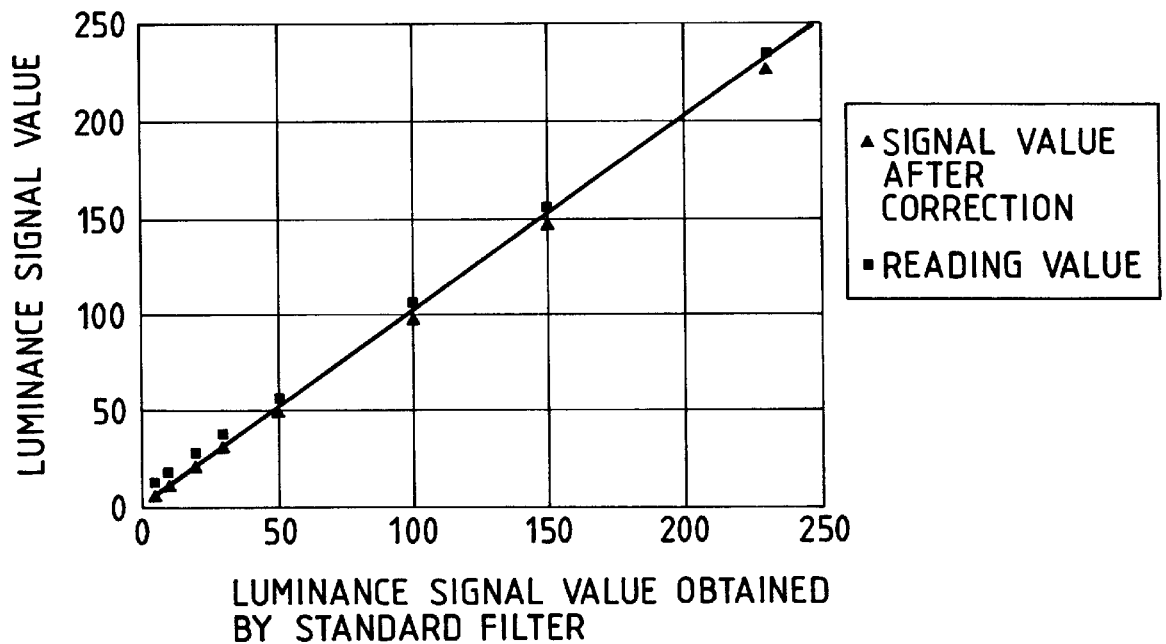
FIG. 48 is a graph showing in detail the method of correcting the spectral characteristics.

In view of the foregoing, at least one density patch at the lower density side is read, and the deviation of the read value from a standard value is detected. The detected resolution is evenly added to other luminance values, thus obtaining a substantially satisfactory result. FIGS. 47 and 48 show in detail this correction method. The first and second columns in a table shown in FIG. 47 have the same values as those shown in FIG. 41. More specifically, when a deviation "+7" of the read value "12" of a patch with a low luminance value "5" from a standard value "5" is subtracted from other read values, corrected signal values shown in the third column are obtained. As compared to errors +7, +7, +7, +7, +6, +5, +4, and +3 included in the read values, errors of the corrected signal values become 0, 0, 0, 0, −1, −2, −3, and −4, thus obtaining substantially satisfactory results.

Figure 49:
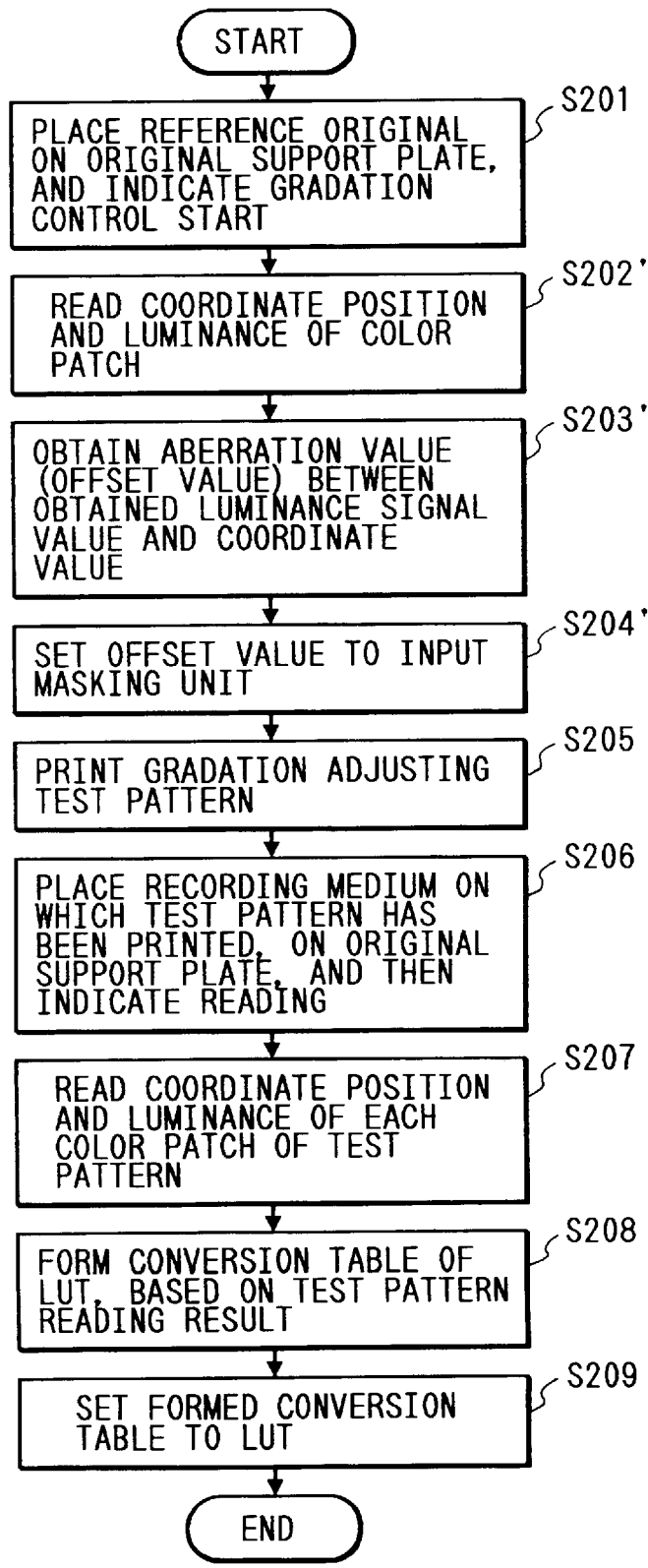
FIG. 49 is a flow chart showing an example of gradation control using a reader unit according to the sixth embodiment.

FIG. 49 is a flow chart showing an example of the gradation control using the reader unit in this embodiment. The same step numbers denote the same procedures as in the fifth embodiment shown in FIG. 39, and a detailed description thereof will be omitted. In step S202′, the CPU 2214 reads the coordinate positions and luminance values of color patches, as shown in, e.g., FIG. 50. The CPU 2214 calculates deviations of the obtained luminance signal values from their standard values (i.e., values obtained when the patches are read by a standard CCD sensor) in units of color components (R, G, and B) on the basis of the corresponding coordinate positions in step S203′. The CPU 2214 saves the calculated deviations in the RAM 2215 as offset values, and also sets them in, e.g., the input masking unit 2205 in step S204′, thereby offsetting luminance signals read upon execution of the subsequent adjustment of the gradation characteristics.

Figure 50:
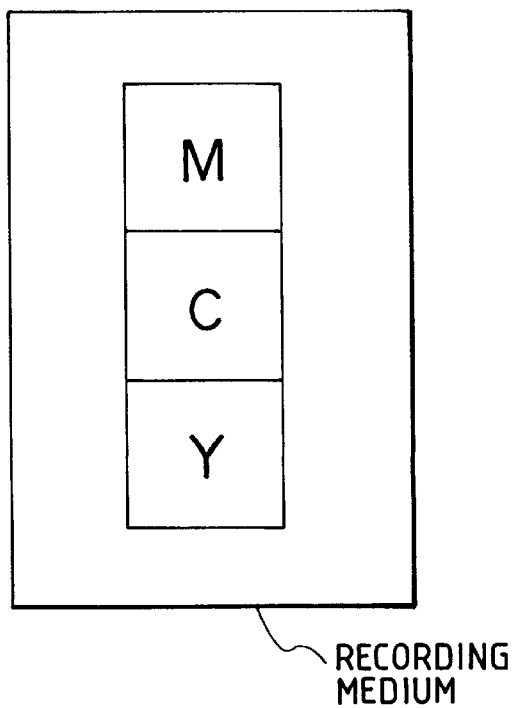
FIG. 50 is a view showing an example of a reference original on which standard color patches are formed.

For example, assuming that the color patches shown in FIG. 50 includes three color patches, i.e., a cyan (C) color patch from which an R signal value "5" is to be obtained, a magenta (M) color patch from which a G signal value "5" is to be obtained, and a yellow (Y) color patch from which a B signal value "5" is to be obtained, and the read values of these patches are respectively R1, G1, and B1, "5−R1", "5−G1", and "5−B1" are offset values. When these offset values are added to the read values by, e.g., the input masking unit 2025, more accurate luminance signal values can be obtained, and the gradation control precision can be improved.

As described above, according to this embodiment, the reference original need only include one patch for each color component, and can be simplified. In addition, processing for creating a conversion table of read values can be omitted. Therefore, the processing can be simplified and the processing time can be shortened.

[Seventh Embodiment]

An image recording apparatus according to the seventh embodiment of the present invention will be described below. In the seventh embodiment, the same reference numerals denote substantially the same parts as in the fifth embodiment, and a detailed description thereof will be omitted.

In each of the above-mentioned embodiments, the spectral characteristic deviation of the color separation filters is corrected in the state of luminance signals. However, in the seventh embodiment, the deviation is corrected after the luminance signals are converted into density signals.

Figure 51:
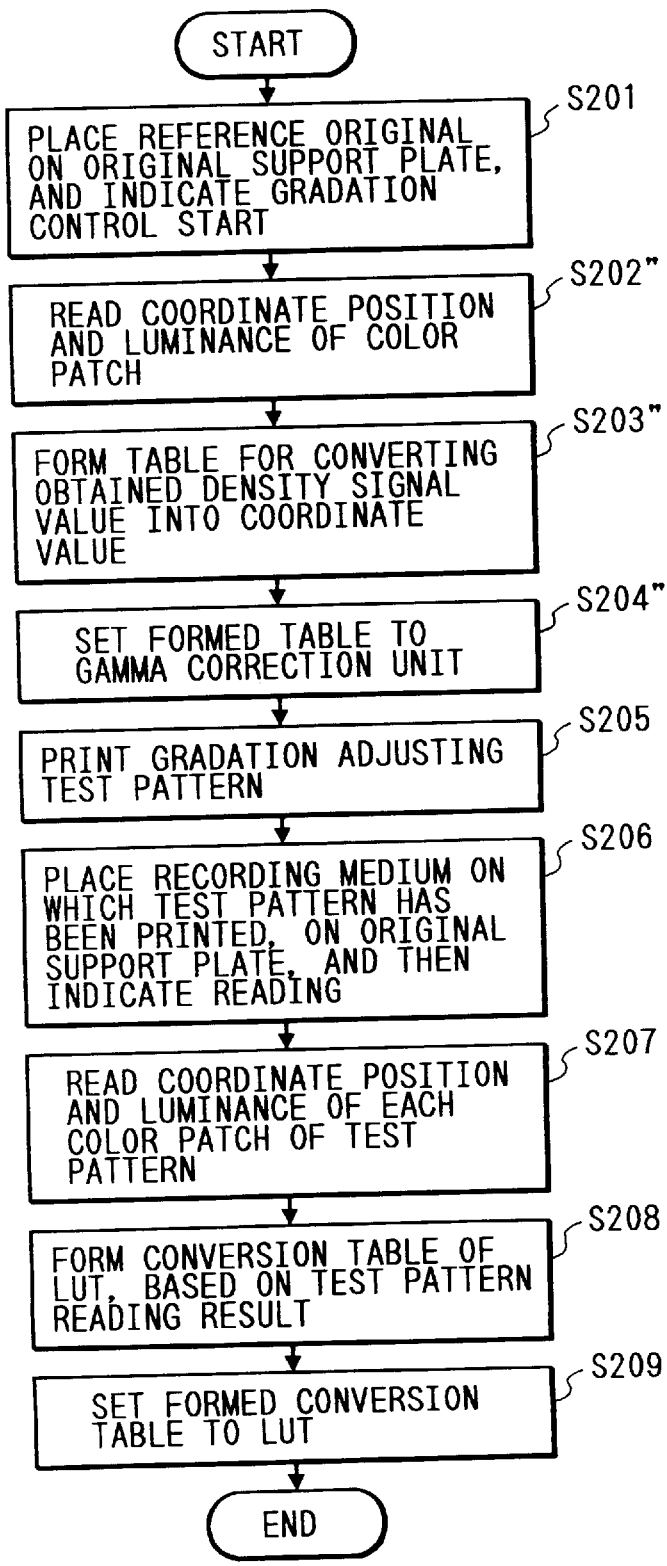
FIG. 51 is a flow chart showing an example of gradation control using a reader unit according to the seventh embodiment of the present invention.
Figure 52:
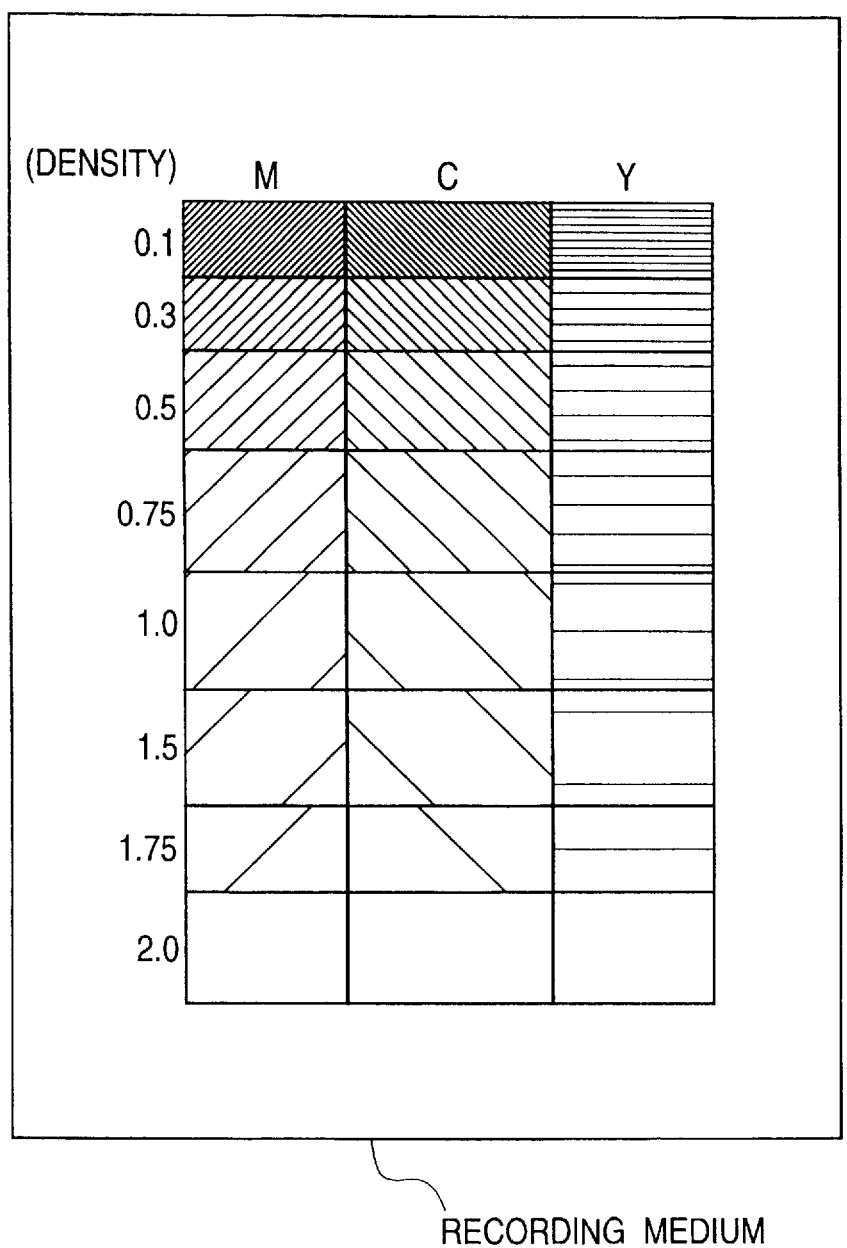
FIG. 52 is a view showing an example of a reference original on which standard color patches are formed.

FIG. 51 is a flow chart showing an example of the gradation control using the reader unit in this embodiment. The same step numbers denote the same procedures as in the fifth embodiment shown in FIG. 39, and a detailed description thereof will be omitted. In step S202″, the CPU 2214 reads the coordinate positions and luminance values of color patches, as shown in, e.g., FIG. 52, and converts the obtained luminance signals into density signals by the LOG conversion unit 2206. Subsequently, in step S203", the CPU 2214 creates a table for converting the obtained density values into standard values (i.e., values obtained when the patches are read by a standard CCD sensor) in units of color components (M, C, and Y). In step S204", the CPU 2214 saves this table information in the RAM 2215 and sets it as masking coefficients of the masking/UCR unit 2208 or a gamma table of the gamma correction unit 2209, thereby correcting density signals obtained upon execution of the subsequent adjustment of the gradation characteristics. Note that conversion data between adjacent ones of 8-gradation color patches for each color in FIG. 52 are obtained by 1st-order interpolation. Alternatively, when the number of color patches is increased, or higher-order (e.g., second- or third-order) interpolation is used, the luminance signals can be corrected with high precision.

Figure 53:
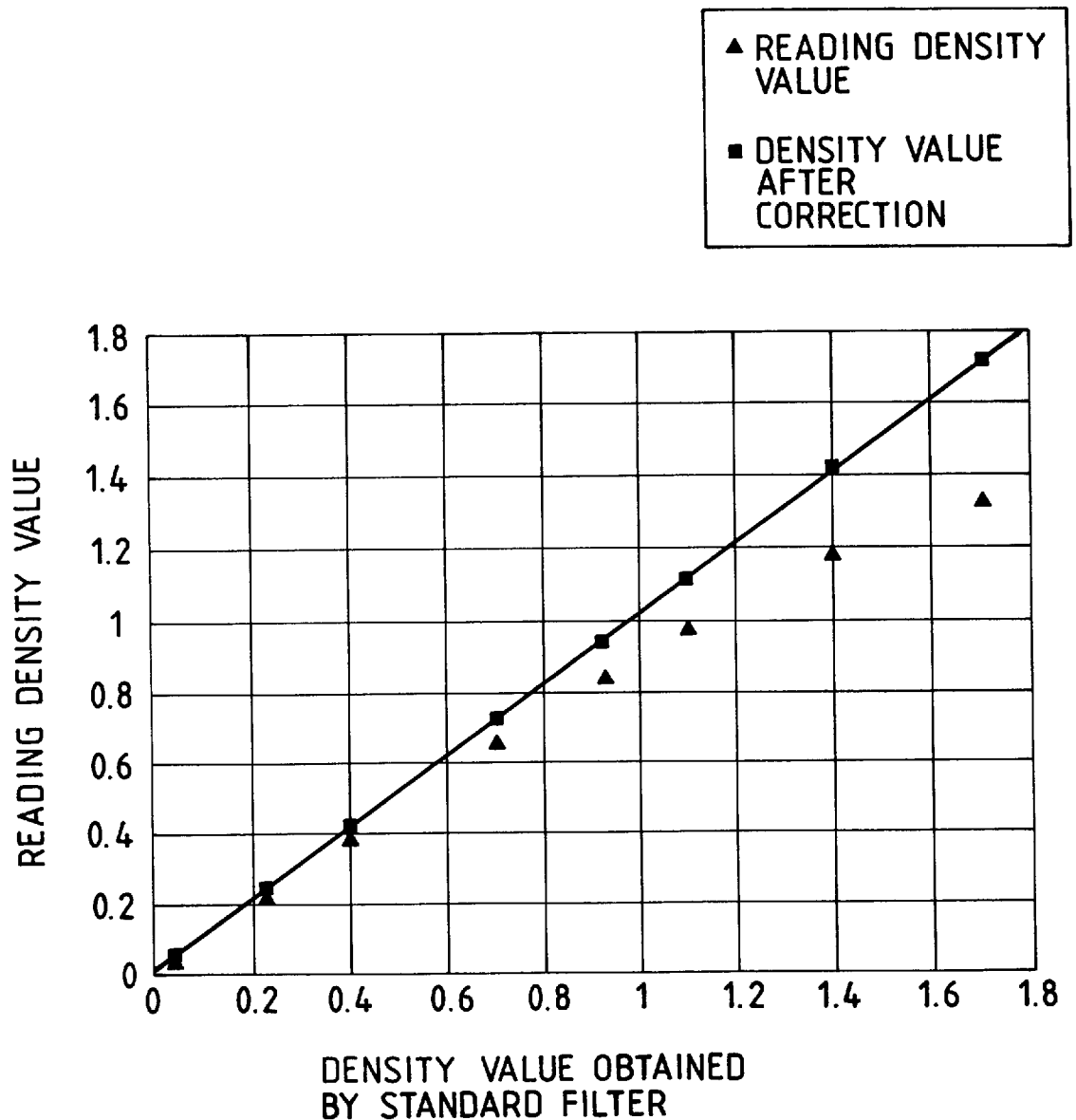
FIG. 53 is a graph showing the state wherein the read density value is appropriately corrected.

As described above, according to this embodiment, with the above-mentioned control, the read density values can be appropriately corrected, as shown in, e.g., FIG. 53, and the same effect as in the fifth embodiment can be obtained.

As described above, according to the above embodiments, an image recording apparatus and method, which can obtain an optimal image output by setting the image forming condition in consideration of the reading characteristics of an image, can be provided.

[Eighth Embodiment]

A copying machine according to the eighth embodiment of the present invention has the same sectional structure as that shown in FIG. 37.

Figure 54:
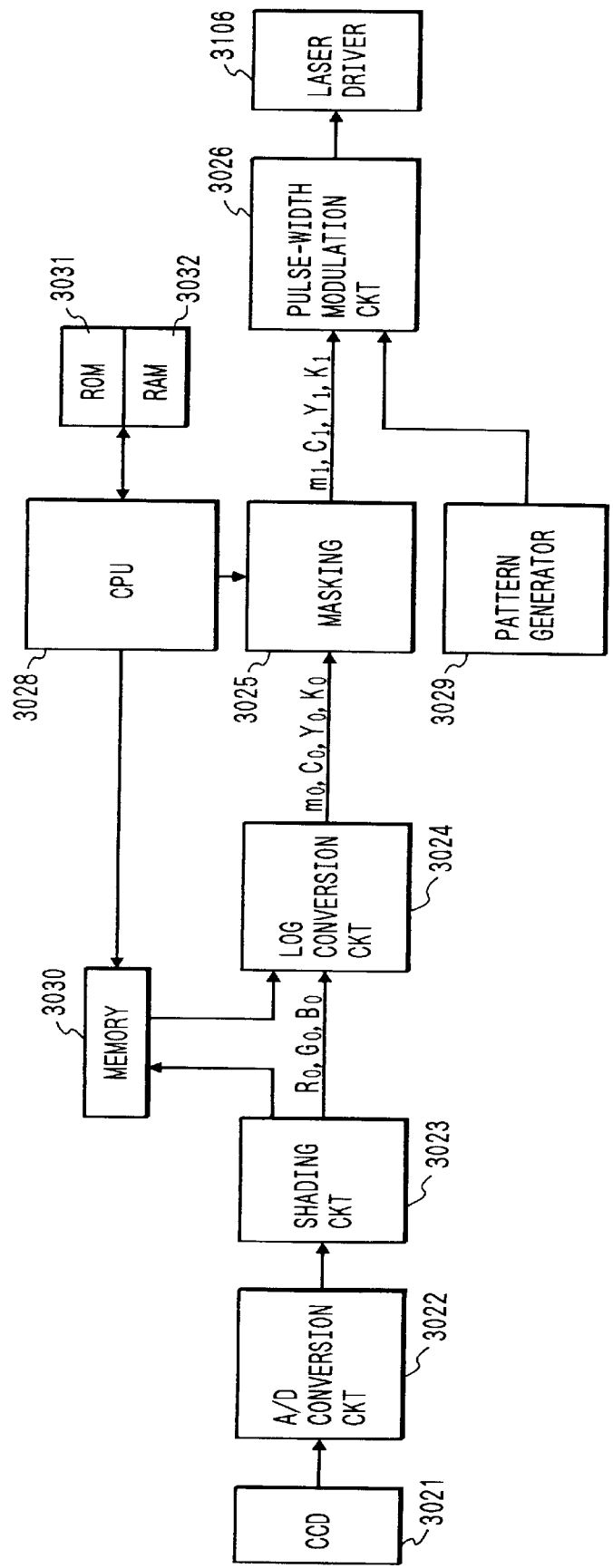
FIG. 54 is a block diagram showing the arrangement for image processing in a copying machine according to the eighth embodiment of the present invention.

FIG. 54 is a block diagram showing the arrangement of an image processing circuit in the copying machine of this embodiment.

In a reader unit 3100, an original image is read as luminance signals by a CCD 3021. The luminance signals are converted into digital luminance signals by an A/D conversion circuit 3022, and errors caused by sensitivity variations of the individual CCD elements in these luminance signals are corrected by a shading circuit 3023. In general, the measurement reproducibility of an optical system using a CCD can be satisfactorily maintained by performing shading correction.

The corrected luminance signals (R0, G0, and B0) are subjected to the following processing in a LOG conversion circuit 3024.

$$m0 = -255 * \log_{10}(G0/255)/1.59$$

$$c0 = -255 * \log_{10}(R0/255)/1.59$$

$$y0 = -255 * \log_{10}(B0/255)/1.59$$

$$k0 = \min(m0, c0, y0) \qquad (1''')$$

The LOG conversion circuit 3024 receives luminance signals obtained by the reading operation of the reader unit 3100 from a memory 3030 in calibration of the image processing condition, as will be described later.

The signals m0, c0, y0, and k0 obtained by the LOG conversion are subjected to the following masking processing:

$$\begin{pmatrix} m1 \\ c1 \\ y1 \\ k1 \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \begin{pmatrix} m0 \\ c0 \\ y0 \\ k0 \end{pmatrix} \qquad (2''')$$

The obtained signals m1, c2, y1, and k1 serve as print data in a printer unit. Note that the luminance signals and print data can express 256 gradation levels since they are processed as 8-bit digital signals.

A pulse-width modulation circuit 3026 converts the signals m1, c2, y1, and k1 into signals corresponding to dot widths, and supplies the converted signals to a laser driver 3106.

As has been described above with reference to FIG. 37, a latent image having gradation characteristics corresponding to a change in dot area is formed on the surface of the photosensitive drum 2004 by scanning a laser beam, and a print image is obtained via developing, transfer, and fixing processes.

The pulse-width modulation circuit 3026 receives predetermined print data output from a test pattern generator 3029 in the calibration processing of the image processing condition (to be described later).

Note that toners used in this embodiment are yellow, magenta, cyan, and black toners, as described above, and each toner is prepared by dispersing a color agent using a styrene-based polymer resin as a binder.

A CPU 3028 controls the above-mentioned circuits on the basis of programs stored in a ROM 3031 while using a RAM 3032 as a work memory.

More specifically, the CPU 3028 controls formation of a test pattern by the laser driver 3106, reading of the test pattern by the CCD 3021, and the like.

Figure 55:
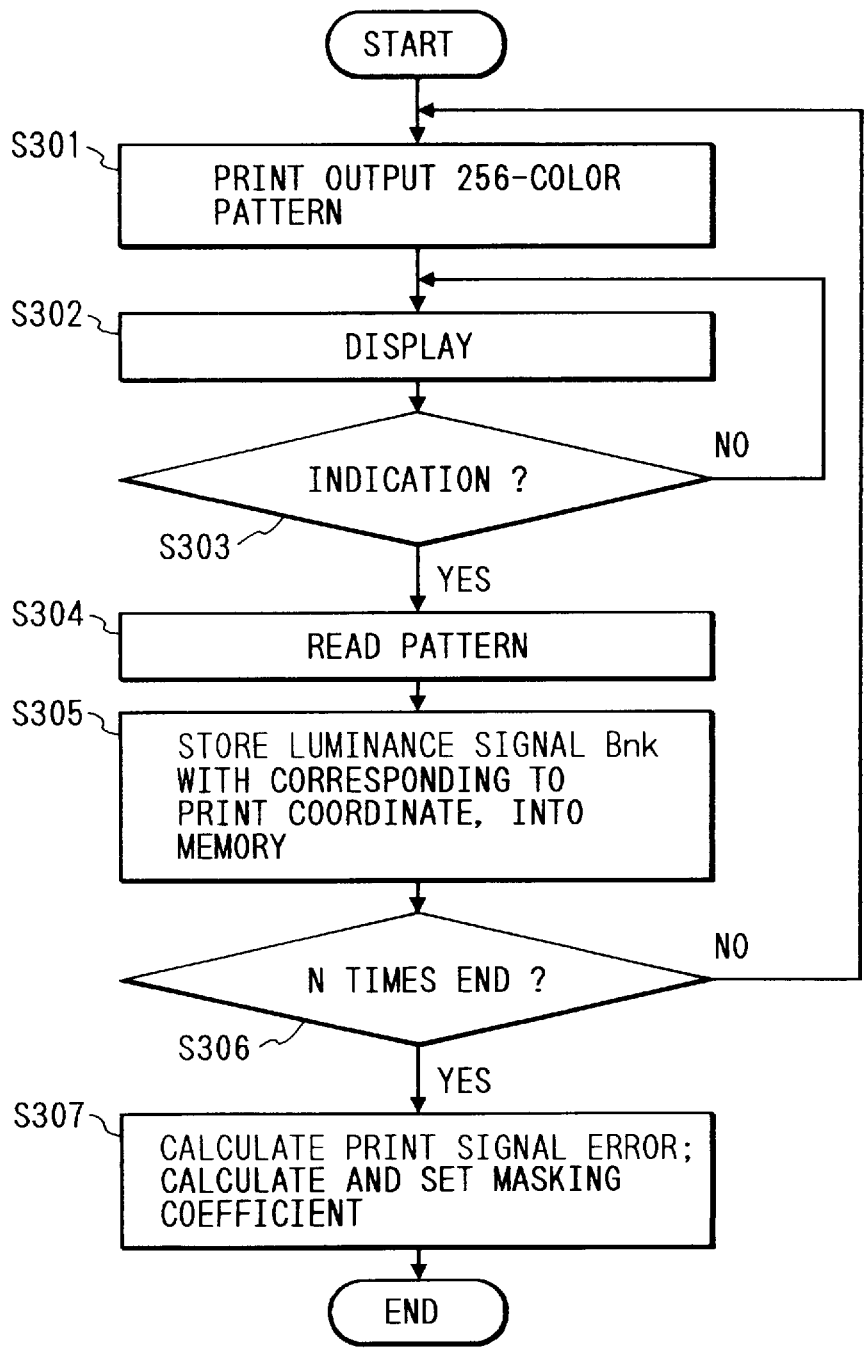
FIG. 55 is a flow chart showing the calibration processing of an image processing condition according to the eighth embodiment of the present invention.

FIG. 55 is a flow chart showing the calibration processing of the image processing condition according to this embodiment.

Figure 56:
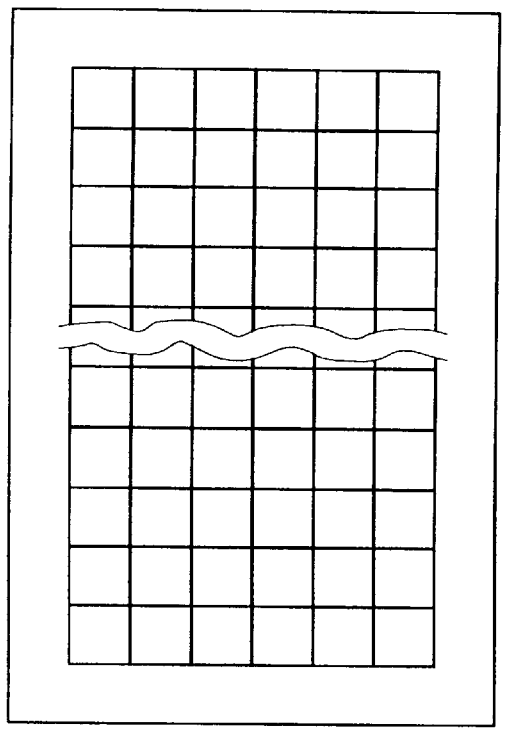
FIG. 56 is a view showing a print pattern to be output in the above-mentioned processing.

Upon depression of a predetermined key on a console panel (not shown) on the copying machine shown in FIG. 37, this processing is started. In step S301, the pattern generator 3029 (see FIG. 54) outputs 256-color M, C, Y, and K print signals A0n, as shown in FIG. 56. That is, the signal A0n for each color is a 4th-order vector indicating one of four gradation levels 0, 68, 128, and 255, and by combining the signals A0n, 256 colors can be expressed. Based on the print signals, a 256-color pattern image is formed on a recording medium.

In step S302, a message for prompting an operator to place the recording medium on an original support plate of the reader unit to read the printed-out pattern image and to perform a predetermined key operation for starting the reading processing is displayed. In step S303, the control waits for the predetermined key operation.

When the printed-out sample is placed on the original support plate of the reader unit and the predetermined key operation is made, the above-mentioned reading processing is performed in step S304 to obtain luminance signals Bnk (k=0 to N−1) corresponding to the respective colors. In step S305, the signals Bnk are stored in the memory 3030 shown in FIG. 54.

It is then checked in step S306 if processing until the luminance signals Bnk are stored is performed N times. If NO in step S306, the flow returns to step S301, and the same pattern is printed out to similarly obtain luminance signals Bnk (n=1 to n) corresponding to the respective colors.

If it is determined in step S306 that the processing has been completed N times, average luminance signals Bn of N luminance signals Bnk (k=0, 1, ..., N−1) are calculated in units of colors stored in the memory 3030, and are input to the LOG conversion circuit 3024 (FIG. 54) to be subjected to LOG conversion in step S307. Thereafter, the signals are subjected to the masking processing to be converted into print signals. Note that the masking processing at that time sets the matrix given by equation (2) above by a unit matrix. That is, in this case, the LOG-converted signals are directly output. Subsequently, square errors between the converted print signals, Cn, and the signals A0n output from the pattern generator 3029 are calculated, and the masking coefficients $a_{11}, a_{12}, \ldots, a_{44}$ in equation (2) above are calculated by the method of least square so as to minimize the errors. Then, the calculated coefficients are set as new coefficients.

As described above, upon calibration of the image processing condition (masking coefficients in this embodiment), print and reading operations based on an identical print signal are performed a plurality of number of times to eliminate calibration errors caused, especially, by time variations of the printer unit and the reader unit by averaging them, thereby improving color tone adjustment precision.

[Ninth Embodiment]

In the eighth embodiment, the print-out operation based on identical print data is performed a plurality of number of times, and the color tone correction condition (masking coefficients) is calibrated using average data of the printed and read data. However, in this embodiment, the print-out operation is performed on the basis of a signal in the neighborhood of a signal of a color whose error has a predetermined value or more, the printed data is read, and the color tone correction condition is calibrated in consideration of the read data in the first data.

Figure 57:
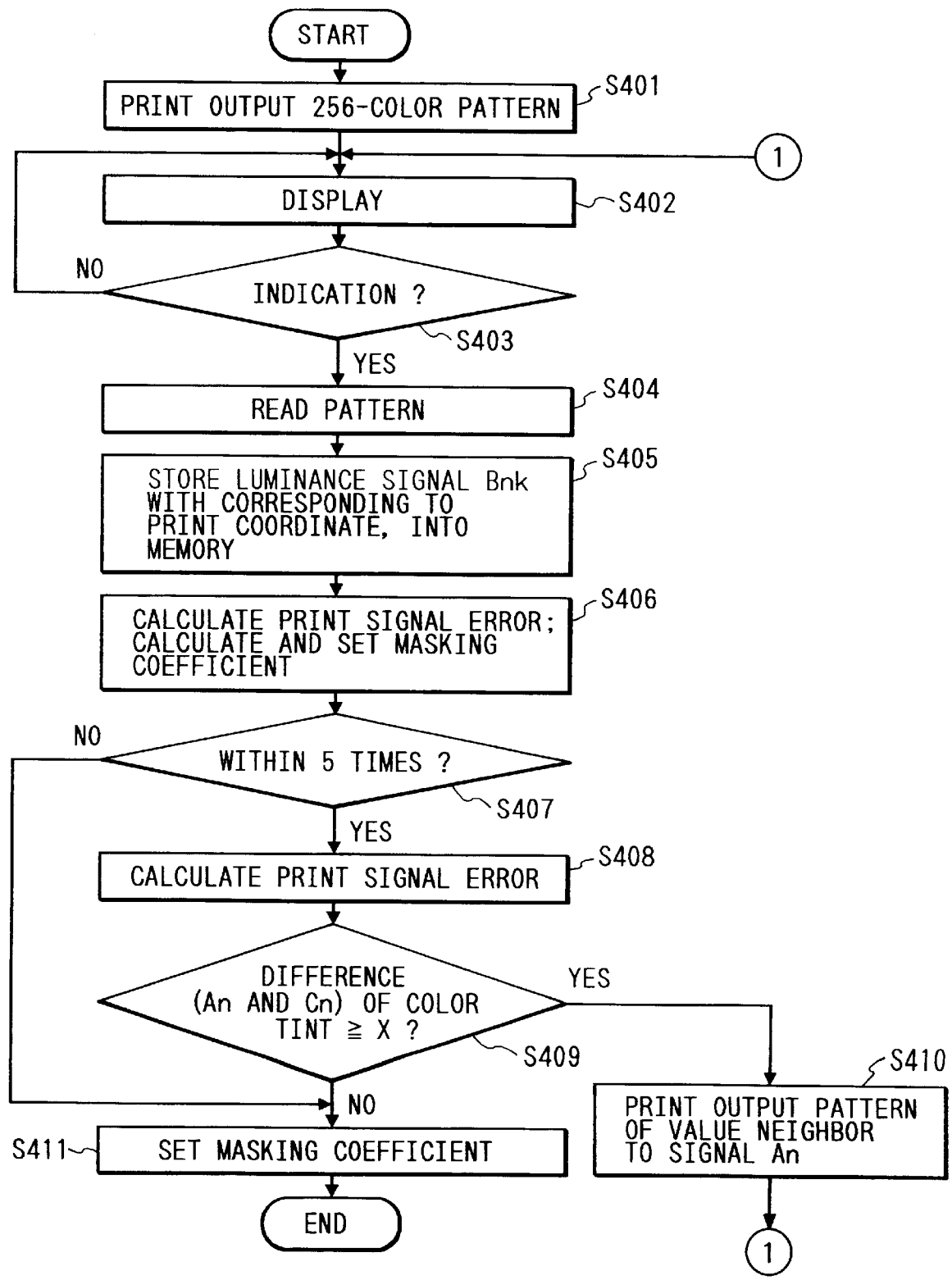
FIG. 57 is a flow chart showing the calibration processing of an image processing condition according to the ninth embodiment of the present invention.

FIG. 57 is a flow chart showing the calibration processing of this embodiment. In the following description, only a different portion from the processing shown in FIG. 55 of the eighth embodiment will be explained.

First, with the processing in steps S401 to S405, luminance signals Bnk corresponding to the respective colors are obtained and stored in the memory 3030.

Subsequently, in step S406, the luminance signals Bnk are LOG-converted and are subjected to masking processing so as to be converted into print data using the circuit shown in FIG. 54. At this time, the matrix given by equation (2) above associated with the masking processing is a unit matrix in which $a_{11}=a_{22}=a_{33}=1$, and other coefficients are 0. Therefore, the LOG-converted signals are directly output from a masking circuit 3025. Then, errors between the converted print signals, Cn, and the initial print signals, An, output from the pattern generator are calculated, and masking coefficients are calculated and set by the method of least square so as to minimize the square errors.

Subsequently, it is checked in step S407 if the number of times of print-out operations of the pattern has reached 5. If the number of times of print-out operations is smaller than 5, luminance signals Bn stored in the memory are LOG-converted in step S408. Furthermore, the converted signals are subjected to the masking processing using the masking coefficients set in the above-mentioned step to obtain print signals Cn. Then, norms that represent distances between corresponding pairs of the signals An and Cn in a predetermined calorimetric space are obtained. In step S409, it is checked if each of norms is equal to or larger than a predetermined value x.

Figure 58:
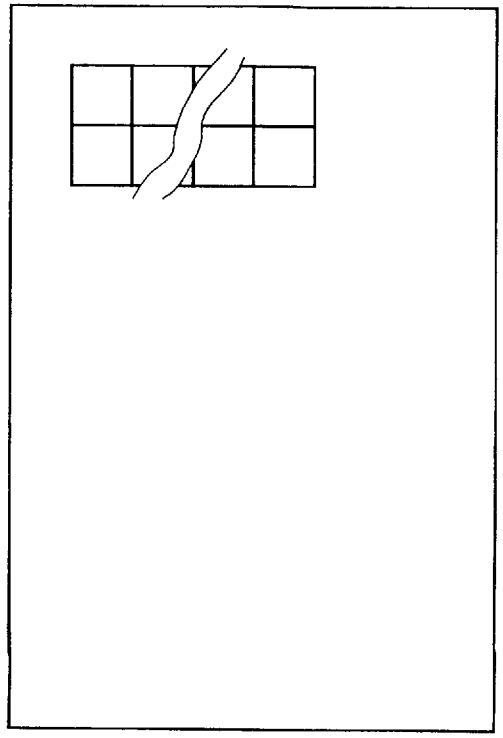
FIG. 58 is a view showing a print pattern to be output in the ninth embodiment.

If it is determined that a signal which yields a norm equal to or larger than x is found, the print-out operation is performed based on only given signals in the neighborhood of the found signal, as shown in FIG. 58, in step S410. For example, if signals An which have errors equal to or larger than x are represented by (x, y, z, w), the print-out operation is performed based on 16 sets of signals obtained by combinations of x±5, y±5, z±5, and w±5 (in this case, if the calculated signal value becomes equal to or smaller than 0, it is set to be 0; if the calculated signal value becomes equal to or larger than 255, it is set to be 255).

In step S402 and the subsequent steps, the partially printed pattern is read, and the read data are stored in the memory in addition to the stored 256 luminance signals. Furthermore, these luminance signals, i.e., (256+16) luminance signals are converted into print signals, and the masking coefficients are calculated and set by the method of least square to minimize square errors between these print signals and initial output values.

When the above-mentioned processing is repeated up to five times (or may be completed upon single processing if no signal has a large difference), the difference in a portion suffering a large change in color tone can be eliminated, and a high-quality image as a whole can be obtained.

In the above description, as data to be partially output, signals actually present in the neighborhood of a signal with a large error are output. Alternatively, signals which are not actually present may be calculated by interpolation, and the print-out operation may be performed based on the calculated signals.

If no signal having a large difference is found, calibration processing may be completed at that time.

According to this embodiment, since a pattern is formed on the basis of a portion that causes an error of the already set masking coefficients, optimal masking coefficients can be obtained efficiently.

[10th Embodiment]

In this embodiment, after the masking coefficients are corrected once as in the ninth embodiment, the correction result is checked, and if the error is still large, the calibration processing of the correction condition is completed.

Figure 59:
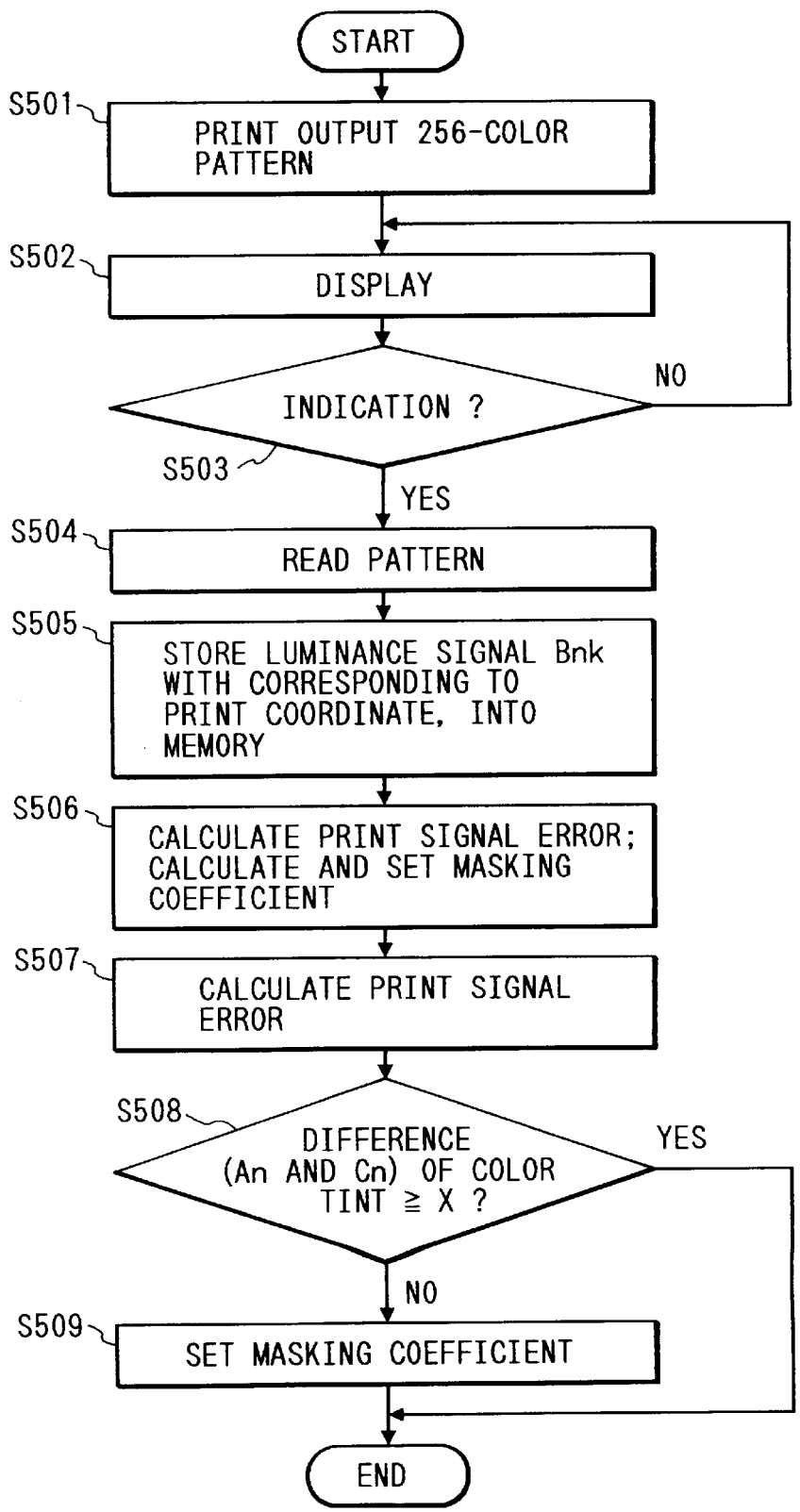
FIG. 59 is a flow chart showing the calibration processing of an image processing condition according to the 10th embodiment of the present invention.

FIG. 59 is a flow chart showing the calibration processing of the image processing condition of this embodiment. In the following description, only a difference from the above embodiment will be explained.

When masking coefficients are calculated in step S506, luminance signals stored in the memory are subjected to LOG conversion and masking processing using the calculated masking coefficients to obtain print signals Cn, and thereafter, norms serving as indices of errors between these print signals and signals An generated by the pattern generator are obtained, in step S507. If it is determined in step S508 that the norms include a norm equal to or larger than x, the calibration processing is interrupted. In this case, no new masking coefficients are set, but the previous ones are used. If the norms do not include any norm equal to or larger than x, the masking coefficients are set in step S509. With the above-mentioned processing, a control error that further increases any deviation of a given color upon continuation of control can be prevented.

According to this embodiment, when the norms include one equal to or larger than x, the calibration processing is interrupted, and pre-set masking coefficients are used. Therefore, for example, when only one color has a large error, larger deviations of other colors caused by masking coefficients set based on the color having the large error can be prevented. That is, other colors can be prevented from largely deviating due to one color.

Note that a color deviation may be generated accidentally. In view of this problem, in place of interrupting the calibration processing and using pre-set masking coefficients, the processing may be re-done from step S501.

[11th Embodiment]

In the eighth embodiment, a plurality of print-out operations are performed based on identical data, and printed data are read. However, in this embodiment, masking coefficients are calibrated based on the combination of the read result of given data and the result of the print-out and reading operations of data obtained by spatially rotating the given data through 180°.

Figure 60:
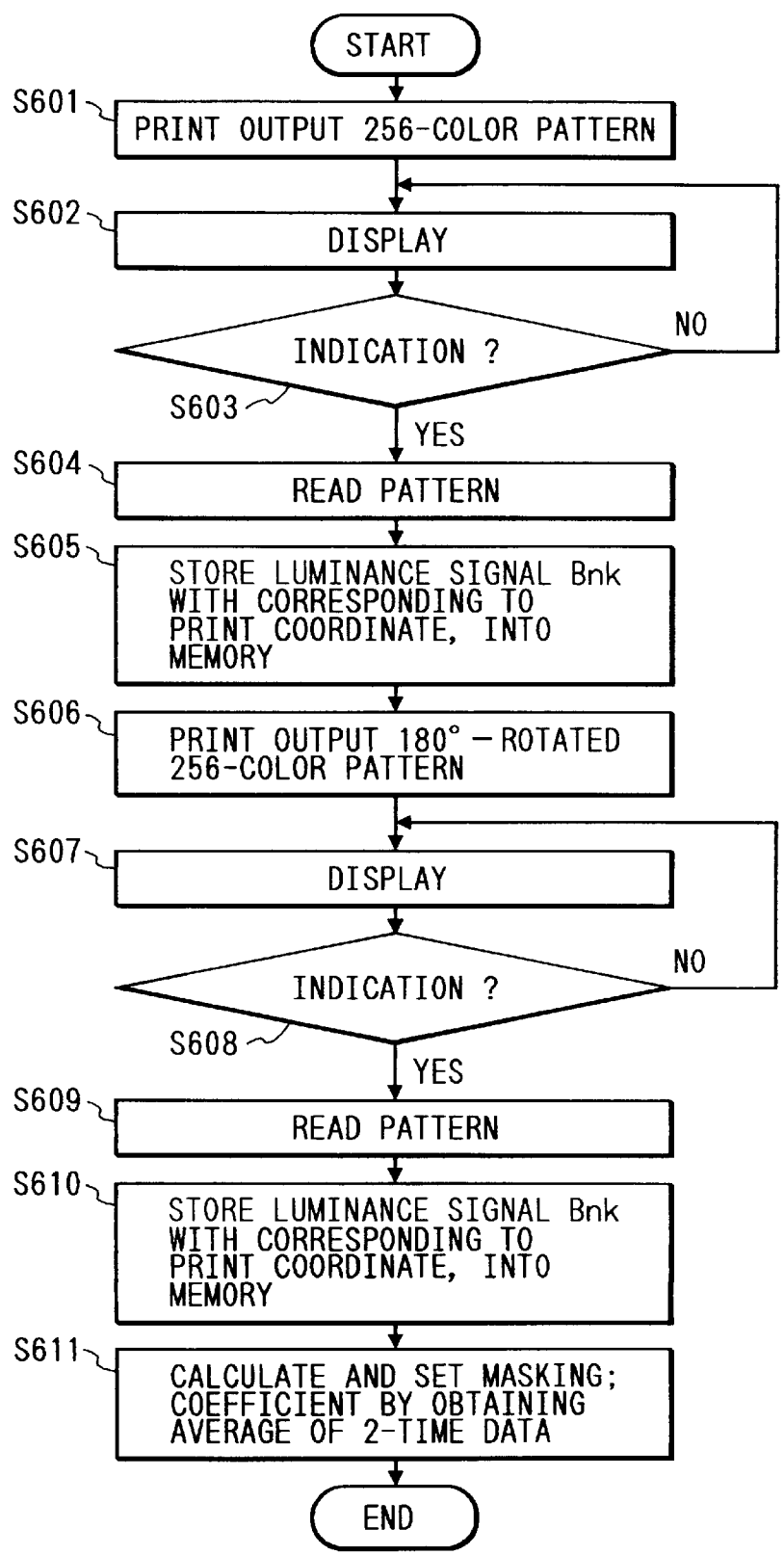
FIG. 60 is a flow chart showing the calibration processing of an image processing condition according to the 11th embodiment of the present invention.

FIG. 60 is a flow chart showing the sequence of the calibration processing according to this embodiment.

Figure 61:
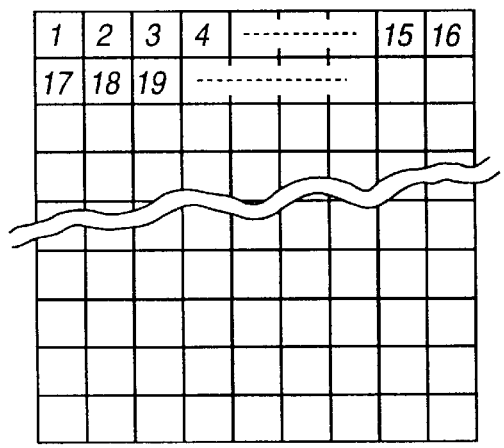
FIG. 61 is a view showing a print pattern to be output in the 11th embodiment.

When the calibration processing is started by a predetermined key operation, a 256-color pattern shown in FIG. 61 is output as in the processing of the eighth embodiment shown in FIG. 55, and a message for placing the output pattern on the original support plate and inputting a read instruction is displayed. When the instruction is input, the placed pattern is read, and the read data are stored as luminance signals in the memory (steps S601 to S605).

Figure 62:
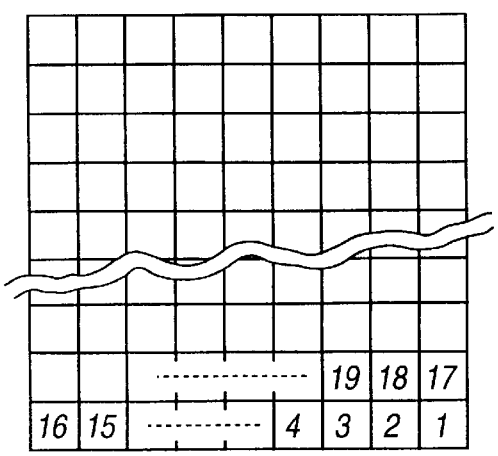
FIG. 62 is a view showing a print pattern to be output in the 11th embodiment.

In step S606, a pattern shown in FIG. 62, which is obtained by rotating the position of the pattern shown in FIG. 61 through 180° is printed out. In steps S607 to S610, the printed pattern is similarly read, and the read data are stored in the memory.

In step S611, average values of the two sets of data are calculated, and the average values are subjected to LOG conversion and masking processing to obtain print signals. On the basis of errors between these print signals and signals generated by the pattern generator, masking coefficients are calculated and set by the method of least square.

As described above, data to be printed out are spatially rotated through 180°, and calibration is performed using average data of the printed data, thus realizing calibration processing free from the influence of a spatial error offset generated in the printer unit.

In this embodiment, the average values are calculated using 180°-rotated data. However, the present invention is not limited to this. For example, 90°-rotated data may be repetitively output twice, three times, or four times, and calibration may be done based on the output data.

As can be seen from the above description, according to the above embodiments, since a certain image processing condition or conditions is or are set on the basis of a plurality of print-out results, even when the print condition or conditions in each print-out operation varies, the influence of the variation on the image processing condition to be set can be relatively eliminated by performing a plurality of print-out operations.

Even when the print condition is spatially offset, the influence of such offset can be similarly eliminated by spatially offsetting the print operation.

As a result, the image processing condition can always be appropriately calibrated.

In the above embodiments, the color copying machine has been exemplified. Alternatively, the present invention may be applied to a system constituted by a scanner, a host computer, and a color printer. Also, as an output device, an image display device such as a monitor may be used.

The present invention may be attained by storing a program that realizes the sequence described in each of the above embodiments in a medium such as a floppy disk, a CD-ROM, or the like, and loading the program into a computer to execute the sequence.

The present invention is not limited to the above embodiments, and various modifications and applications may be made within the scope of the claims.

What is claimed is:

1. An image processing apparatus comprising:

reading means for reading an original image to generate image data, said reading means having a filter;

image processing means for performing image processing on the image data, according to an image processing condition; and output means for outputting the image data subject to the image processing, to an image forming unit, wherein a pattern image formed by said image forming unit is read by said reading means through said filter to generate pattern data, and the image processing condition is set based on the generated pattern data.

2. An apparatus according to claim 1, wherein said filter removes a wavelength range where transmission characteristics of plural color filters provided in said reading means are superposed on each other.

3. An image recording apparatus for recording an image on a recording medium comprising:

first feedback adjustment means for adjusting gradation characteristics;

second feedback adjustment means for adjusting color reproduction characteristics after the adjustment by said first feedback adjustment means;

pattern forming means for forming a test pattern consisting of at least one color on the recording medium; and reading means for reading the test pattern formed on the recording medium by said pattern forming means, wherein said first and second feedback adjustment means set an image processing parameter on the basis of information obtained by forming the test pattern by said pattern forming means and reading the formed test pattern by said reading means.

4. An apparatus according to claim 3, wherein when a non-adjustable region where the gradation characteristics cannot be adjusted is detected in the adjustment of the gradation characteristics by said first feedback adjustment means, said second feedback adjustment means does not use the information of the test pattern, a gradation level of which is included in the non-adjustable region, in the setting operation of the image processing parameter.

5. An apparatus according to claim 3, wherein when a non-adjustable region where the gradation characteristics cannot be adjusted is detected in the adjustment of the gradation characteristics by said first feedback adjustment means, said second feedback adjustment means does not form a test pattern, a gradation level of which is included in the non-adjustable region, using said pattern forming means.

6. An image recording apparatus comprising:

reading means for reading an original image;

processing means for processing the image read by said reading means;

recording means for recording the image processed by said processing means on a recording medium; and setting means for setting an image processing condition of said processing means, wherein said setting means sets a first image processing condition of said processing means on the basis of a first predetermined image read by said reading means, and reference data associated with the first predetermined image, and thereafter sets a second image processing condition of said processing means on the basis of a second predetermined image which is recorded on a recording medium by said recording means and is read by said reading means.

7. An apparatus according to claim 6, wherein a pattern of a predetermined density is formed on the first predetermined image, and the first image processing condition is used for correcting reading characteristics of said reading means and is determined by an interpolation calculation.

8. An apparatus according to claim 7, wherein said reading means separates light reflected by the original image into three primary color components using color separation filters and outputs luminance signals of the color components, and the first image processing condition is used for correcting spectral characteristics of the color separation filters.

9. An apparatus according to claim 6, wherein a pattern of a predetermined density is formed on the first predetermined image, and the first image processing condition is used for converting a luminance or density value of the pattern read by said reading means into a predetermined luminance or density.

10. An apparatus according to claim 6, wherein a pattern of a predetermined density is formed on the second predetermined image, and the second image processing condition is used for correcting gradation recording characteristics of said recording means.

11. An image forming apparatus for performing a print operation on a recording medium on the basis of data subjected to image processing, comprising:

image processing means for performing the image processing;

print means for performing the print operation;

print control means for controlling said print means to perform a plurality of print-out operations on the basis of identical print data; and condition setting means for calculating and setting an image processing condition of said image processing means on the basis of print results output from said print means under the control of said print control means, and the print data.

12. An apparatus according to claim 11, wherein the image processing condition corresponds to masking coefficients in masking processing.

13. An image forming apparatus for performing a print operation on a recording medium on the basis of data subjected to image processing, comprising:

image processing means for performing the image processing;

print means for performing the print operation;

error detection means for comparing a print result output from said print means on the basis of predetermined print data with the predetermined print data, and checking if an error not less than a predetermined value is present;

print control means for, when said error detection means determines that an error not less than the predetermined value is present, controlling said print means to perform a print-out operation on the basis of print data in the neighborhood of print data, which caused the error, of the predetermined print data; and condition setting means for calculating and setting an image processing condition of said image processing means on the basis of a print result output from said print means under the control of said print control means, the print result output from said print means on the basis of the predetermined print data, and the predetermined print data.

14. An image forming apparatus for performing a print operation on a recording medium on the basis of data subjected to image processing, comprising:

image processing means for performing the image processing;

print means for performing the print operation;

error detection means for comparing a print result output from said print means on the basis of predetermined print data with the predetermined print data, and checking if an error not less than a predetermined value is present; and control means for, when said error detection means determines that an error not less than the predetermined value is present, interrupting the processing, and for, when said error detection means does not determine that an error not less than the predetermined value is present, calculating and setting an image processing condition of said image processing means on the basis of the comparison result.

15. An image forming apparatus for performing a print operation on a recording medium on the basis of data subjected to image processing, comprising:

image processing means for performing the image processing;

print means for performing the print operation;

print control means for controlling said print means to perform print-out operations on the basis of a plurality of data, which are obtained by spatially changing a position of identical print data; and condition setting means for calculating and setting an image processing condition of said image processing means on the basis of a plurality of print results output from said print means under the control of said print control means, and the print data.

16. An image processing method comprising:

a reading step of reading an original image to generate image data;

an image processing step of performing image processing on the image data, according to an image processing condition; and an output step of outputting the image data subjected to the image processing, to an image forming unit, wherein a pattern image formed by the image forming unit is read in said reading step through a special filter to generate pattern data, and the image processing condition is set based on the generated pattern data.

17. An image recording method comprising:

the first pattern forming step of forming a first test pattern on a recording medium;

the first reading step of reading the first test pattern formed on the recording medium in the first pattern forming step;

the first adjustment step of adjusting gradation characteristics on the basis of information of the first test pattern read in the first reading step;

the second pattern forming step of forming a second test pattern on a recording medium;

the second reading step of reading the second test pattern formed on the recording medium in the second pattern forming step; and the second adjustment step of adjusting color reproduction characteristics on the basis of information of the second test pattern read in the second reading step.

18. An image recording method for reading an original image, processing the read image, and recording the processed image on a recording medium, comprising:

the first setting step of setting a first image processing condition on the basis of a read first predetermined image and reference data associated with the first predetermined image;

the recording step of recording a second predetermined image on a recording medium; and the second setting step of setting a second image processing condition on the basis of the read second predetermined image.

19. An image processing method, which comprises the steps of:

outputting a test pattern by image output means on the basis of test pattern data;

reading the output test pattern by image reading means and inputting the test pattern read data; and generating a processing parameter on the basis of the test pattern and the test pattern read data, said method further comprising the steps of:

performing a plurality of test pattern output operations on the basis of the test pattern data; and generating the processing parameter on the basis of the test pattern read data obtained as a result of the plurality of test pattern output operations.

20. A method according to claim 19, wherein the test pattern is output a plurality of number of times on the basis of identical test pattern data.

21. An image processing method, which comprises the steps of:

outputting a test pattern by image output means on the basis of test pattern data;

reading the output test pattern by image reading means and inputting the test pattern read data; and generating a processing parameter on the basis of the test pattern and the test pattern read data, said method further comprising the steps of:

comparing an error between the test pattern data and the test pattern read data with a predetermined value; and outputting an image by said image output means on the basis of image data in the neighborhood of the test pattern when the comparison result is not less than a predetermined value.

22. An image processing method, which comprises the steps of:

outputting a test pattern by image output means on the basis of test pattern data;

reading the output test pattern by image reading means and inputting the test pattern read data; and generating a processing parameter on the basis of the test pattern and the test pattern read data, said method further comprising the steps of:

comparing an error between the test pattern data and the test pattern read data with a predetermined value; and inhibiting generation of the processing parameter when the comparison result is not less than a predetermined value, and generating the processing parameter when the comparison result is less than the predetermined value.

23. An image processing method, which comprises the steps of:

outputting a test pattern by image output means on the basis of test pattern data;

reading the output test pattern by image reading means and inputting the test pattern read data; and generating a processing parameter on the basis of the test pattern and the test pattern read data, said method further comprising the steps of:

outputting identical test patterns at different positions by said image output means; and generating the processing parameter on the basis of the test patterns output at the different positions.

* * * * *

UNITED STATES PATENT AND TRADEMARK OFFICE
CERTIFICATE OF CORRECTION

PATENT NO. : 5,856,876

DATED : Jarnuary 5, 1999

INVENTOR(S) : NOBUATSU SASANUMA ET AL.

It is certified that error appears in the above-identified patent and that said Letters Patent is hereby corrected as shown below:

<u>IN THE DRAWING</u>:
   Sheet 22, Fig. 21C "WITH" should read --BY--.

<u>COLUMN 6</u>
   line 11, "print" should read -- print 1-- ;and
   line 47, "38 is" should read --38 which is--.

<u>COLUMN 11</u>
   line 54, "respective" should read --respectively--.

<u>COLUMN 16</u>
   line 60, "values 255" should read --values=255--.

<u>COLUMN 21</u>
   line 38, "can set" should read --can be set--.

UNITED STATES PATENT AND TRADEMARK OFFICE
CERTIFICATE OF CORRECTION

PATENT NO. : 5,856,876

DATED : January 5, 1999

INVENTOR(S) : NOBUATSU SASANUMA ET AL.

It is certified that error appears in the above-identified patent and that said Letters Patent is hereby corrected as shown below:

COLUMN 22
 line 3, "lass" should read --glass--.

COLUMN 23
 line 43, "apparatuses" should read --apparatus--.

COLUMN 28
 line 34, "includes" should read --include--.

COLUMN 34
 line 21, "medium" should read --medium,--.

Signed and Sealed this

Twelfth Day of October, 1999

Attest:

Q. TODD DICKINSON

*Attesting Officer*          *Acting Commissioner of Patents and Trademarks*